United States Patent
Vidarsson et al.

(10) Patent No.: US 12,230,425 B2
(45) Date of Patent: Feb. 18, 2025

(54) SOLID COMPOSITE MATERIAL COMPRISING NANOPARTICLES AND AN ALLOY BASED ON MANGANESE, ALUMINUM AND OPTIONALLY CARBON, AND METHOD FOR PRODUCING THE SAME

(71) Applicant: Höganäs AB (Publ), Höganäs (SE)

(72) Inventors: Hilmar Vidarsson, Höganäs (SE); Björn Skårman, Höganäs (SE); Martin Häggblad Sahlberg, Uppsala (SE); Samrand Shafeie, Stockholm (SE)

(73) Assignee: Höganäs AB (Publ), Höganäs (SE)

( * ) Notice: Subject to any disclaimer, the term of this patent is extended or adjusted under 35 U.S.C. 154(b) by 282 days.

(21) Appl. No.: 17/436,260

(22) PCT Filed: Feb. 27, 2020

(86) PCT No.: PCT/EP2020/055189
§ 371 (c)(1),
(2) Date: Sep. 3, 2021

(87) PCT Pub. No.: WO2020/178145
PCT Pub. Date: Sep. 10, 2020

(65) Prior Publication Data
US 2022/0165463 A1    May 26, 2022

(30) Foreign Application Priority Data

Mar. 5, 2019 (EP) .................... 19160887

(51) Int. Cl.
*H01F 1/147* (2006.01)
*B22F 1/054* (2022.01)
(Continued)

(52) U.S. Cl.
CPC .............. *H01F 1/047* (2013.01); *B22F 1/056* (2022.01); *B22F 9/04* (2013.01); *B22F 9/082* (2013.01);
(Continued)

(58) Field of Classification Search
None
See application file for complete search history.

(56) References Cited

U.S. PATENT DOCUMENTS

2012/0003114 A1   1/2012  Baker et al.
2014/0132376 A1*  5/2014  Jin .......................... C22C 38/10
                                                                        75/346
2018/0114614 A1   4/2018  Lewis et al.

FOREIGN PATENT DOCUMENTS

| | | |
|---|---|---|
| CN | 108666064 A | 10/2018 |
| CN | 109087766 A | 12/2018 |
| JP | S55031155 A | 3/1980 |

OTHER PUBLICATIONS

Su (J. Mater Sci (2018), vol. 53, p. 9823-9829). (Year: 2018).*
(Continued)

*Primary Examiner* — Xiaowei Su
(74) *Attorney, Agent, or Firm* — Boone IP Law

(57) ABSTRACT

There is provided solid composite material comprising an alloy based on manganese, aluminum and optionally carbon, and dispersed nanoparticles made from a material X, as well as a method of manufacturing the same. The material X is different from manganese, aluminum, carbon or a mixture thereof and satisfying the following requirements
the melting temperature of the material X is 1400° C. or higher, preferably 1500° C. or higher; and
the material X comprises a metal.
The composite material is suitable as a magnetic material or as a precursor of a magnetic material, and allows obtaining improved magnetic properties as compared to existing alloys
(Continued)

Phase Diagram based on manganese, aluminum and optionally carbon due the presence of the nanoparticles. A magnetic material in shaped form comprising the composite material and an electric or electronic device comprising the magnetic material are also part of the invention.

18 Claims, 21 Drawing Sheets

(51) Int. Cl.
*B22F 1/142* (2022.01)
*B22F 9/04* (2006.01)
*B22F 9/08* (2006.01)
*C22C 1/04* (2023.01)
*C22C 22/00* (2006.01)
*C22C 32/00* (2006.01)
*H01F 1/047* (2006.01)
*H01F 41/02* (2006.01)

(52) U.S. Cl.
CPC ............... *C22C 1/04* (2013.01); *C22C 22/00* (2013.01); *C22C 32/0047* (2013.01); *H01F 1/147* (2013.01); *H01F 41/02* (2013.01); *B22F 2304/058* (2013.01); *C22C 2202/02* (2013.01)

(56) References Cited

OTHER PUBLICATIONS

Wang (Advanced Materials Research, ISSN: 1662-8985, vol. 287-290, p. 1492-1495, published online on Jul. 4, 2011). (Year: 2011).*
International Search Report (PCT/ISA/210) and Written Opinion (PCT/ISA/237) mailed on Apr. 28, 2020, by the European Patent Office as the International Searching Authority for International Application No. PCT/EP2020/055189.
Office Action with English translation mailed on Mar. 4, 2024, by the Japanese Patent Office for Japanese Application No. (2021-552546), 6 pages.

* cited by examiner

Figure 1: Phase Diagram
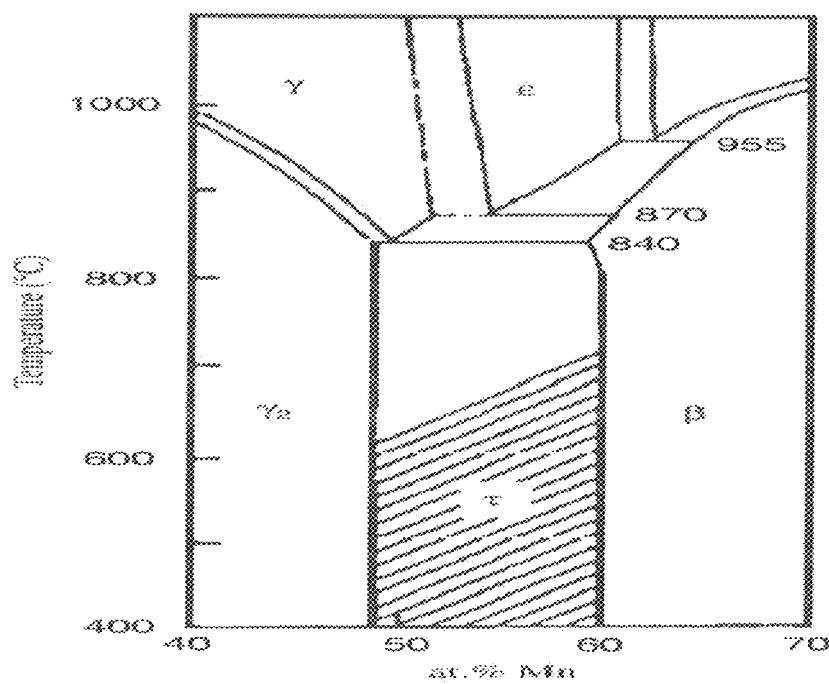
Figure 2: Relationship between theoretical magnetic moment and manganese content
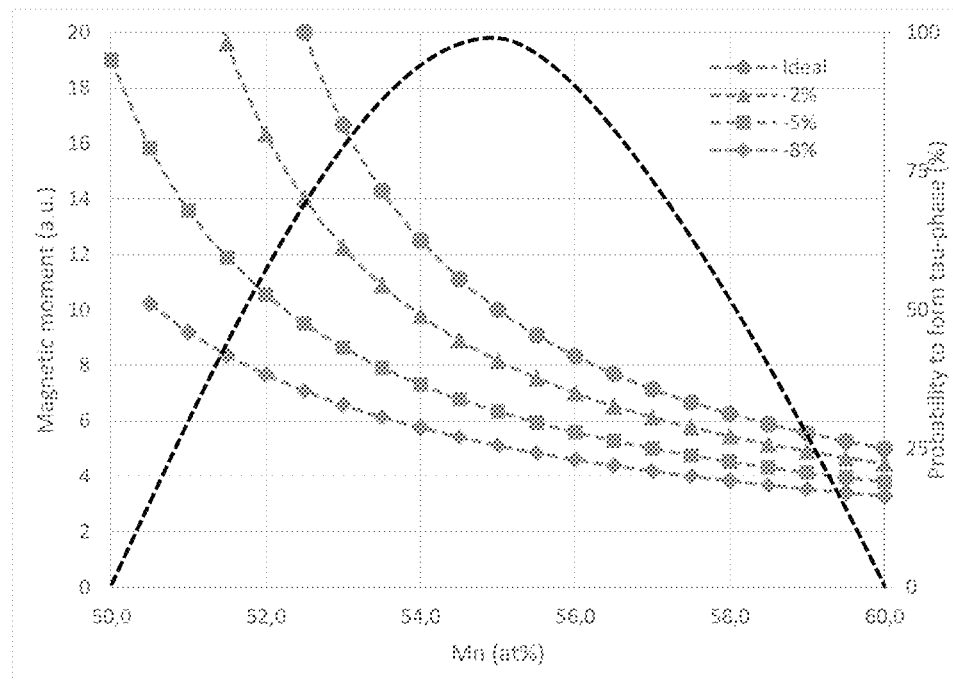

XRD and NPD patterns before flash heating
Figure 3a 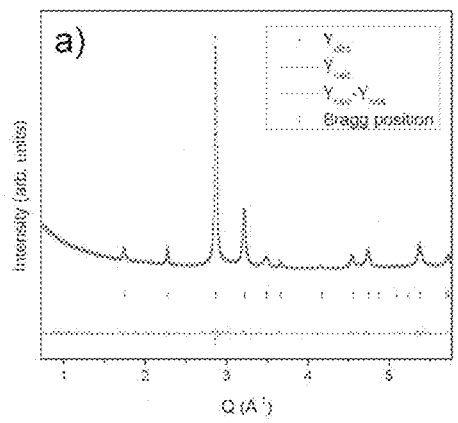 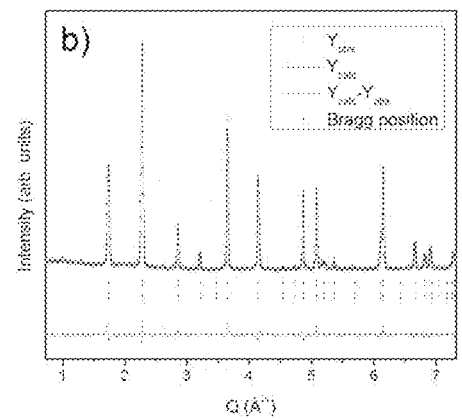 Figure 3b
Figure 3c 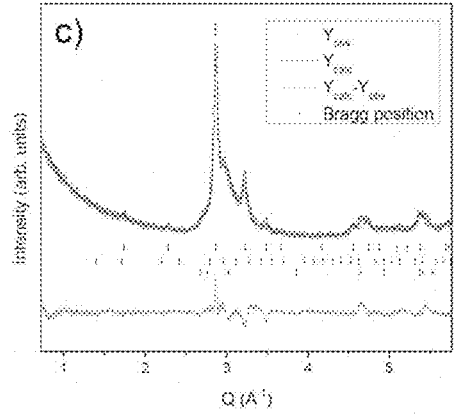 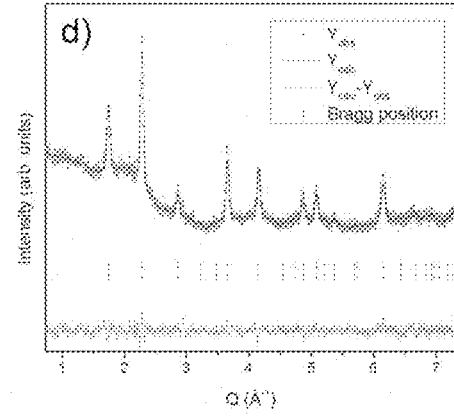 Figure 3d
Figure 3e 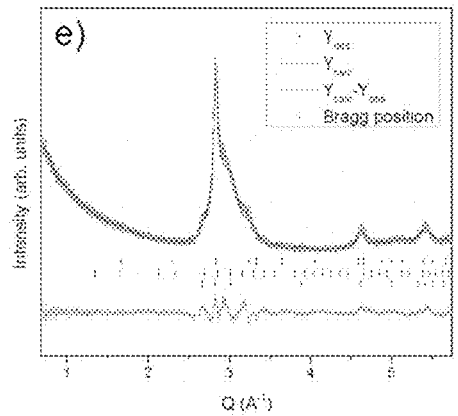 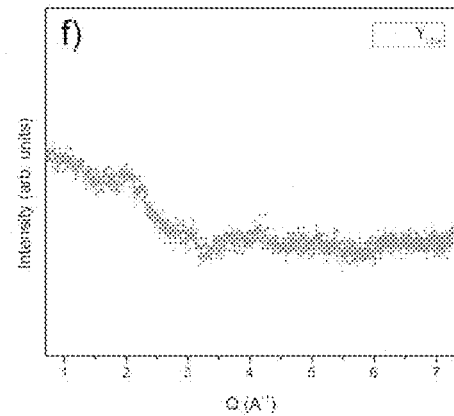 Figure 3f XRD and NPD patterns after flash heating
Figure 4a
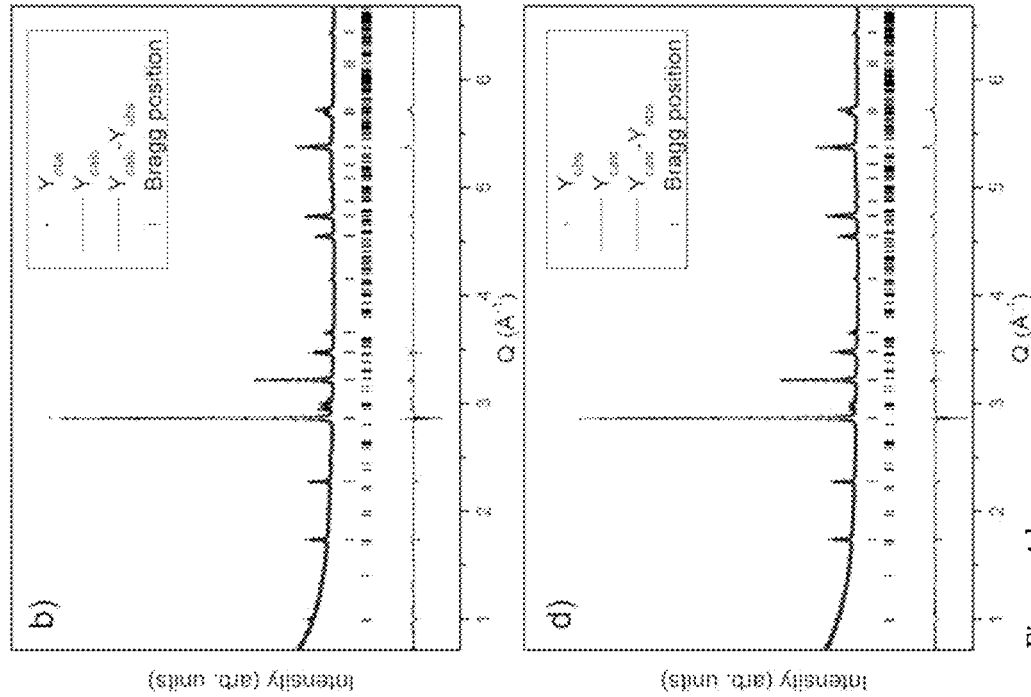
Figure 4b
Figure 4c
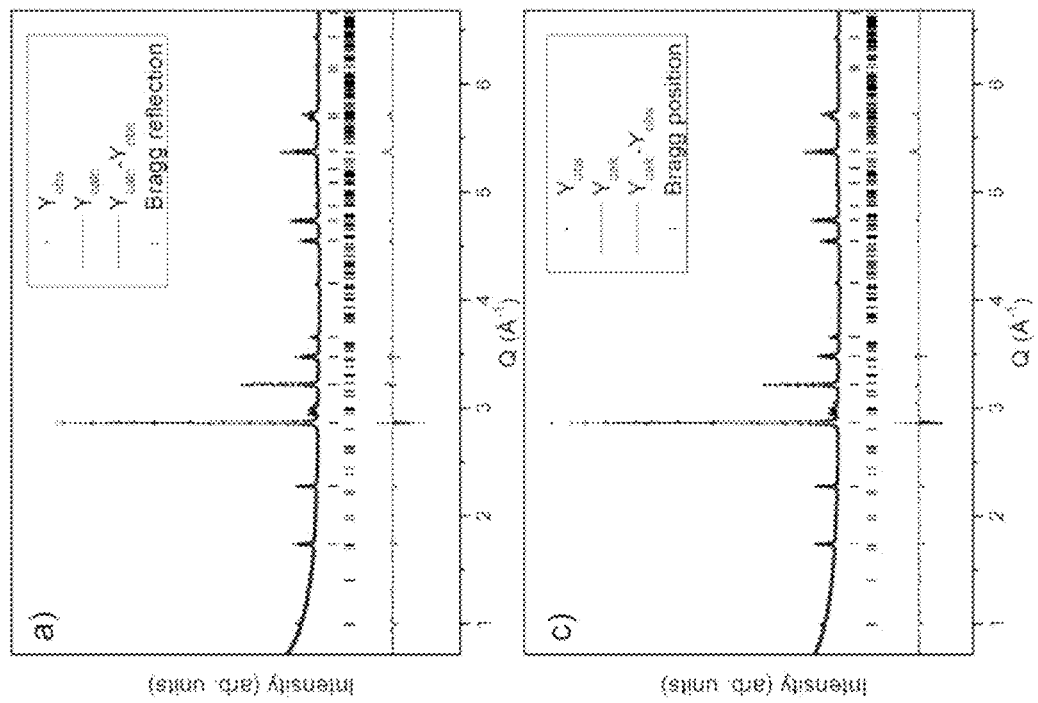
Figure 4d Magnetization vs. magnetic field for the samples of Example 1 b) Mn$_{57}$Al$_{43}$C$_{2.04}$ as-atomized a) (Mn$_{53}$Al$_{47}$)C$_{1.50}$ as-atomized d) Mn$_{57}$Al$_{43}$C$_{2.04}$ heat treated at 1100C, 30min in vacuum c) (Mn$_{53}$Al$_{47}$)C$_{1.50}$ heat treated at 1100C, 30min in vacuum Figure 16a (polarized LOM) Mn$_{55}$Al$_{45}$C$_2$(VC)$_{1.0}$
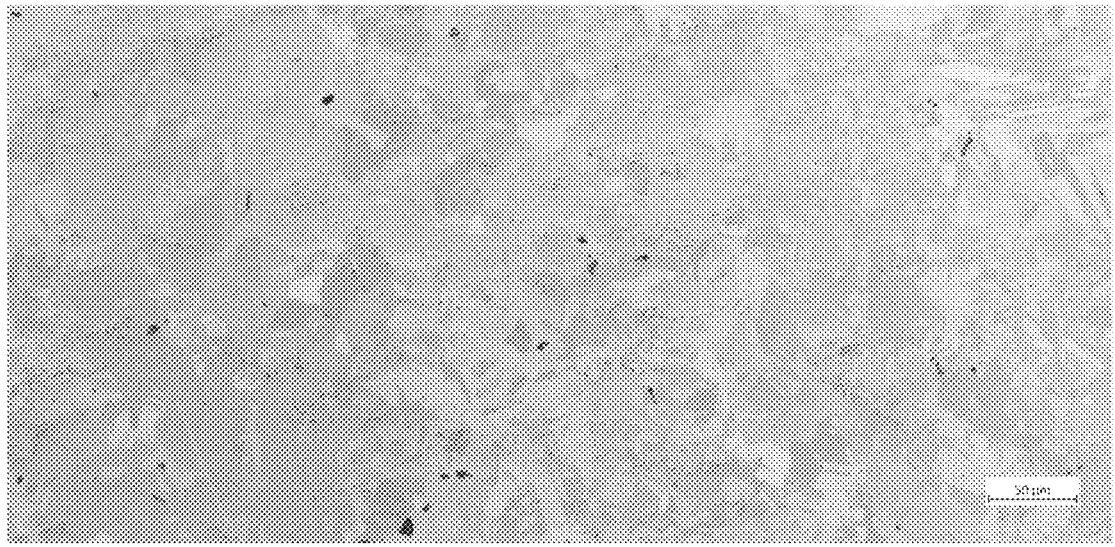
Figure 16b (reference Mn$_{55}$Al$_{45}$C$_2$)

Figure 17a  AFM 1    AFM 2
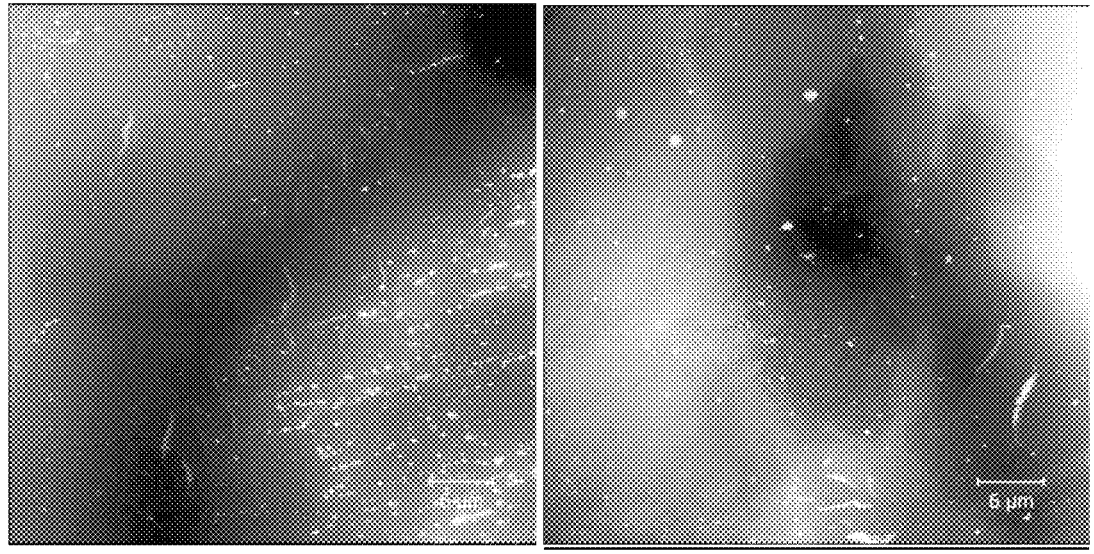
Figure 17b  MFM 1    MFM 2
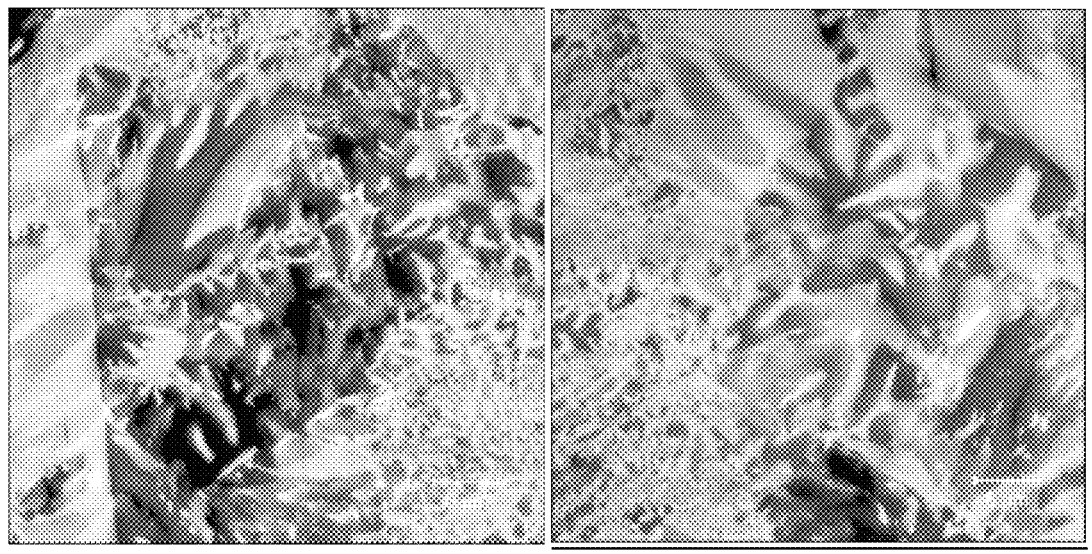

Figure 19: XRD patterns on crushed as-synthesized IM ingots
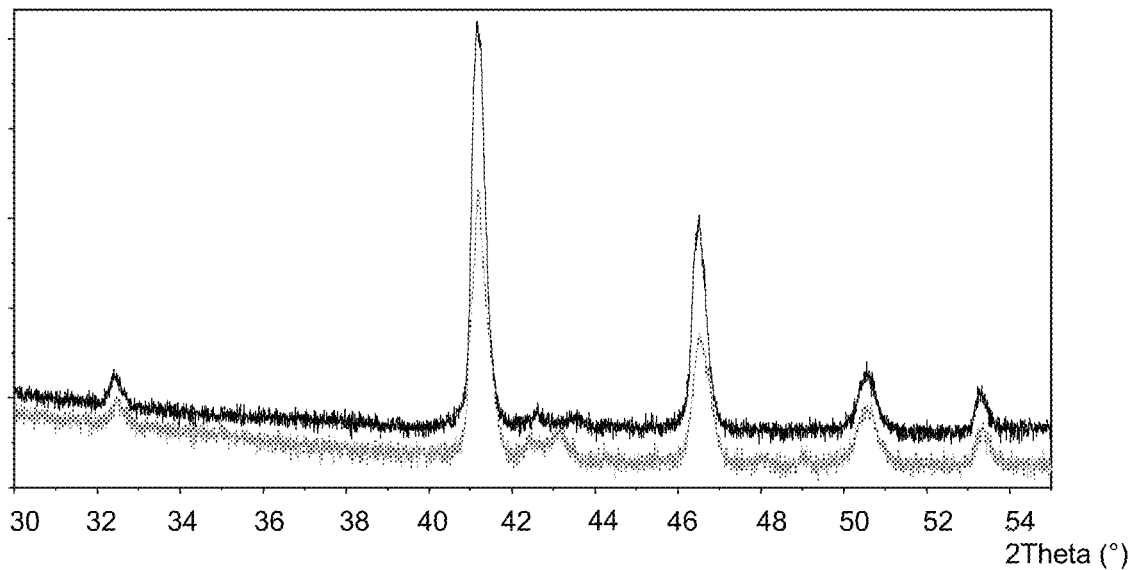
Figure 20: XRD patterns on as-milled IM ingots, 3min cryo-milling
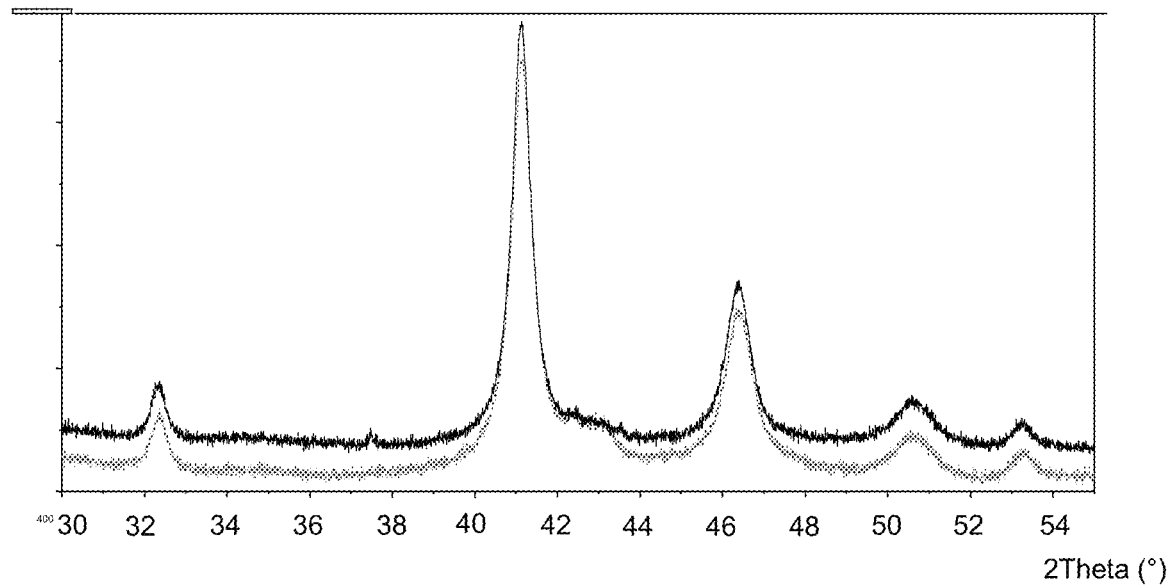

Figure 21: XRD patterns on the cryo-milled (3min) followed by annealing in argon at 550°C for 30min (Cu Kα 30-55° 2θ).
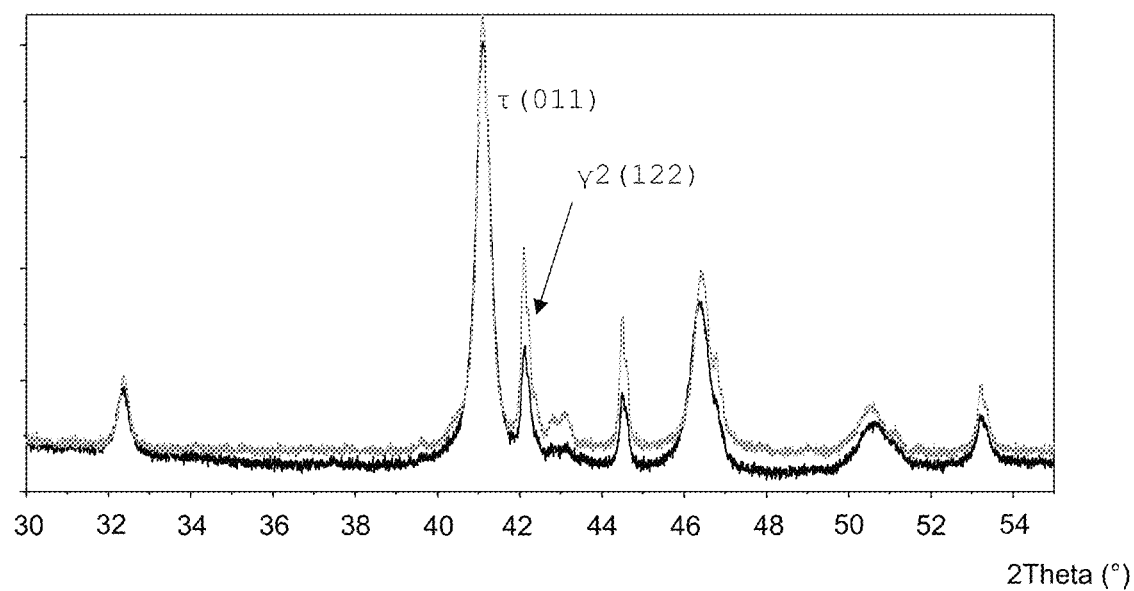

SOLID COMPOSITE MATERIAL COMPRISING NANOPARTICLES AND AN ALLOY BASED ON MANGANESE, ALUMINUM AND OPTIONALLY CARBON, AND METHOD FOR PRODUCING THE SAME

FIELD OF THE INVENTION

In the most general terms, the present invention relates to improvements in the field of magnetic materials and magnets and precursor materials for magnetic materials and magnets, as well as to methods for producing or processing such materials. Specifically, the present invention concerns solid composite materials comprising nanoparticles and an alloy based manganese, aluminum and optionally carbon, such as manganese-aluminum (MnAl) alloys optionally containing carbon and being predominantly present in the τ phase or ε phase. The present invention aims at obtaining such materials with improved properties, such as improved magnetic properties or improved crystallographic (X-Ray) phase purity.

In one aspect, the present invention relates to solid composite material that comprises nanoparticles made from a material X and a manganese-aluminum (MnAl) alloy optionally doped with carbon that has a high content of τ phase or ε phase, as well as methods for its production. The solid composite material may be present in particulate form. The invention further relates to a shaped article that is obtained by processing the solid particulate composite material into a shaped object. The shaped object can be used as a magnet, e.g. in electric or electronic devices.

BACKGROUND OF THE INVENTION

Magnetic materials are used in many industrial electric or electronic applications and devices, such as speaker systems, earphones, direct current electric motors in battery (primary or secondary cell) powered devices, wind generators etc., just to mention a few.

Such magnetic materials are however expensive, and furthermore generally comprises rare earth (RE) metals. The mining and refining of such rare earth metals is commonly related with high processing cost, environmental burden and health concerns. Accordingly, these conventional magnetic materials lead to both high costs and high environmental burden. There is thus a desire for a replacement of these rare earth metal-based magnetic materials.

The low cost, rare earth free τ-phase of MnAl alloys has magnetic properties, and is currently considered to have potential to replace currently used magnets, such as bonded $Nd_2Fe_{14}B$ rare earth permanent magnets. MnAl based magnetic materials (~50-60 at. % Mn) with the $L1^0$-type structure (τ-phase) have in particular great potential to become a high performance permanent magnet material at low cost, if a suitable processing route could be developed.

The room temperature stable phases in the MnAl phase diagram include γ2 ($Al_8Mn_5$), β (Mn) and the ferromagnetic τ-phase (see FIG. 1). The most common approach for synthesizing τ-phase MnAl alloys is by rapid quenching the high-temperature ε phase, followed by a heat treatment between 350 and 650° C. However, the τ-phase is metastable, and it is difficult to obtain MnAl alloys containing the τ-phase in high purity. So far, various heat treatments have been employed in order to obtain and preserve the τ-phase.

Oftentimes the τ-phase decomposes spontaneously, in particular upon further processing involving e.g. strain and/or elevated temperatures, and it is difficult to obtain pure τ-phase of high quality. This is in particular a problem if one wants to obtain powders of the alloy suitable for a permanent magnet. Ideally, the particles forming the powder should be single-crystalline and should exhibit domain-pinning. To this end, the material is typically milled. Yet, milling may require very small particles in order to reach single-grain particles (with consequently low purity) to make the particles worthwhile to magnetically align. This may in turn give rise to handling and compaction-related problems.

The powders should thus be very fine, and most preferably there is only one grain (crystal) per particle, as this improves alignability and hence magnetic remanence. Yet, currently used processing methods for producing a powder form of the alloy (such as ball milling) distort the structure and partially destroy the τ-phase. Thus, a method that is able to yield nanoparticles with a high content of τ phase could facilitate the manufacture of a powder that could be more easily aligned while maintaining favorable magnetic properties.

As derivable from FIG. 1, in a pure Al/Mn system, the τ-phase can only exists between about 49 to 61 atom % Mn, the remainder being Al and unavoidable impurities. Further, as indicated by the hyperbolic dotted line in FIG. 2, the likelihood to form the τ-phase in binary compositions of Mn and Al is greatest at 54-56 atom % Mn. At the same time, the theoretical magnetic moment of the material is higher for compositions containing less Mn.

It has also been reported that the presence of dopants such as carbon or boron can stabilize the τ-phase and facilitates the formation of an alloy resulting in an improved saturation magnetization, Ms. Further, Ms has also been reported to increase with carbon. These advantages are in part outbalanced by disadvantages. For instance, the Curie temperature and anisotropy field of doped alloys are lower than those of undoped alloys. A further study using carbon, boron and carbon-boron doped MnAl alloys of the stoichiometry $Mn_{54}Al_{44}C_2$, $Mn_{54}Al_{44}B_2$ and $Mn_{54}Al_{44}B_1C_1$ and their behavior in mechanical milling steps is described in the Master thesis of Timothy E. Prost (University of Nebraska-Lincoln, Dept. of Mechanical & Materials Engineering, 2012).

In view of the above, it is evident that most of the research done up do date has been devoted to MnAl alloys having a Mn content of 55 atom % or less, and containing no or only very little dopant, in order to obtain a material that maintains a t-phase that has high magnetic moment as well as highest possible Curie temperature. As one example, Z. Shao et al. describe in "One step preparation of pure t-MnAl phase with high magnetization using strip casting method" (AIP ADVANCES 7, 056213 (2017) the preparation of τ-phase MnAl alloys having a composition $Mn_{54}Al_{46}$. Reported is here also on the attempt to prepare t-phase by strip-casting compositions of $Mn_{52}Al_{48}$ and $Mn_{56}Al_{44}$. While the t-phase could be successfully synthesized for $Mn_{52}Al_{48}$ and $Mn_{54}Al_{56}$, it is reported that the strip-casted $Mn_{56}Al_{44}$ tends to form other samples, i.e. γ2 and β. All materials showed increasing amounts of γ2 and β after grinding. The material having the highest saturation magnetization (Ms) was $Mn_{54}Al_{46}$ strip, i.e. prior to grinding, exhibiting 114 emu/g (at 5 Tesla).

H. Fang et al reported that the t-phase can be obtained by directly casting $Mn_{54}Al_{46}$ and $(Mn_{0.55}Al_{0.45})_{100}C_2$ (see Journal of Solid State Chemistry 237 (2016) 300-306) using a drop synthesis method involving a rapid cooling from 1400° C. of the melt to room temperature in 10 minutes.

Here, the highest Ms of 111 emu/g (at 9T) was obtained in the system of $(Mn_{0.55}Al_{0.45})_{100}C_2$.

The document further teaches that the crystalline order in the MnAl system is crucial for the magnetization, and that surplus Mn yields a "built in" disorder since on average 10% of the Mn atoms occupy the Al sites and interact antiferromagnetically with the Mn on the (0,0,0) sites. This is illustrated in FIG. 2. Here, the lines for "2%, "5%" and "8%" illustrate how the magnetic moment is influenced by the amount of misplaced Mn, i.e. where 2, 5 or 8% of the Al sites are replaced by Mn atoms, as compared to the ideal case. The ideal case for a 55% Mn/45% Al alloy is that 10% of the Al-sites are occupied by Mn atoms. Thus, for this composition 5% mismatch means that 15% Al-sites are taken by Mn.

Fang further suggests that the stability region of the β phase extends further than previously expected, extending up to 46 at % Al (corresponding to 54% Mn), in particular for materials that are processed subsequently by mechanical treatments such as high energy ball milling.

A comparison of τ phase MnAl prepared via different routes was provided by A. Chaturvedi et al. in J. Phys.: Condens. Matter 26 (2014) 064201, also using materials having the stoichiometric composition $Mn_{54}Al_{46}$. The materials were either gas atomized from the melt under argon, cast into ribbons using melt spin casting under argon, or by pouring the molten alloy onto the face of a cooled copper dish rotating at high speed under argon, thereby forming alloy droplets. The gas atomized material contained about 66% of the ε phase, and β and γ2 were also present. The document further states that annealing of milled powder (i.e. the material obtained after gas atomization of the melt and additional milling thereof using a water-cooled Union Process 1SD Svegari attritor) transforms the ε phase to the τ phase, yet the equilibrium γ2 and β phases are still present in essentially the same amounts as before annealing. It is further described that in milled materials the cooling rates of powders appears to be so high that the formation of the high temperature phase does not occur, and that β and γ2 form directly from the melt. It is concluded that the τ phase would not form this way, since it transforms from the ε phase and not directly from the melt.

The τ phase is thus usually prepared by transforming the ε phase. Various mechanism for the transformation of the ε phase into the τ phase have been proposed, and in fact different mechanisms may be involved. In 2002, Yanar et. al. suggested (*Metallurgical and Materials Transactions A*, vol. 33A, pp. 2413-2423, August 2002) that the transformation follows a "massive" mode, compositionally invariant diffusion and growth process that migrates by incoherent interphase interfaces. Yet, the transition may also occur in a displacive mode.

One problem that is currently encountered with such materials is that generally small particles of the materials are needed for subsequent processing, and a reduction in particle size may also be desired in order to improve the magnetic properties, potentially reducing the grain size to that of single magnetic domain. While such particle size reduction steps typically increase the coercivity (Hc), this is generally associated with an undesired reduction in the saturation magnetization (Ms). Another approach to obtain a material with improved coercivity is described by Si, P., Qian, H., Wang, X. et al. Journal of Elec Materi (2019) 48: 794 by using high pressure compaction of melt spun ribbons, which is believed to lead to grain refinement. While the material prior to compaction had high magnetization of 122 $Am^2/kg$ at 8 T and low coercivity of 0.13 T (1.3 kOe), the material after compaction had a coercivity of 0.38 T (3.8 kOe) but lower magnetization (less than 45 $Am^2/kg$). The authors also note that Hc of the MnAl melt-spun ribbons is larger than that of MnAlC melt spun ribbons, which was ascribed to the presence of large amounts of impurities that might act as pinning centers for magnetization reversal.

It is thus derived from this document that the amount of impurities such as carbon should be kept low in order to achieve high coercivity, yet this would ultimately go at the expense of the stability of the phase and consequently result in low τ phase purity and poor magnetic saturation, as already discussed above.

Another mechanism to increase coercivity is to build up a high density of defects and a high level of internal strain, without decomposing the metastable τ phase, as described by Lu, W. Niu J., Wang, T. et.al Journal of Alloys and Compounds (2016) 675: 163 by using low-energy mechanical milling on melt-spun ribbons. The reported properties are a saturation magnetization of only ~62 $Am^2/kg$ and coercivity of ~5 kOe. However, as the strain is easily reduced upon exposure to heat (as often necessary for the fabrication of a magnet) the coercivity is also lost correspondingly. Alternatively, the powder can be used to produce bonded magnets but here the magnetic saturation would be unavoidably reduced due to dilution of the magnetic material.

Yet, ultimately a material must possess both high Ms and Hc in order to be suitable for real life applications. The prior art fails to deliver such a material, as generally there is a trade-off between Ms and Hc.

It is another problem that crystal twinning occurs in the ε and/or the τ phase. This phenomenon is for instance discussed in an article by F. Bittner et al in Acta Materialia 101 (2015), pages 48-54, describing the impact of hot extrusion on the crystal structure and the formation of crystal twins. The twin defects occur in as-transformed (i.e. after conversion from the ε into the τ phase) samples, but also, yet to a substantially reduced degree, in subsequently hot extruded samples. Another article relating to the presence, formation and the associated problems of twining and antiphase boundaries (APBs) has been published by S. Bance et al in Acta Materialia 131 (2017) 48-56, which describes a simulation that explains the experimental observations that samples with many twins have a much lower coercivity, and that a granular structure containing fine twinning drastically reduces the hysteresis loop squareness, thereby lowering the maximum energy product to only 5% of the theoretical maximum.

The presence of crystal twins and anti-phase boundaries is thus believed to be very detrimental to the magnetic properties, as the orientation of the twinned crystals may be anti-parallel ("true twin"), so that the magnetic properties level out and have opposite directions. It would thus be desirable to avoid the formation of crystal twins and anti-phase boundaries upon formation of the ε and/or τ phase, as this would improve the magnetic properties.

OBJECTS OF THE INVENTION

It is an object of the present invention to provide a material having improved magnetic properties. Herein, "improved magnetic properties" in particular means high magnetization Ms and/or high coercivity Hc.

In a related aspect, it is an object of the present invention to provide a material having a high content (or high purity) and/or quality of the τ phase, in particular (but not limited to) MnAl alloy materials in powder or particulate form. Here, the term "quality" in particular includes the aspects of homogeneity of the microstructure of the τ phase as well as a low mismatch of the site occupancy (i.e. ideal or close-to-ideal site occupancy by Mn and Al in the crystal lattice). The term "quality" also relates to the absence or reduced amount of crystal twins and/or anti-phase boundaries in the ε and/or τ phase.

The present invention also aims at providing a method that is capable of providing such materials, in particular a method that is industrially useful. It is a further object of the present invention to provide an improved method for converting the ε phase into the τ phase, to thereby obtain a solid magnetic material having improved magnetic properties.

It is yet another object of the invention to provide a material based on an alloy of Mn, Al and optionally C able to form τ or ε phase, which is relatively robust towards further processing steps and/or towards variations in the synthesis conditions such as cooling rate from the melt, and still leads to high purity of ε phase, and subsequently τ phase formed therefrom. Herein, the τ phase shows a favorable microstructure, thereby allowing to obtain a material with improved magnetic properties.

It is yet another object of the present invention to provide an improved synthesis route that includes a proper composition of an MnAl alloy as well as a preparation process including a suitable quenching (cooling) rate from the melt, ensuring a microstructure suitable for preparing high purity ε and subsequently τ phase. The resulting material is in particular suitable for later micronization steps, which are known to show the tendency to deteriorate the τ phase.

It is a further object of the invention to provide a material based on an alloy of Mn, Al and optionally C, preferably in particle form, showing simultaneously both high magnetic saturation (Ms) and high coercitivity (Hc), as well as a method for its production.

It is a further object of the invention to provide a method able to reduce the formation of unwanted crystal twins and/or anti-phase boundaries of τ phase crystals and/or ε phase crystals, and to provide a material that has a reduced tendency to form crystal twins and/or anti-phase boundaries of τ phase crystals and/or ε phase crystals.

It is a further object of the invention to provide for a micronization process that can reduce the particle size and reduce grain size, and which allows the microstructure to become randomized and homogenized while also allowing for suitable magnetic properties.

Another object of the invention is to provide small crystals exhibiting no or little twinning and anti-phase boundaries. If such particles could be provided, this may in turn allow for a milder micronization process (owing to a potentially higher hardness and brittleness), thereby opening the potential to work with a relatively coarse powder with crystals of higher quality for the magnetization in an applied magnetic field. Alignment of powder before e.g. compaction processes would result in improved magnetic properties in terms of yet higher magnetic remanence and coercivity.

It is also an object of the present invention to provide means for increasing the stability of the τ phase during milling, and also to provide a material that requires less or milder milling operations in order to achieve the same or similar domain pinning effect as is obtained with currently used milling techniques. It is also an object of the present invention to provide a material that has higher hardness, and that could withstand subsequent processing and manufacturing operations while still providing improved or identical magnetic properties as compared to known alloys based on manganese, aluminum and carbon.

In yet another aspect, it is an object of the present invention to provide means for obtaining an MnAl alloy containing τ phase having high magnetic saturation before a micronization process, and preferably also high magnetic saturation and coercivity after the micronization process.

SUMMARY OF THE INVENTION

All aspects of the present invention aim at providing materials and/or methods for their production that either have favorable magnetic properties themselves, or which are favorable precursor materials for preparing materials having favorable magnetic properties.

The present invention solves one or more of the above objects specifically by the following aspects:

1. Solid composite material comprising an alloy based on manganese, aluminum and optionally carbon, and dispersed nanoparticles made from a material X, the material X being different from manganese, aluminum, carbon or a mixture thereof and satisfying the following requirements:
   a. the melting temperature of the material X is 1400° C. or higher, preferably 1500° C. or higher; and
   b. the material X comprises a metal.
2. The solid composite material according to item 1, wherein the amount of the dispersed nanoparticles made from the material X is 15% by weight or less, preferably 10% by weight or less, such as 5% by weight or less, relative to the total weight of the solid composite material including the nanoparticles, according to the expression:

amount of the dispersed nanoparticles (%)=[weight of the dispersed nanoparticles]/[total weight of the magnetic solid material including the dispersed nanoparticles]×100

3. The solid composite material according to any one of items 1 and 2, wherein the material X is selected from the group consisting of metals, metal carbides, metal nitrides, metal borides and combinations thereof, and wherein preferably the material X is selected from the group consisting of transition metal carbides, transition metal borides and transition metal nitrides, more preferably transition metal carbides.
4. The solid composite material according to any one of items 1 to 3, wherein the material X is selected from the group consisting of vanadium carbide, zirconium carbide, titanium carbide and chromium carbide and titanium nitride, preferably vanadium carbide.
5. The solid composite material according to any one of items 1 to 4, wherein the alloy present in the solid composite material has a composition of the following formula I:

$(Mn_xAl_y)C_z$     (I)

wherein
   x=52.0 to 59.0
   y=41.0 to 48.0
   x+y=100, and
   z=0.1 to 3.0
6. The solid composite material according to any one of item 5, wherein x=54.0 to 57.0; y=43.0 to 46.0; and z=1.0 to 1.9.
7. The solid composite material according to item 5 or 6, wherein the ratio of x to z (x/z), is in the range of 26 to 33, preferably 28 to 30; and/or wherein x=56.5 to 58.5 and y=41.5 to 43.5, preferably x=57.0 to 58.0 and y=42.0 to 43.0.

8. The solid composite material according to any one of items 1 to 7, wherein the average particle diameter of the nanoparticles is 500 nm or less, preferably 300 nm or less.

9. The solid composite material according to any one of items 1 to 8, which is magnetic and preferably has a saturation magnetization Ms of 68 Am$^2$/kg or more, such as 70 Am$^2$/kg or more, preferably 75 Am$^2$/kg or more, more preferably 80 Am$^2$/kg or more, and a coercivity Hc of 70 kA/m or more, such as 90 kA/m or more, preferably 95 kA/m or more, more preferably 100 kA/m or more.

10. The solid composite material according to any one of items 1 to 9, which is in the form of particles having a median particle diameter D50, as determined by a light scattering method, of 5000 μm or less, more preferably 1000 μm or less, further preferably 500 μm or less, still further preferably 100 μm or less, such as in the range of 10 to 100 or 15 to 80 μm.

11. The solid composite material according to any one of items 1 to 10, which has, except for the dispersed nanoparticles made from a material X, a content of the τ phase of 80% or more, preferably 90% or more, such as 95% or more.

12. A method for producing a solid composite material as defined in any one of items 1 to 11, the method comprising:
   i. Providing a composition comprising manganese, aluminum, and optionally carbon in a molten state, as well as nanoparticles and/or one or more nanoparticle precursors;
   ii. processing the composition obtained in step i. such as to obtain solid particles containing an MnAl alloy in the τ or/and ε phase; and
   iii. annealing the particles obtained in step ii at a temperature from 350 to 700° C., preferably 400 to 650° C. or 400 to 600° C., such as from 450-550° C., for a time from 0.5 to 24 hours.

13. The method for producing a solid composite material according to item 12, wherein the steps i., ii. and iii. are conducted in this order, and wherein the temperature of the material does not exceed 700° C. from the end of step i. to the end of step iii.

14. A method for producing a solid composite material according to item 12 or 13, wherein step ii. includes a step ii.a. of gas-atomizing the material obtained from step i.

15. A method for producing a solid composite material according to item 12, 13 or 14, wherein step ii. includes a step ii.b of milling the material at a temperature of −20° C. or lower, such as −100° C. or lower, preferably −150° C. or lower.

16. Method for producing a shaped object comprising a solid composite material according to any one of items 1 to 11 or obtained by the method according to any one of items 12 to 15, which comprises a step for processing a composition comprising the composite material to a shaped object having a size of at least 1×1×1 mm or a volume of 1 mm$^3$.

17. Method according to item 16, wherein said processing to form a shaped object includes one or more selected from extrusion, compaction, additive manufacturing and plastic molding.

18. Magnetic material in shaped form, comprising the magnetic solid material according to any one of items 1 to 11 or obtainable by the method according to any one of items 12 to 17.

19. Electric or electronic device, comprising the magnetic material in shaped form according to item 18.

Further aspects and embodiments of the present invention will become apparent from the following detailed description.

BRIEF DESCRIPTION OF THE DRAWINGS

FIG. 1 Selected part of the phase diagram of the system Al—Mn

FIG. 2 Schematic diagram showing the relationship between theoretical magnetic moment and manganese content, with ideal occupation of lattice positions by Mn and Al (circles), 2% misplacement of Al sites by Mn (triangles), 5% misplacement of Al sites by Mn (squares) and 8% misplacement of Al sites by Mn (diamonds).

A small excess of manganese, and minimized reversed site occupancy (as compared to an ideal crystal phase), will result in higher magnetic moment. The hyperbolic dotted line illustrates the probability to form the τ-phase. It shows that a close to perfect τ-phase crystal (i.e. <2% site occupancy reversal of Mn-Al) at high Mn-content (ca 57 at %) could give the same magnetic moment as a low Mn-content crystal (ca 53 at %) of somewhat worse quality (>8%), thereby illustrating the need for low misplacement levels at high Mn contents if good magnetic properties are required.

FIGS. 3a-3f XRD (left) and NPD (right) patterns of materials obtained in Example 1 prior to flash heating FIGS. 4a-4d XRD (left) and NPD (right) patterns of materials of Example 1 after flash heating for 5 or 15 minutes; a) and b) show after 2 h cryo milling (CM), and c) and d show after 4 h CM.

FIGS. 5a-5d Magnetization vs. magnetic field for the materials of Example 1, specifically a) drop-synthesized (DS), b) CM 2 h and CM 4 h, c) CM 2 h flash heated 1 and 5 minutes and d) CM 4 h flash heated 1 and 5 minutes, respectively.

Figures 5A, 5B, 5C, 5D:
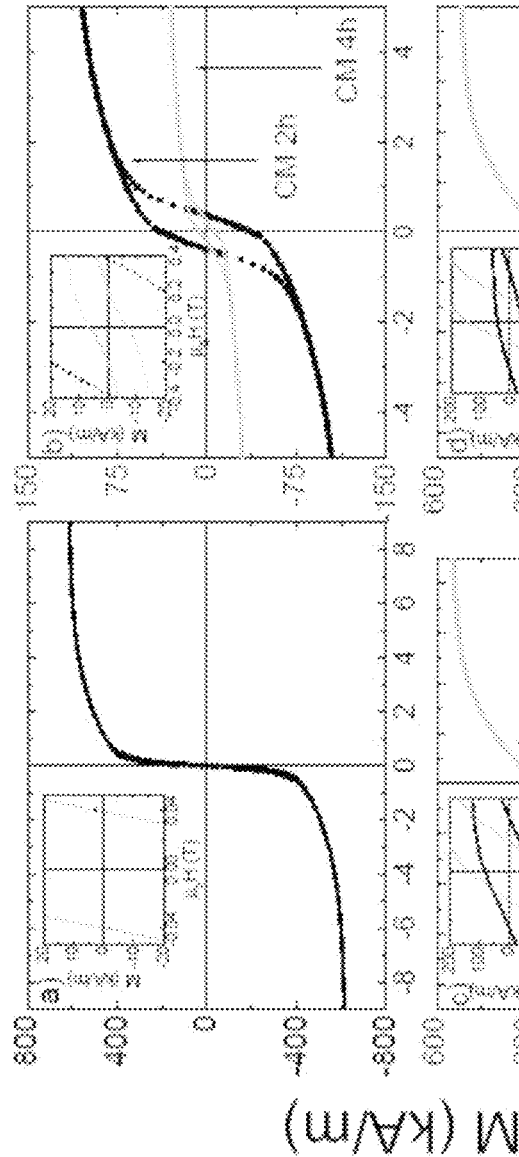
Figure 6:
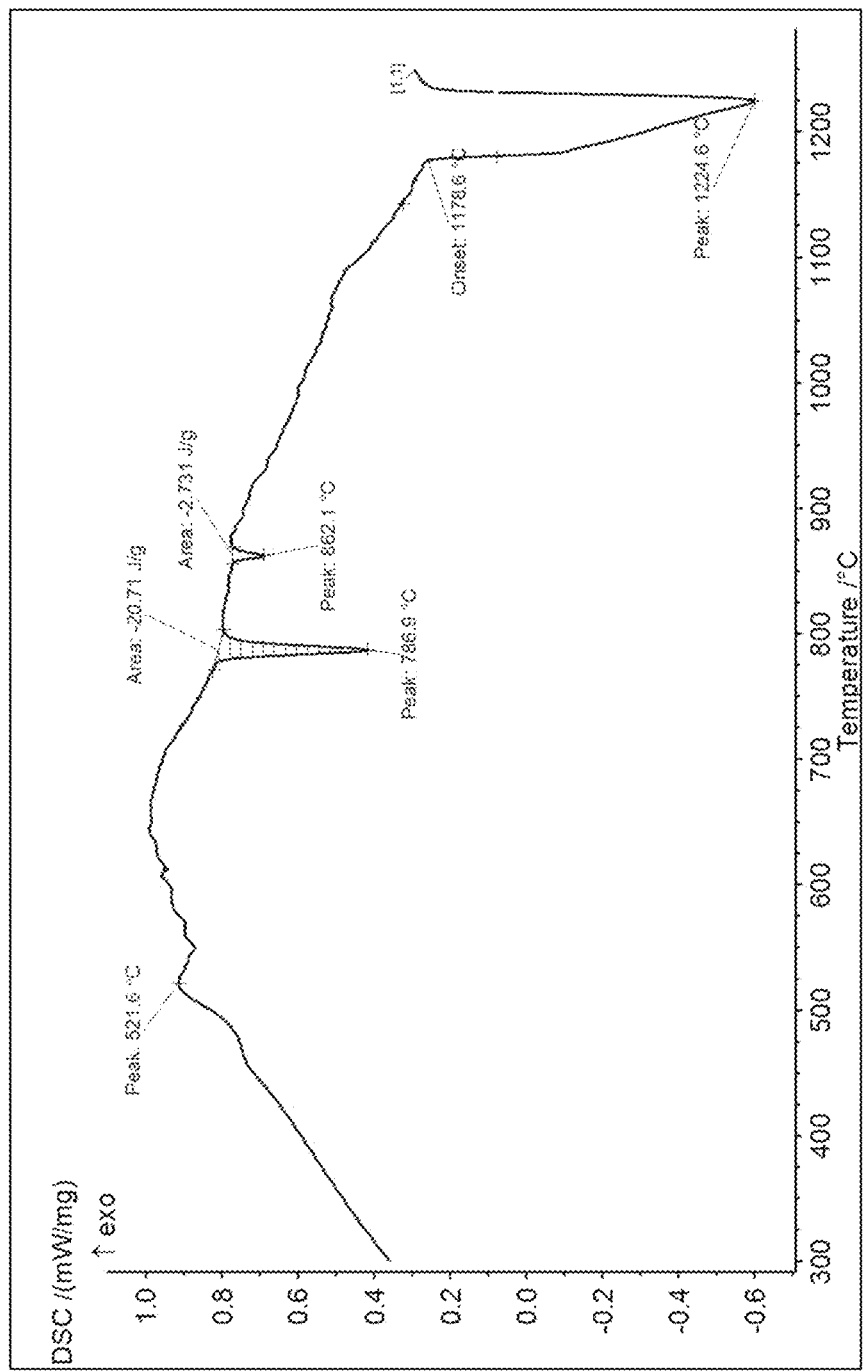
Figure 6:
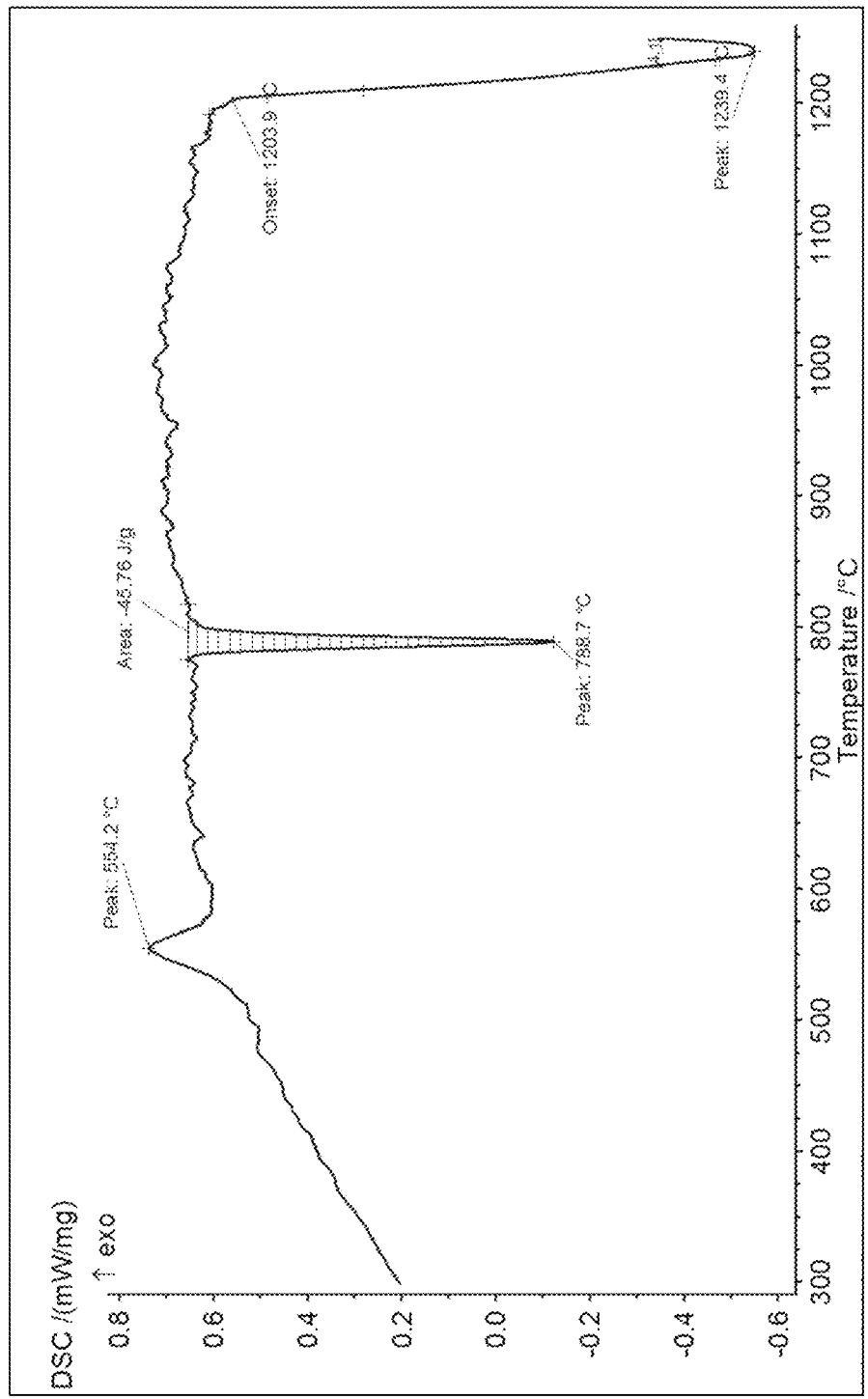

FIG. 6 DSCs graphs of materials obtained in accordance with Example 2, for a) (Mn$_{54}$Al$_{46}$)C$_{0.76}$ (Example 2-B1) and b) (Mn$_{57}$Al$_{43}$)C$_{2.14}$ (Example 2-A3)

Figure 7:
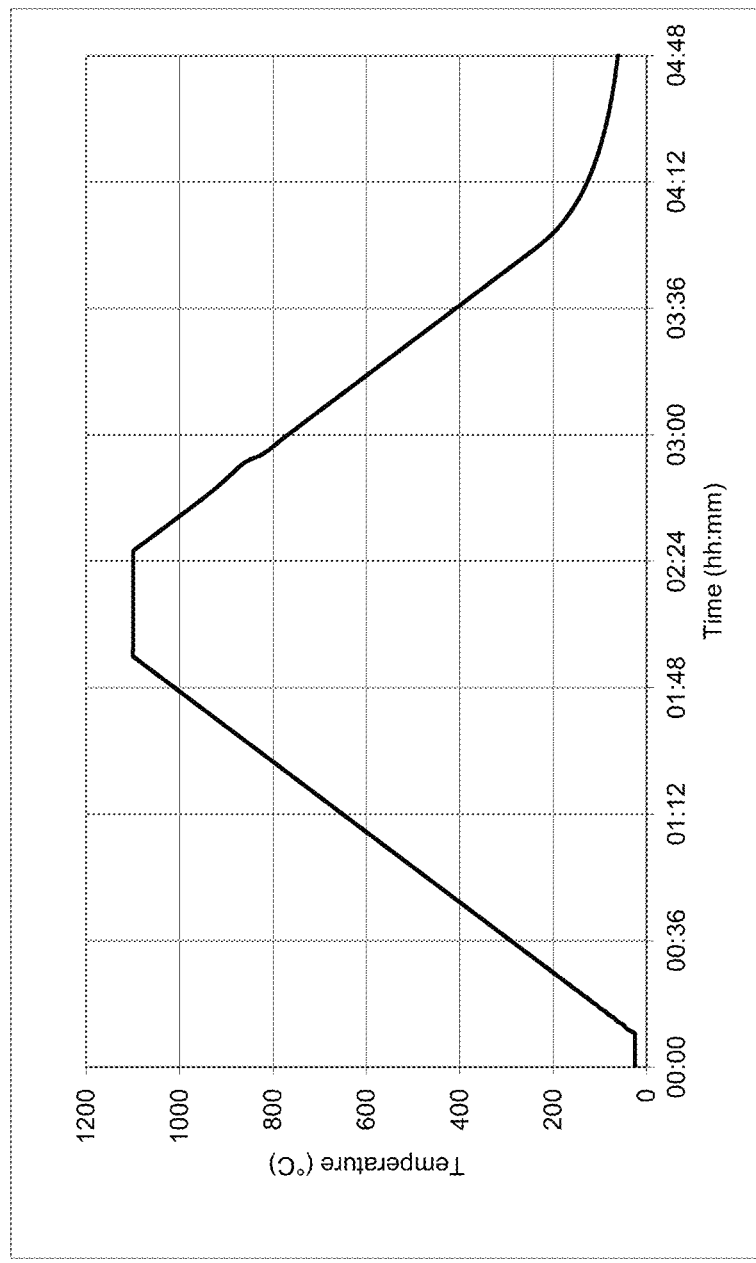

FIG. 7 Exemplary Temperature Curve for a heat treatment (step b.)

Figure 8:
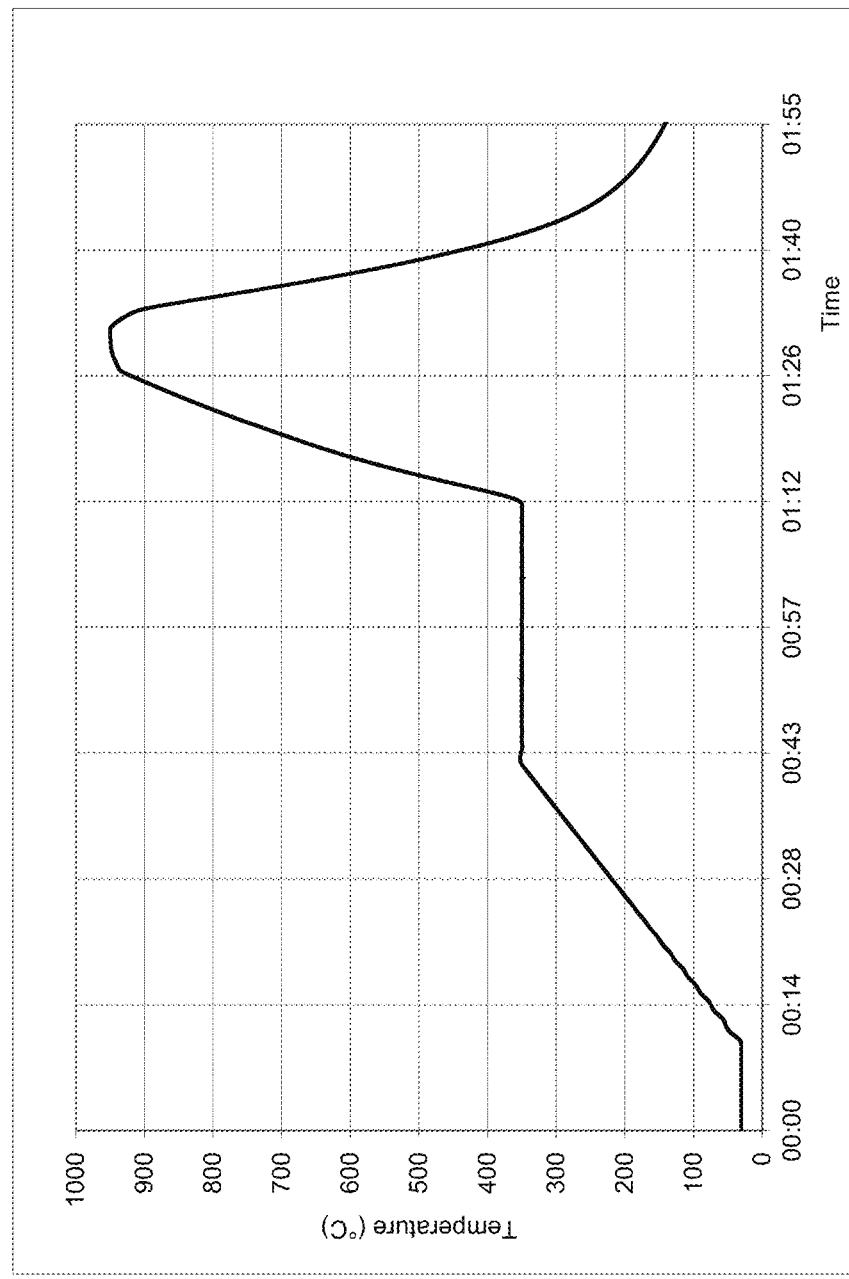

FIG. 8 Exemplary Temperature Curve for a flash heat treatment (step d)

FIGS. 9a-9g X-ray Powder Diffraction (XRPD) diagram of two samples with different stoichiometric compositions obtained after a) gas atomization from the melt, b) heat treatment at 650° C. for 3 hours under argon, c) heat treatment at 1100° C. for 30 minutes under vacuum, and d) of particles of identical stoichiometric composition prepared from particles in either ε or τ phase after milling followed by flash heat treatment.

The respective upper diagrams in FIGS. 9 a)-c) relate to a material having the composition (Mn$_{53}$Al$_{47}$)C$_{1.50}$ (Example 2-B6), and the bottom diagrams relate to a material having composition Mn$_{57}$Al$_{43}$C$_{2.04}$.

Figure 9A:
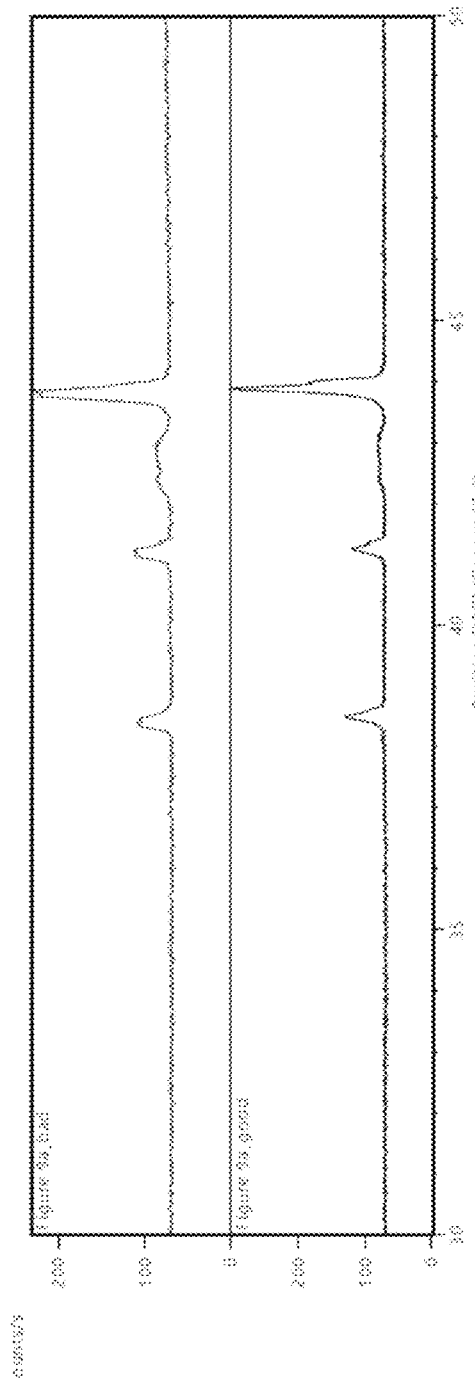
Figure 9B:
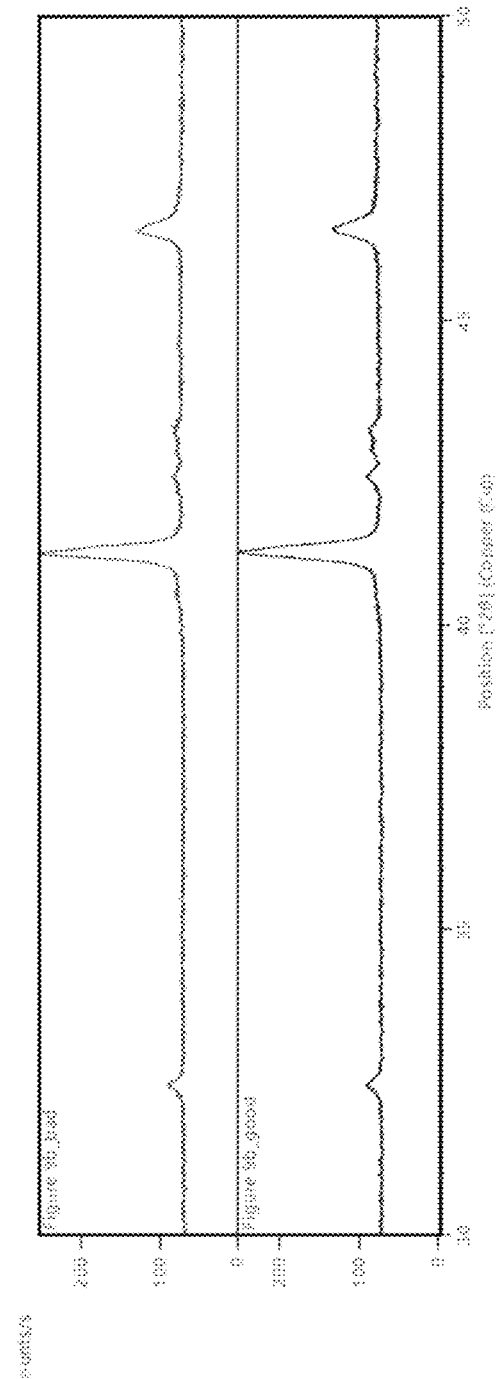
Figure 9C:
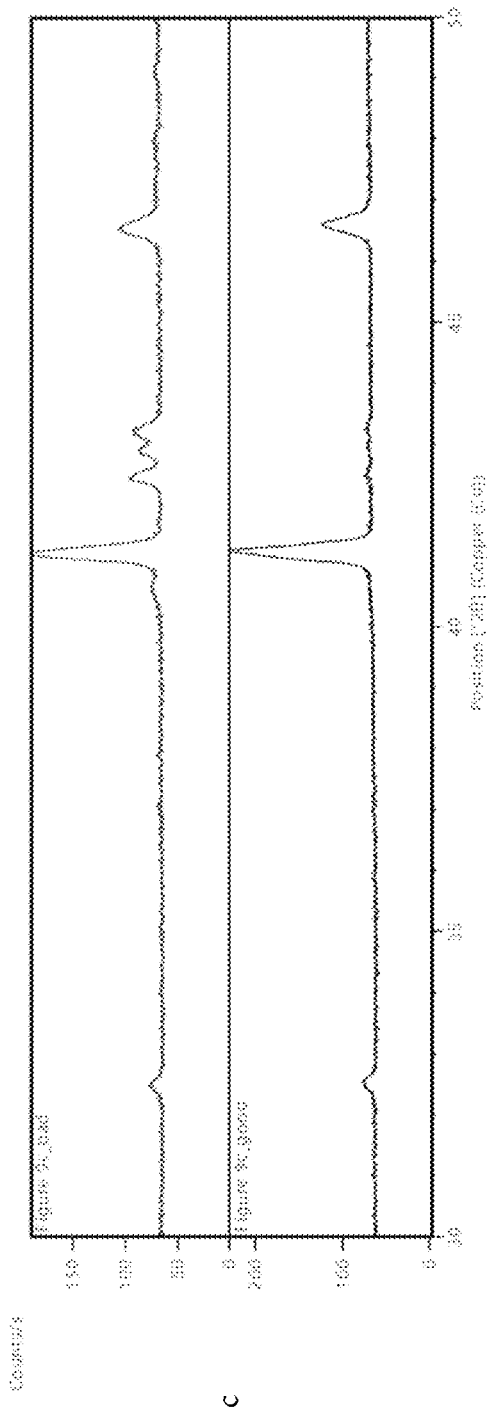
Figure 9D:
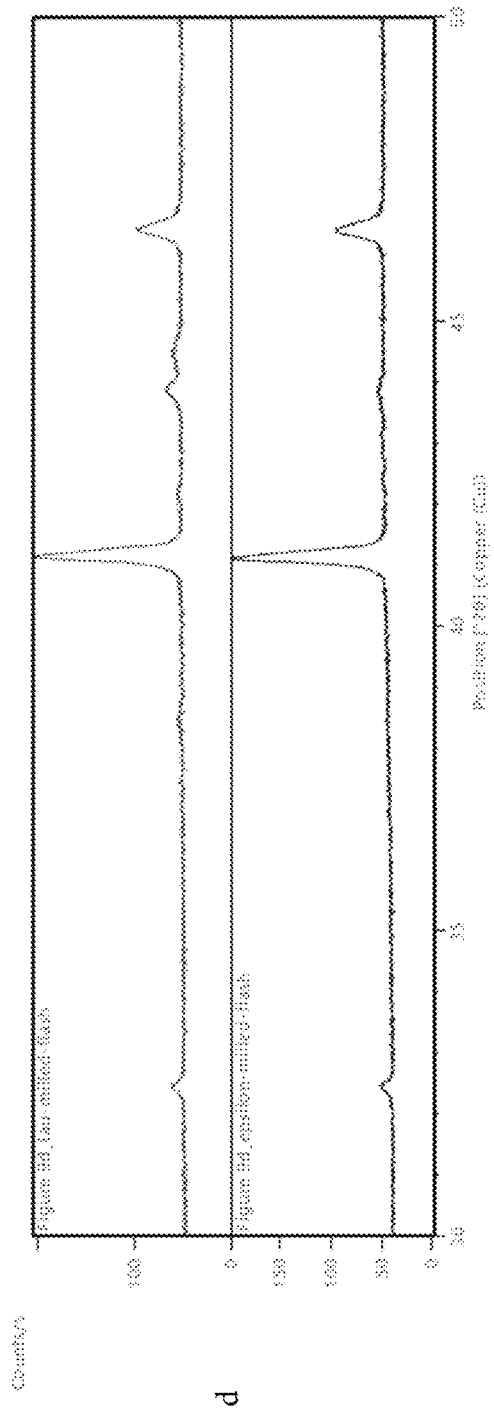

FIG. 9d shows at the bottom the XRPD data of (Mn$_{57}$Al$_{43}$)C$_{2.0}$ after gas atomization and cryo milling (milled ε phase), and at the top the XRPD of the same material, wherein between the steps of gas atomization (step a.) and cryo milling (step c.) a heat treatment for transforming the ε into the τ phase has been conducted (step b.).

Figure 9E:
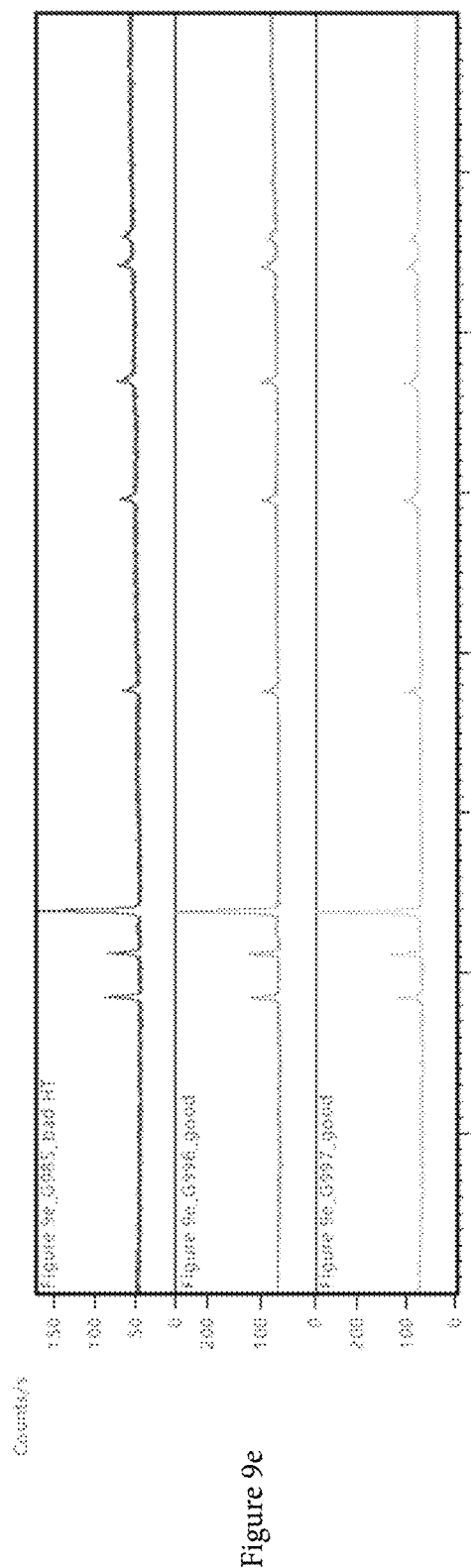

FIG. 9e shows the XRPD data of as-synthesized (gas atomized) alloys with the composition (from top to bottom) $(Mn_{59}Al_{41})C_{1.33}$, $(Mn_{56}Al_{44})C_{0.96}$ and $(Mn_{57}Al_{43})C_{2.14}$.

Figure 9F:
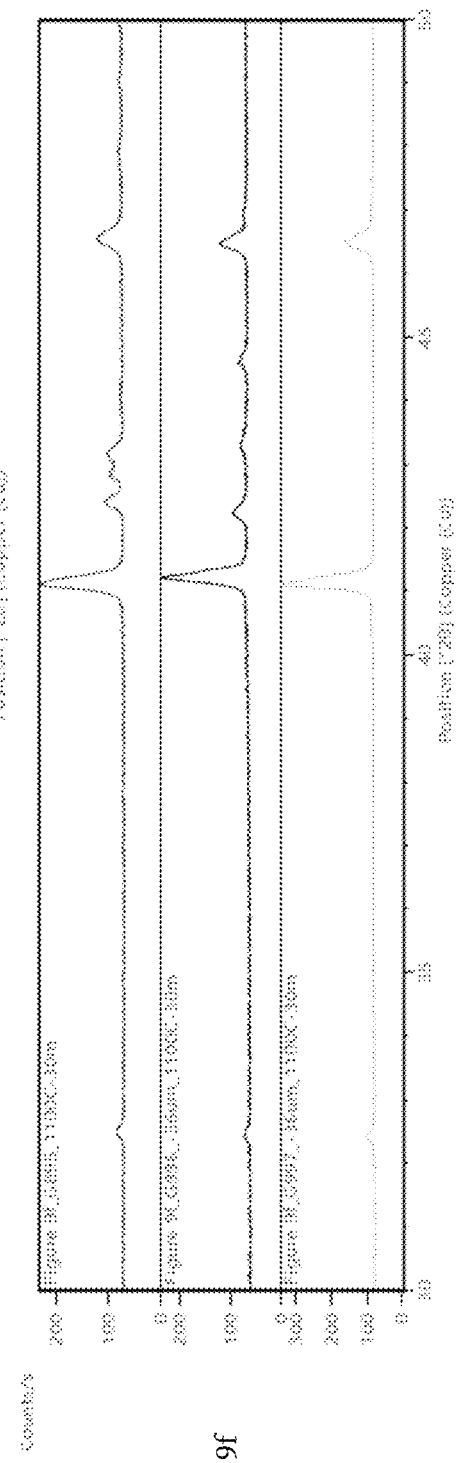

FIG. 9f shows the XRPD of a sample of high τ-phase purity (content) after heat treatment at 1100° C. for 30 minutes, produced according to present invention ($(Mn_{57}Al_{43})C_{2.14}$(bottom)), as well as the XRPD of two samples of lower τ-phase content after heat treatment of powder having composition outside the scope of formula (I) ($(Mn_{59}Al_{41})C_{1.33}$) (top) and $(Mn_{56}Al_{44})C_{0.96}$ (middle).

Figure 9G:
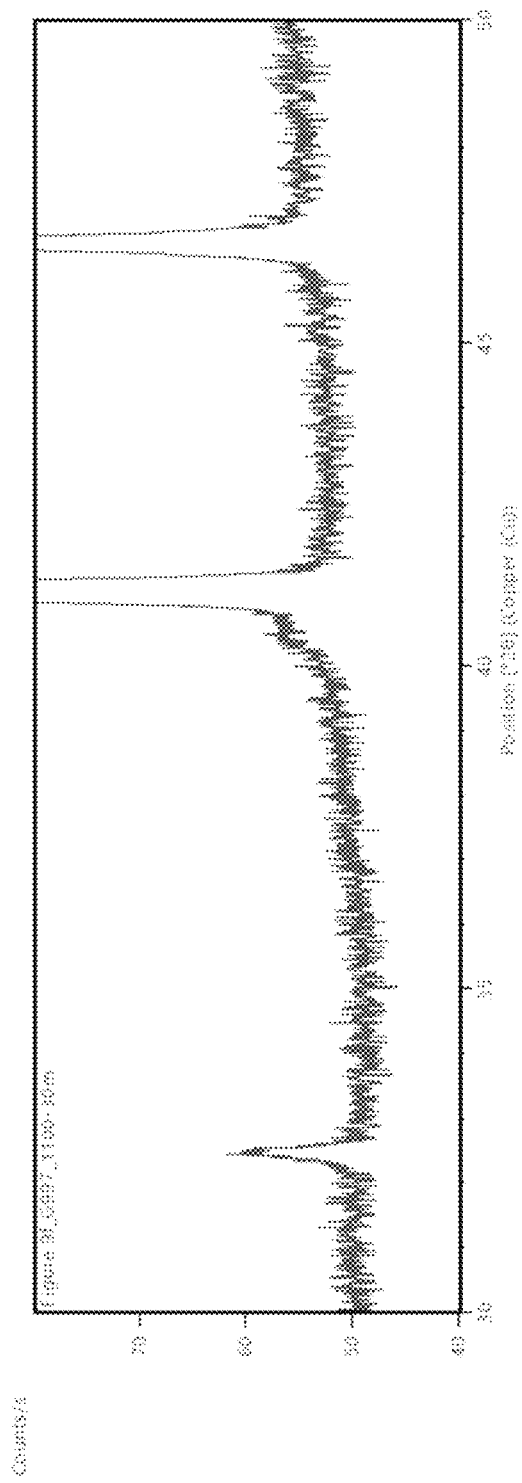

FIG. 9g: XRPD extract of a sample having the composition $(Mn_{57}Al_{43})C_{2.14}$, showing a slight excess of undissolved carbon that forms $Mn_3AlC$.

FIGS. 10a-10d SEM (Scanning Electron Microscopy) images of two samples with different stoichiometric compositions. The polished cross-sections of polymer embedded powders were prepared according to example 2.

Figure 10B:
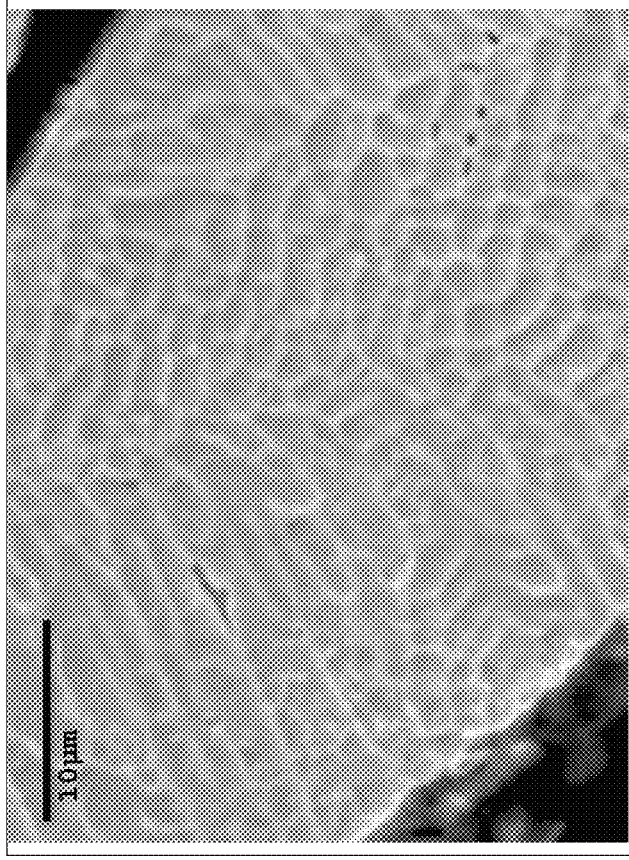
Figure 10A:
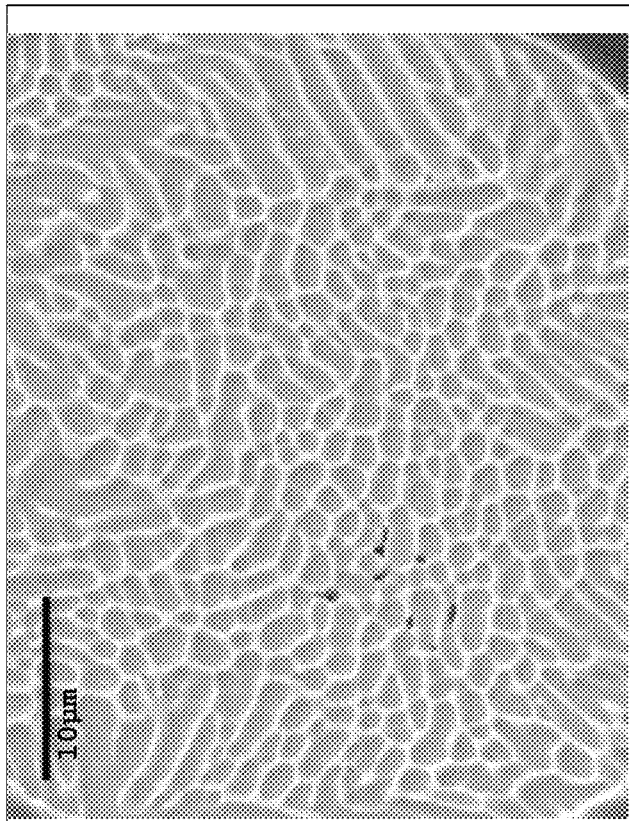
Figure 10D:
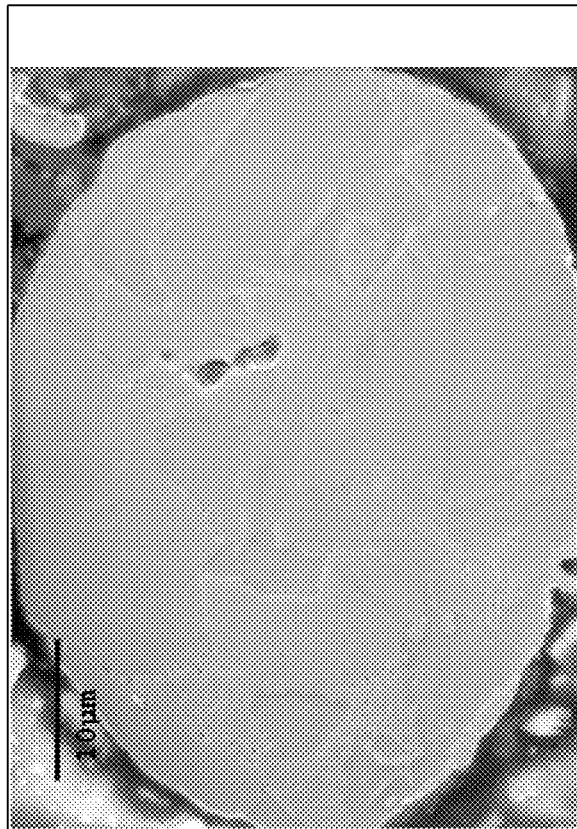
Figure 10C:
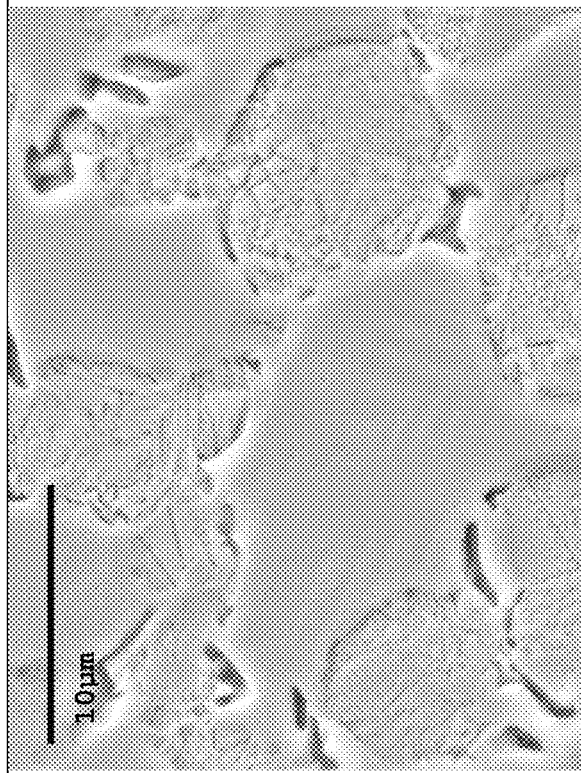
Figure 11:
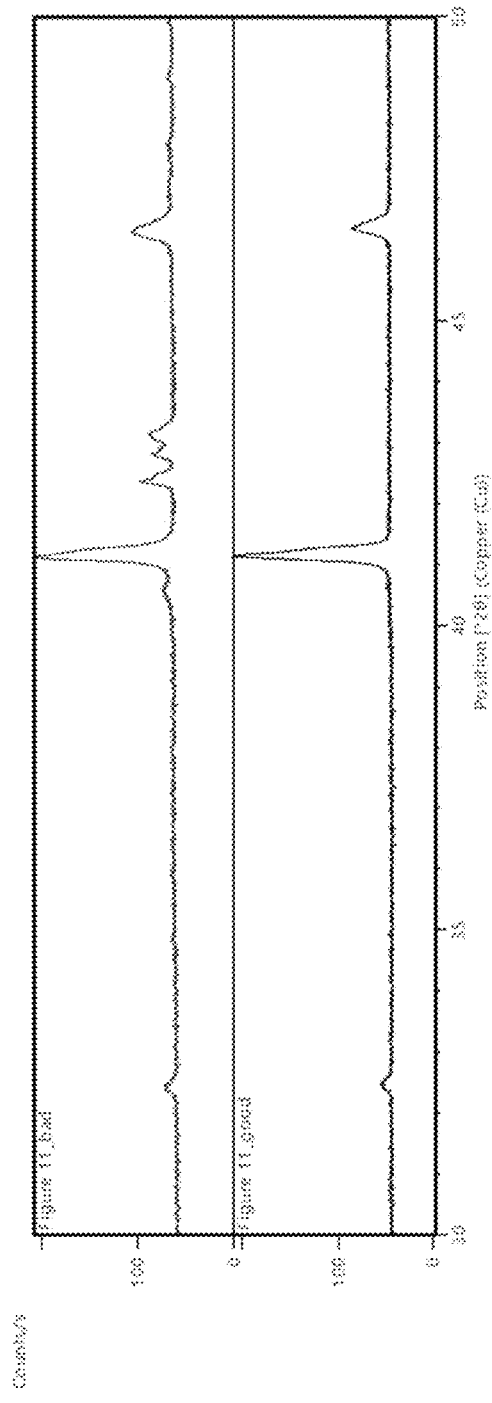

FIG. 11 XRPD of two samples with different stoichiometric compositions obtained after heat treatment at 1100° C. for 30 minutes in argon. The upper diffractogram represent the sample shown in FIG. 10c (outside of formula (I), while the lower diffractogram represent the sample shown in FIG. 10d (within the scope of formula (I)).

Figure 12:
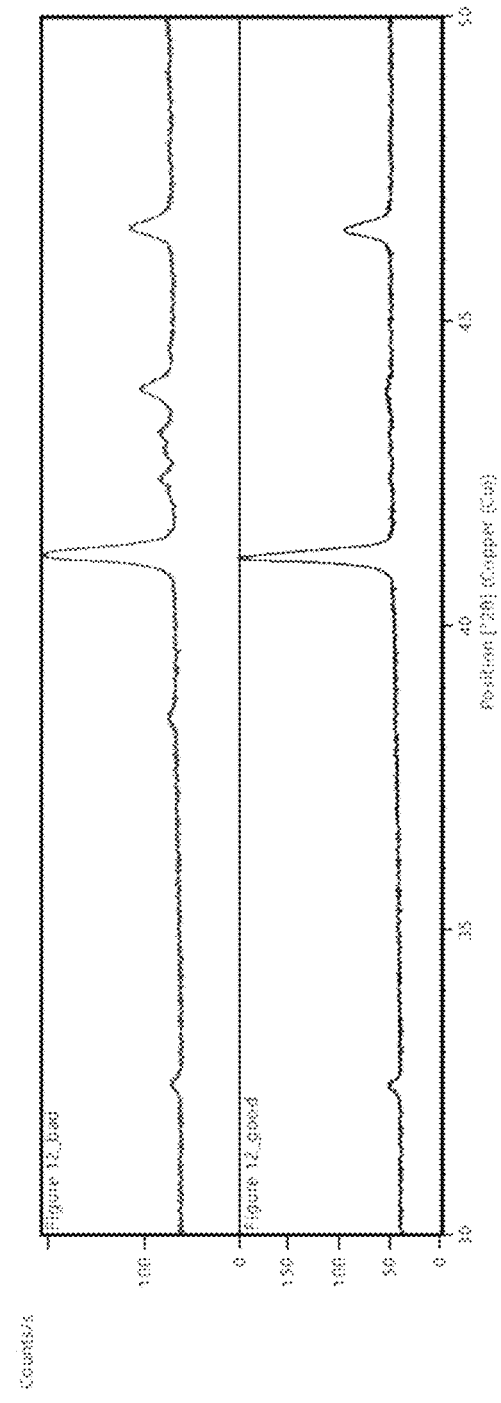

FIG. 12 XRPD of two samples with different stoichiometric compositions obtained after milling according to example 2, and subsequently flash heated to 950° C.

Sample having a composition within the scope of formula (I) shows high content of τ-phase (bottom), while the reversed is observed for a sample outside the scope (top).

Figure 13:
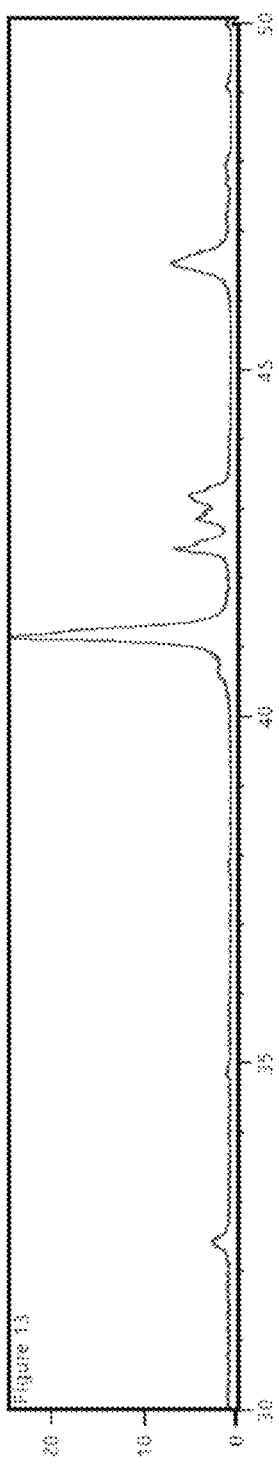

FIG. 13 XRPD of a samples with a stoichiometric composition $(Mn_{53}Al_{47})C_{1.50}$ outside the scope of formula (I). The sample was milled according to example 1, thereafter flash heated to 950° C.

Figure 14:
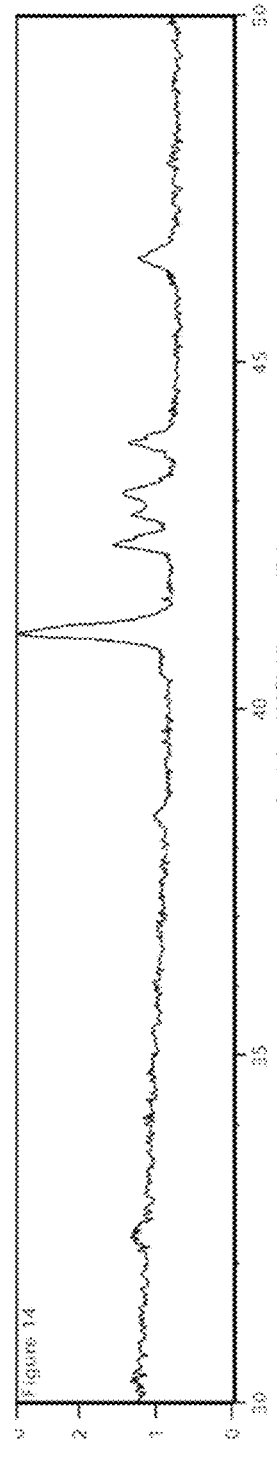

FIG. 14 XRPD of the same sample as FIG. 13, however, the sample was prior annealed at 650° C. to obtain the t-phase prior milling according to example 1, thereafter flash heated to 950° C.

Figure 15:
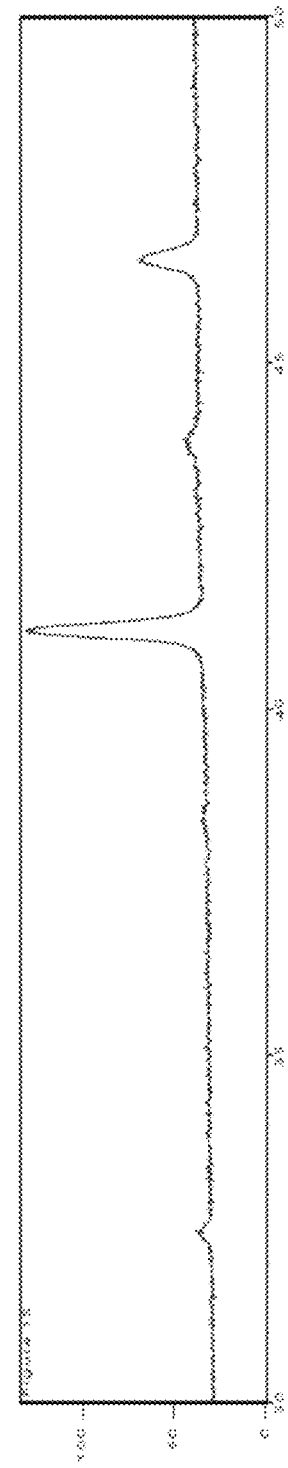

FIG. 15 XRPD of a sample with a stoichiometric composition within the scope of formula (I) $(Mn_{57}Al_{43})C_{2.04}$. The sample was milled according to example 2 and subsequently flash heated at 950° C., in vacuum only. The magnetic properties of this sample are slightly worse than the corresponding sample treated in argon at 950° C. as displayed in FIG. 12, bottom.

FIGS. 16a-16b a) shows a polarized LOM picture of a composite material of the present invention; b) shows a LOM picture of the corresponding reference material. The pictures illustrate the finer crystal grain structure of the composite material according to the invention, and also less of the typical twins showing high image contrast between the grains.

FIGS. 17a-17b a) shows atomic force microscopy images (AFM) on a sample of a solid composite material of the present invention consisting of an MnAlC alloy to which vanadium carbide nanoparticles have been added at the stage of preparation. The nanoparticles are visualized as bright spots.

b) shows magnetic force microscopy images (MFM) of the same region as shown in FIG. 17a). In the area wherein the nanoparticles are concentrated, the magnetic domain pattern is brighter and finer, indicating the presence of a material that has many small randomly oriented crystals with reduced twinning tendency, thereby having improved magnetic properties.

Figure 18A:
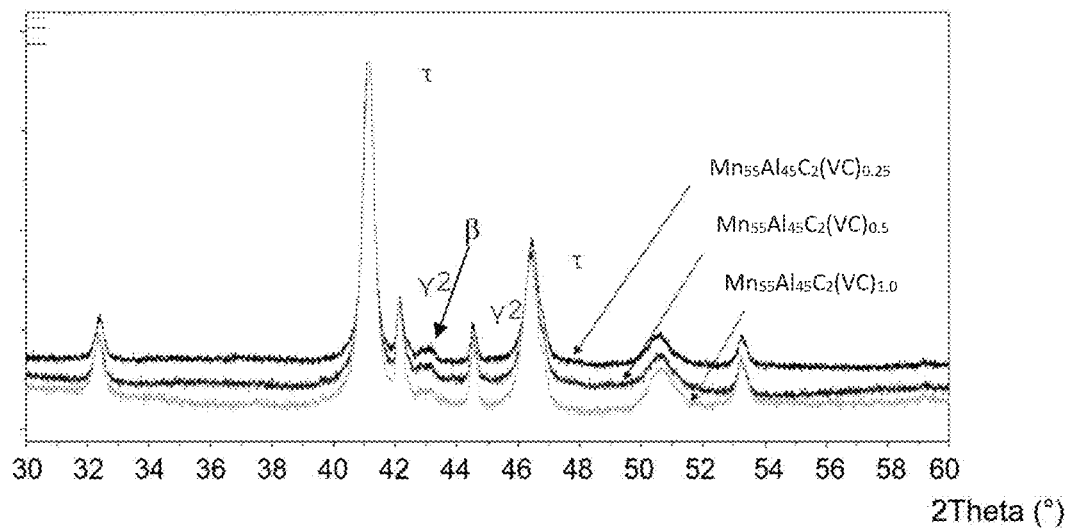
Figure 18B:
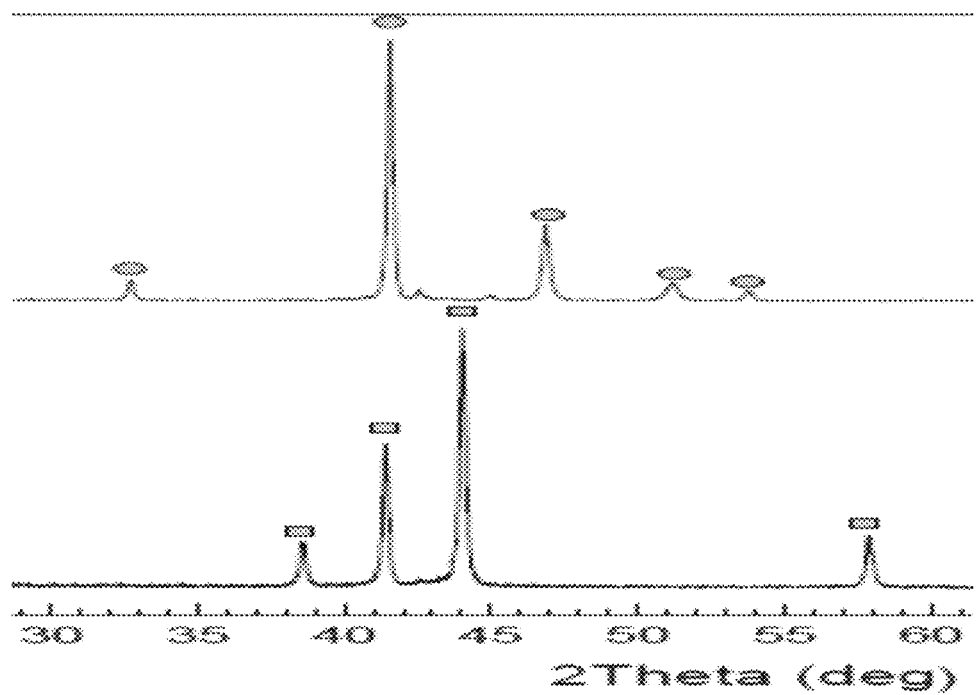

FIGS. 18a-18b a) shows XRD peaks of three materials in accordance with the present invention, wherein different amounts of vanadium carbide nanoparticles where added to an MnAlC alloy. The XRD shows that the τ phase is present in high purity. Interestingly, the peak height is larger for higher amounts of vanadium carbide nanoparticles, thereby showing that the material possess higher ordered crystallinity in those materials with higher amounts of nanoparticles.

b) shows reference XRD data for 95% pure τ phase (top) and ε phase (bottom).

FIG. 19 shows the PXRD data of crushed, as synthesized composite material (black) and of a corresponding reference material (grey). The composite material shows higher purity of the τ phase.

FIG. 20 shows PXRD data of the materials of FIG. 19 after three minutes of cryo milling. The composite material shows higher purity of the τ phase.

FIG. 21 shows PXRD data for the cryo-milled (3 min) and annealed (550° C. for 30 min in argon) materials. The composite material of the present invention shows higher purity of the τ phase and lower amounts of the undesired non-magnetic phases.

DEFINITIONS

In the present invention, all physical parameters are measured at room temperature (20° C.) and at atmospheric pressure ($10^5$ Pa), unless indicated differently.

As used herein, the indefinite article "a" indicates one as well as more than one and does not necessarily limit its reference noun to the singular.

The term "about" means that the amount or value in question may be the specific value designated or some other value in its neighborhood, generally within a range of ±5% of the indicated value. As such, for instance the phrase "about 100" denotes a range of 100±5.

The term and/or means that either all or only one of the elements indicated is present. For instance, "a and/or b" denotes "only a", or "only b", or "a and b together". In the case of "only a" the term also covers the possibility that b is absent, i.e. "only a, but not b".

The term "comprising" as used herein is intended to be non-exclusive and open-ended. A composition comprising certain components thus may comprise other components besides the ones listed. However, the term also includes the more restrictive meanings "consisting of" and "consisting essentially of". The term "consisting essentially of" allows for the presence of up to and including 10 weight %, preferably up to and including 5% of materials other than those listed for the respective composition, which other materials may also be completely absent.

Whenever ranges are indicated in the present invention, be it by the use of a hyphen as in "52-56", by using the word "to" instead of a hyphen, or by using the word "between", such as in "between 52 and 56", the respective end values of the range are included, so that e.g. the range of "52-56" includes the values of 52 and 56. These expressions however also cover the entire set of values within that range, so that the terms are used as abbreviation of the term "52 or more, but 56 or less".

The variables x, y and z relating to alloy compositions are based on a molar basis, and for x and y in view of x+y being 100, these correspond to atom % of the MnAl alloy (in case no carbon is contained). Also where the composite material is represented by $Mn_xAl_yC_z(X)_a$, z and a, denoting the amount of carbon (if present) and the nanoparticles made from material X, are expressed on a molar basis relative to x+y=100. All other percentages are by weight, unless indicated differently.

A particle size of particles of the composite material is typically defined as D50, unless stated otherwise. D50 defines that 50% by weight of the particles have the indicated size or smaller, as determined by a laser light scattering method. The particle size of nanoparticles is difficult to determine by a laser light scattering method, and is hence to be determined by a transmission electron microscope (TEM) observation, and is expressed as D50 by number.

During the manufacture of the magnetic solid material of the present invention, certain heat treatments within a specified temperature range for a time within a specified range may be conducted. An example is a case wherein "a heat treatment at a temperature of 300 to 500° C. for a time of 1 to 3 hours" means that the alloy is kept at a temperature within the range of 300 to 500° C. for a time of 1 to 3 hours. The time used for heating up to the lower limit (e.g. 300° C.) and cooling below the lower limit is not taken into account for the specified duration of the heat treatment. Further, the upper limit is typically not exceeded in such heat treatment steps.

The numerical values of characteristics and properties of the materials employed or produced in the present invention relate to the values obtained by using the instruments and conditions employed in the Examples. In case of differences or discrepancies, the following conditions prevail:

The specified saturation magnetization values are in $Am^2/kg$ measured at an applied field of 9 Tesla (using a Physical Property Measurement System, PPMS, as available from Quantum Design, Inc. at room temperature 20° and 1 atm), unless specified differently.

For saturation magnetization data measured at an applied field of 1.8T (using a Vibrating Sample Magnetometer, VSM), the values have for comparison purposes been converted to correspond to a 9T-measurement, based on a conversion factor obtained from previous measurements where both instruments have been used on the same sample.

The coercive force is specified in kA/m assuming a material density of 5100 $kg/m^3$. This density may also assumed for any other desired conversion, such as for converting a volume-based parameter into a weight-based parameter.

Whenever in the present invention reference is made to the content of a crystalline phase in %, the respective value refers to the value obtained by an XRPD analysis with Rietveld refinement as described in example section 1.3.

In the present invention, alloys may be represented by e.g. formula (I) with the composition $Mn_xAl_yC_z$, wherein x=52.0 to 59.0, y=41.0 to 48.0, x+y=100, and z=0.0 to 3.0. This is equivalent to the representation $(Mn_{0.x}Al_{0.y})_{100}C_z$. Hence, there are z y) atoms of C relative to 100 atoms of the total of Al and Mn.

The present invention relates to composite materials comprising an alloy, such as the alloy represented by formula (I), and nanoparticles made from a material X. Such composite materials may also be referred to by $Mn_xAl_yC_z(X)_a$. Herein, X represents the material of the nanoparticles, e.g. a metal, a metal nitride, a metal boride or a metal carbide. The variable "a" denotes the molar amount of X relative to the molar amount of Mn, Al and C (if present) as determined by the values represented by x, y and z (based on x+y=100). All of x, y, z and a relate to the relative molar amount of the respective components. As one example, a composite material represented by $Mn_xAl_yC_z(X)_a$ contains x moles Mn, y moles Al, z moles C and a moles X. This applies also in case that X is a metal compound containing more than one element or different elements in certain proportions, such as VC, in which cases there are a moles VC relative to x moles Mn, y moles Al and z moles C. Even though "a" is expressed on a molar basis, it can be easily re-calculated to weight % in view of the known molecular weight of X, Mn, Al and C.

DETAILED DESCRIPTION OF THE INVENTION

The present invention relates to a solid composite material comprising an alloy based on manganese, aluminum and optionally carbon, wherein the solid composite material further comprises nanoparticles made from a material X. The nanoparticles are dispersed in a matrix that is formed by the alloy and optionally other components. The solid composite material typically consists of, or essentially consists of, a MnAl alloy such as those represented by formula (I), and the dispersed nanoparticles. This means that 90-100% by weight or 95-100% by weight of the solid composite material may be formed by the alloy of e.g. formula (I) and the nanoparticles. Each of the components will be described in more detail below.

Alloy Based on Manganese, Aluminum and Optionally Carbon

An alloy based on manganese, aluminum and optionally carbon in terms of the present invention relates to an alloy that consists of or essentially consists of manganese, aluminum, optionally carbon, and optionally unavoidable impurities. This means that 95% by weight or more, such as 98% by weight or more or 99% by weight or more of the alloy is formed by manganese, aluminum and carbon, if present.

The alloy based on manganese, aluminum and optionally carbon should be either magnetic, or should be a precursor material that is able to provide a magnetic material upon further processing. To this end, any alloy based on Mn, Al and C described in the art can be used for forming the composite material of the present invention.

In one embodiment the alloy based on manganese, aluminum and optionally carbon conforms to formula (I):

$$(Mn_xAl_y)C_z \qquad (I)$$

wherein x=52.0 to 59.0; y=41.0 to 48.0; x+y=100, and z=0.0 to 3.0.

In one embodiment, z is larger than 0, and is preferably 0.1 or more, such as 0.5 or more. z can also be 2.5 or less, such as 2.2 or less or 2.0 or less.

In one embodiment of formula (I), x=54.0 to 57.0; y=43.0 to 46.0; y+x=100. Herein, z is preferably from 1.0 to 1.9. In one embodiment, x may be from 56.5 to 58.5 and y may be from 41.5 to 43.5, or x=57.0 to 58.0 and y=42.0 to 43.0

In these and all other embodiments, the ratio of x to z (x/z) is preferably in the range of 60 or less, 55 or less, 50 or less, 45 or less or 50 or less. The ratio of x to z may also be 26 or higher, e.g. from 26 to 33, more preferably 27 to 30, such as 28 or 29.

The alloy thus consists of Mn, Al and optionally C as well as potentially unavoidable impurities. Herein, the term "unavoidable impurities" includes any element other than Al, Mn and C present in the alloy, and typically denotes impurities that originate from the raw materials used for producing the powder or that are introduced during the manufacturing process. The total content of such impurities is typically 0.5% by mass or less, preferably 0.25% by mass or less, and further preferably 0.1% by mass or less, relative to the total mass of the alloy. Of course, the nanoparticles of material X are not impurities in this sense.

The alloy of formula (I) thus has a composition that is able to form the ε phase, which is a precursor of the magnetic τ phase, and is able to form the metastable τ phase upon proper processing.

In one embodiment, the alloy, such as the alloy of formula (I) is present to 80% or more, such as 90% or more or 95% or more, in the ε phase. In another embodiment, the alloy, such as the alloy of formula (I) is present to 80% or more, such as 90% or more or 95% or more, in the τ phase. The alloy can be formed by any method known in the art, but preferably the methods for producing described below can be used.

As outlined above, most of the attempts for preparing MnAl alloys comprising a high amount of τ phase have focused on materials that have a Mn content of 55% or less, relative to the total of Al and Mn. Further, while there have been attempts to stabilize the τ phase by addition of carbon as a dopant, these attempts have also been made with MnAl alloys having such a Mn content. Little attention has so far been paid to producing a MnAl alloy showing a high content of Mn (e.g. 56 at.-% or more, such as between 56.5 and 57.5 at.-%, relative to the total of Mn and Al)

The present invention is in one aspect based on the finding that a key step in the preparation of an MnAl alloy having a high content of τ phase is the preparation of an MnAl alloy having a high content of ε phase. The present invention furthermore provides a method for preparing such MnAl alloys having a high content of ε phase (e.g. 75% or more, such as 80% or more, 85% or more, or 90% or more) by employing specific process conditions other than those used or suggested in the prior art, as will be explained in more detail below.

The present invention is in another aspect based on the surprising finding that alloys having a high content of τ phase can be prepared from compositions consisting of relatively high amounts (56.0-59.0 at % of the total of Al and Mn) of manganese and low amounts (41.0-44.0 at % of the total of Al and Mn) of aluminum, in combination with a specific amount of carbon represented by a value of z of 1.0 or more, 1.5 or more but 2.4 or less, such as 2.0 or less, as defined below by Formula (II). Compositions satisfying these requirements can surprisingly be processed such as to contain a high content of τ phase, and may thus provide materials with improved magnetic properties. The carbon content may preferentially be chosen such as to be linked to the amount of Mn, such that the molar ratio of Mn/C is in the range of 26 to 36, more preferably 26 to 33, such as from 28 to 30. With these preferably and more preferably carbon contents, the alloy is believed to be saturated with carbon dissolved in the alloy, so that the τ phase can be stabilized most effectively.

The present invention is in a further aspect based on the surprising finding that particles of an MnAl alloy having favorable magnetic properties can be prepared by a process involving specific milling conditions at low temperature of −20° C. or less (also referred to as cryo milling) and/or specific heating conditions to high temperatures of 900-1000° C. for relatively short time or 20 minutes or less (also referred to as "flash heat treatment" in the following). If both are conducted, the flash heat treatment is typically conducted after cryo milling, but may in one embodiment also be performed without such a step or any other heating to a temperature higher than 800° C. after the initial formation of particles from a melt.

The flash heat treatment was initially developed for an alloy of formula (II) that was intended to be used for the formation of a material that does not contain the nanoparticles present in the composite material of the present invention, and is described in co-pending European Patent Application No. 17 189 240.9 (no prior art for the present invention). It was found here that such a heat treatment is a very efficient way to improve the purity of the τ phase, and without wishing to be bound by theory it is believed that for such material the flash heat treatment eliminates β- and γ2-impurities as well as re-orders the Mn and Al in the crystal lattice, and is in particular effective to heal defects in the crystal structure that are induced by a milling operation (also, but not limited to, cryo milling). It was surprisingly found that for the composite material of the present invention containing the nanoparticles made from material X, the flash heat treatment is not necessary and may sometimes even have a detrimental influence on the magnetic properties. Again without wishing to be bound by theory, it is assumed that the presence of the nanoparticles made from material X avoids or reduces the amount of impurities and defects that are otherwise removed or healed by the flash heat treatment. This shows that besides having improved magnetic properties over the prior art, the process of the present invention may be economically favorable, as it does not require such a flash heat treatment in order to obtain good magnetic properties.

Alloy of Formula (II)

The alloy based on Mn, Al and C may in one embodiment conform to formula (II) as defined below:

$$(Mn_xAl_y)C_z \quad\quad\quad (II)$$

the alloy consisting of aluminum (Al), manganese (Mn), and carbon (C), and optionally unavoidable impurities; wherein x=56.0 to 59.0; y=41.0 to 44.0; x+y=100, and z=1.5 to 2.4.

Herein, the term "unavoidable impurities" includes any element other than Al, Mn and C, and typically denotes impurities that originate from the raw materials used for producing the powder or that are introduced during the manufacturing process. The total content of such impurities is typically 0.5% by mass or less, preferably 0.25% by mass or less, and further preferably 0.1% by mass or less, relative to the total mass of the alloy. Again, of course the nanoparticles of material X are not impurities in this sense.

Compared to prior art alloys, the alloy of formula (II) combines a relatively high manganese content with a carefully defined carbon content. Without wishing to be bound by theory, it is believed that the interstitial positions in the ferromagnetic τ phase are occupied by carbon, making the τ phase more thermodynamically stable or favorable. Further, again without wishing to be bound by theory, the combination of carbon with manganese in an amount of 56.0-59.0 at.-% (relative to the total of Al and Mn) allows obtaining a more homogeneous microstructure of the MnAl alloy in both ε and τ phase (see FIG. 10). This homogeneous microstructure may at least partially be preserved during possible further processing steps, so that the alloy of formula (II) provides an improved precursor material for final applications.

Again without wishing to be bound by theory, addition of carbon at the octahedral interstitial sites (½, ½, 0) is believed to be an effective way of stabilizing the tetragonal structure of the τ phase with an elongation along the c-axis. While carbon reduces the Curie temperature, it increases the saturation magnetization (Ms) with a larger resultant magnetic moment. The increase in stability by carbon doping is believed to occur because the interstitial atoms inhibit the diffusion of the Mn and Al atoms.

This finding is truly surprising, as it was generally considered that carbide precipitates will form at higher carbon concentrations that will act as nucleation sites for the equilibrium phases when the C addition exceeds the solubility limit. It has now surprisingly been found that at higher manganese contents it is possible to dissolve even more carbon, and thus, it is possible to increase the stability of the τ phase. Furthermore, the workability is also improved due to the small carbon atoms, which are believed to relieve internal lattice stresses.

Suitable magnetic properties in a material having a high τ phase content have been obtained when the value of z, representing the number of carbon atoms relative to 100 (Al+Mn) atoms, is 1.5 or higher, preferably 1.7 or higher, more preferably 1.9 or higher. At the same time, the maximum value of z is 2.4 or less, preferably 2.2 or less, more preferably 2.1 or less.

The value of x, representing the number of manganese atoms relative to 100 (Al+Mn) atoms, is 56.0 or higher, preferably 56.5 or higher, more preferably 57.0 or higher. At the same time, the value of x is 59.0 or less, preferably 58.5 or less, more preferably 58.0 or less.

The value of y, representing the number of aluminum atoms relative to 100 (Al+Mn) atoms, is chosen such that the sum of x+y=100. y is 44.0 or less, preferably 43.5 or less, more preferably 43.0 or less, and is at the same time 41.0 or higher, 41.5 or higher, more preferably 42.0 or higher.

The value of z, representing the number of carbon atoms relative to 100 (Al+Mn) atoms, is 1.5 to 2.4. The lower limit of z is thus 1.5 or higher, such as 1.6 or higher, 1.7 or higher, 1.8 or higher or 1.9 or higher. The upper limit is 2.4 or lower, but can also be 2.3 or lower, 2.2 or lower, or 2.1 or lower. These lower and upper limits can be combined in any way, and in preferred embodiments the value of z is 1.7 to 2.2, more preferably 1.9 to 2.1.

The values of x, y and z can be adjusted by appropriately mixing suitable amounts of the starting compounds for the alloy production, which are typically elementary manganese, elementary aluminum and graphite. In the final alloy, the values of x, y and z can be determined by analyzing the relative content of the metals by a suitable technique, such as ICP-AES (Inductively Coupled Plasma-Atomic Emission Spectroscopy and LECO elemental analysis for C, N, P and S, or Spark Optical Emission Spectroscopy.

Given the above relationship between the amount of Mn and C, the ratio of x to z (x/z) is preferably 26 or higher, more preferably 27 or higher or 27.5 or higher, and still more preferably 28 or higher, and preferably simultaneously 33 or less, more preferably 32 or less or 31 or less, and still more preferably 30 or less. By adjusting the relative amounts of Mn and C such that x/y falls within these ranges, maximum stabilization of the τ phase and at the same time good magnetic properties can be maintained. Without wishing to be bound by theory, it is believed that with a lower Mn/C-ratio, such as lower than 26, the risk of excess carbon being present that might form e.g. Mn₃AlC upon heat treatment may not be completely excluded. This risk is further minimized if the ratio of Mn/C, i.e. (x/z), is adjusted to satisfy the above-mentioned preferable and more preferable ranges.

While it is possible to form the τ phase directly from the melt, it is common to first form the ε phase, followed by formation of the τ phase by suitable heat treatment.

Hence, in a preferred aspect, the alloy of formula (II) has a content of the ε phase of 80% or more, more preferably 85% or more, further preferably 90% or more, determined by a the XRPD method using Rietveld refinement as described in Example 1.3.

Nanoparticles Made from Material X

In addition to the alloy based on Al, Mn and optionally C, the composite material of the present invention comprises nanoparticles that are made from a material X. Herein, the term "made from" denotes that the material X forms 90% by weight or more of the nanoparticles, such as 95% or more or 99% by weight or more, or even 99.9% by weight or more.

The term "nanoparticle" denotes a particle with a diameter (longest axis), as determined by a TEM measurement, of 1000 nm or less.

The presence of the nanoparticles represents a major distinction over prior art materials that typically consist of a MnAl or MnAlC alloy. In such materials, there is only one relatively homogeneous material, and it was typically intended to transform all of the material from the ε phase into the τ phase. In this respect, crystal defects such as twinning and anti-phase boundaries may occur during the formation of the ε phase, but also when converting the ε phase into the τ phase.

The formation of a crystalline phase usually proceeds from a very small crystalline domain or even a unit cell, which subsequently grows by attaching further atoms in an orderly manner to the crystalline domain. This process is subject to defects, and in particular the problem of twinning occurs if two initially separate crystals grow into each other, as here the crystal lattices intertwine. The likelihood to form such crystal defects is bigger as the crystals grow larger.

Without wishing to be bound by theory, it is believed that the nanoparticles act as growth inhibitors or growth barriers for the crystals. This means that the crystal growth is limited, and that accordingly many more small crystals with random orientation are formed, as compared to larger crystals that are more likely to form twins if the growth could proceed without such inhibitors or barriers. This is confirmed in FIGS. 16 a) and b), showing polarized LOM images of a composite material according to the present invention (top) and of a reference material not containing nanoparticles. It is evident that the composite material has a much finer structure, i.e. that there are many more small crystals as compared to fewer large crystals. These many small crystals are much less likely to form twins, and thereby magnetic properties of the overall material can be improved. This applies in particular to the coercivity, as the nanoparticles are also believed to form pinning centers for magnetic domains that improve the coercivity of the material.

Surprisingly, it has also been found that the addition of nanoparticles also improves the purity of the τ phase, as is derivable from FIG. 18 a), showing XRD data for composite materials with different amounts of vanadium carbide nanoparticles after cryo milling (3 min) and subsequent annealing at 550° C., 30 min in argon. As derivable from the figure, the composite material with nanoparticles shows high purity of the τ phase, which is rather surprising and counterintuitive. Note that here the amounts of nanoparticles are not given in weight-%, but refer to the relative molar amount "a" in the composition $(Mn_xAl_y)C_z(X)_a$.

Further, for materials not including nanoparticles, often a flash heat treatment is necessary in order to obtain good magnetic properties, thereby reducing the amount of impurities and straightening out crystal defects in the material obtained after cryo milling and improving the purity of the τ phase. It has surprisingly been found that such a flash heat treatment is not necessary in the case of the claimed composite material, as the purity of the τ phase is already very high after the typical synthesis steps for forming the τ phase, e.g. milling followed by an annealing at 450–600° C. In consequence, in one embodiment of the present invention, the process for preparing the composite material does not comprise a step of heating the formed and optionally milled composite material in particle form to a temperature of 800° C. or higher.

The average particle diameter of the material X particles, expressed as number-average median Dn50 determined by a TEM method using image analysis, can thus be up to 1000 nm, but is typically less than 1000 nm, such as 800 nm or less, 600 nm or less, or 500 nm or less, but can also be as low as 400 nm or less, 300 nm or less, 200 nm or less or 100 nm or less. While there is no lower limit, particles with a very small particle size are typically difficult to make and/or a costly to obtain. For this reason, the lower limit of Dn50 is typically 5 nm or more, such as 10 nm or more or 15 nm or more.

Preferably the amount (by number) of particles made from material X exceeding 1000 nm in diameter is 10% or less, more preferably 5% or less, still further preferably 1% or less, relative to the total number of all particles made from material X. Most preferably, the composite material of the present invention does not contain any particles of a material X with a diameter (longest axis) of more than 1000 nm. It is noteworthy that each of these upper and lower threshold values for Dn50 can be combined with the above disclosure regarding the amount or absence of particles having a diameter exceeding 1000 nm.

The particle size number distribution is not particularly limited, but is typically monomodal.

The material X is different from Al, Mn and C (or any mixture or alloy consisting of only Mn, Al and C), and satisfies the requirements that
 a. the melting temperature of the material X is 1400° C. or higher, preferably 1500° C. or higher; and
 b. the material X comprises a metal.

Requirement a. ensures that the alloy based on Al, Mn and C (which typically has a melting point in the range of 1300 up to less than 1400° C.) can be melted without melting the nanoparticles if added in the form of pre-prepared nanoparticles. This allows that the particles remain substantially intact during the preparation of the composite material, and are as such dispersed in a matrix that comprises, consists essentially of or consists of the alloy based on Mn, Al and optionally C. While the carbon, if present in the alloy is "dissolved" and present at interstitial positions in the crystal structure of the alloy, the nanoparticles form a distinct phase.

As such, the melting point of the material X is at 1400° C. or higher, such as 1450° C. or higher, 1500° C. or higher, or even 1600° C. or higher or 1700° C. or higher. There is no particular upper limit, but this can be e.g. 3500° C. or less, 3400° C. or less, 3300° C. or less, 3200° C. or less or 3100° C. or less, such as 3000° C. or less. In particular where the nanoparticles are formed by adding a nanoparticle precursor material forming carbides in situ to the melt of aluminum, manganese and optionally carbon, as will be explained later, it is believed that those materials that have a high melting point will have a large tendency to form carbides, yet will at the same time show a tendency to form large particles in the mm range. If the composite material is prepared by adding pre-formed nanoparticles, the upper limit of the melting temperature is believed to be of less relevance.

Requirement b. serves to ensure compatibility with the alloy, as non-metal materials such glass or oxides may not have the required wettability and compatibility with the melt of the alloy. The material X thus needs to contain a metal, and in one embodiment of the invention, the material X is not on oxide. Note that the term "metal" in this context also includes, besides the alkali metals, earth alkaline metals, the semi-metals Si, B, As, Se, Ga, Ge, In, Sn, Sb, Te, Pb, Bi, and the transition metals. Of these, transition metals, silicon and boron are preferred in view of costs and the availability of stable high-melting species.

The material X has preferably a density from 4.0. to 8.0 g cm$^{-3}$, more preferably from 5.0 to 6.8 g cm$^{-3}$. This facilitates that the particles have a density that allows dispersing them in the alloy based on Mn, Al and optionally C, which is of particular relevance if pre-formed nanoparticles are added in the method for forming the composite material. If the density is too high, the particles may sink to the bottom of the melt, while when it is too low, the particles may float on the top of the melt. By choosing particles having a density within the above range, dispersion of the particles can be achieved by prior mixing the particles with the manganese raw material powder/flakes using proper agitation or other dispersing techniques, such as tumbling or shaking. The density is preferably in the range 5.0-6.8 g cm$^3$, as then a more homogeneous distribution of the particles in the melt can be easier achieved.

The material X may be a metal, such as a transition metal, e.g. vanadium. The material X may however preferably be a metal compound, such as a metal carbide, nitride or boride. In view of their polar surface, the material X is preferably no oxide and/or does not contain any oxygen atoms. The preference for metal compounds over pure metals is based on the observations that pure metals may undergo a reaction with the components of the alloy, which is less likely for metal compounds. For instance, in the case of the addition of vanadium metal to the composition, the presence of vanadium carbide precipitates was observed in the obtained composite material or alloy, respectively. The formation of vanadium carbide consumes the carbon in the formulation so that it is no longer present to stabilize the manganese in the interstitial positions of the MnAlC alloy. Further, metals or reaction products thereof with the MnAlC alloy components may have a greater tendency to form aggregates, thereby making a good dispersion of the nanoparticles more difficult.

In one embodiment, material X is thus selected from the group consisting of metals, metal carbides, metal nitrides, metal borides and combinations thereof, and preferably the material X is selected from the group consisting of transition metal carbides, transition metal borides and transition metal nitrides, more preferably transition metal carbides. Preferred examples of X include vanadium carbide, zirconium carbide, titanium carbide, molybdenum carbide, chromium carbide and titanium nitride, more preferably vanadium carbide.

However, the possibility to add extra carbon to the melt that would compensate for the carbon consumed to form well-dispersed nano-sized carbides, e.g. vanadium carbide, is also included in the present invention, in particular in those embodiments wherein the composite material is prepared by adding a nanoparticle precursor material. Nevertheless, it is believed that the particle size, particle size distribution and the particle distribution in the solidified composite alloy particles may be better controlled and optimized if they are added directly in the form of a stable metal compound.

The material X is preferably a hard material having the desired density, and in this respect the material X is in one preferred embodiment selected from metal carbides, metal nitrides, and metal borides, as well as combinations thereof. The metal carbides, metal nitrides, and metal borides are in one embodiment transition metal carbides, nitrides or borides, respectively. A preferred material is selected from vanadium carbide, zirconium carbide, titanium carbide, titanium nitride and chromium carbide. A further advantage of the carbides is that they possess good wettability by the melt of the alloy, thereby allowing easy dispersion.

The nanoparticles made from material X are typically commercially available, e.g. from US Research Nanomaterials, Inc. They can however also be prepared in accordance with any technique known to a skilled person.

The amount of the nanoparticles is 15% by weight or less, relative to the total weight of the composite material. The amount is can also be 13% by weight or less, 12% by weight or less, 11% by weight or less, preferably 10% by weight or less, 9% by weight or less, 8% by weight or less, 7% by weight or less, 6% by weight or less, or 5% by weight or less, such as 4% by weight or less or 3% by weight or less. The lower limit is not particularly limited, as even minute amounts will lead to some improvements in the microstructure and will lead to the avoidance or reduction of the formation of twins, yet is preferably 0.1% by weight or more, 0.5% by weight or more, such as 1.0% by weight or more or 1.2% by weight or more.

In this respect, the alloy and the nanoparticles that are comprised in the composite material, or of which the composite material consists or essentially consists, may also be represented by $(Mn_xAl_y)Cz(X)a$, wherein x, y and z are as defined above for formula (I), including all preferred aspects or sub-ranges thereof, or are as defined for formula (II), wherein in each case x+y=100, and a is a number representing the molar amount of X that allows for the nanoparticles to be present in the amount by weight represented above. One should note that the weight percentages above relate to the overall composite material that may or may not include other components besides the alloy and the nanoparticles, yet that the molar amount of X as represented by "a" is linked to the alloy of Mn, Al and optionally C only. Typical values of "a" are thus not specifically limited, yet the value of a in the above representation can be 20.0 or less, such as 15.0 or less, 10.0 or less or 8.0 or less, e.g. 7.0 or less, 6.0 or less or 5.0 or less, but is typically 0.01 or higher, such as 0.05 or higher, 0.10 or higher, 0.15 or higher, 0.20 or higher or 0.25 or higher, e.g. 0.40 or higher or 0.50 or higher. This applies to both the cases where the composite material comprises other components besides the alloy and the nanoparticles and the cases wherein such other components are essentially or completely absent.

In this respect, it is believed that the effect of the nanoparticles is not so much caused by their amount in weight %, but rather by their number, as each particle is believed to act as inhibitor of undesired growth of the crystals. Taking into consideration that the volume and weight contribution of large particles goes beyond their contribution in terms of the number and surface area, it may thus be preferable to use a small amount (in terms of weight) of fine particles, as compared to a larger amount of large particles. Using small particles thus allows to obtain a similar number of particles (and correspondingly a similar number of distortions that limit crystal growth) at a lower total weight of nanoparticles as compared to the use of larger nanoparticles. The larger particles thus need to be present in a larger weight proportion. As the material X is typically non-magnetic, using smaller particles allows obtaining better magnetic properties of the composite material, as long good dispersion can be achieved. As such, similar effects on the crystal growth and the avoidance of twinning may be obtained with e.g. 1% by weight of nanoparticles having an average particle size Dn50 of 50 nm, as compared to 5% by weight of nanoparticles having a larger Dn50 of e.g. 300 nm. Still, the magnetic properties of the former per unit mass may be preferable, as simply the magnetic phase can take a larger weight percentage of the composite material. Theoretically, as long as the particles have the same dimension or larger than the width of the domain walls, believed to be typically 3~5 nm, they may pin domain wall movement in an applied magnetic field, thus, contributing to increase the obtained coercivity.

Hence, the presence of nanoparticles in the composite material of the present invention leads to a number of favorable effects. These include, but are not limited to, a higher stability of τ-phase during milling, probably thanks to less twinning and APB's, a reduction of the requirement to perform a harsh milling operation as the domain-pinning mechanism is instead coming from the nanoparticles and less from -magnet saturation (Ms)-reducing impurities and crystal strain. It was also observed that the composite material may also exhibit higher hardness and more brittle characteristics as compared to the alloy not containing the nanoparticles, which in turn could avoid introduction of defects/strain that decrease Ms.

Composite Material

The composite material of the present invention comprises the alloy based on manganese, aluminum and optionally carbon, and the dispersed nanoparticles made from a material X.

The composite material may also comprise additives such as glidants or lubricants, e.g. fatty acids or fatty acid salts such a magnesium stearate, or silica, or binders such as a resin. These are typically added after particles consisting of or consisting essentially of the alloy and the nanoparticle have been prepared, which preparation typically involves a high temperature processing step for forming a melt of the alloy in which then the nanoparticles are dispersed, and wherein the dispersion is then processed to form particles e.g. by gas atomization followed by (cryo) milling. The presence of such additives may facilitate the further processing of the particles into a shaped object that can be used as a magnet in e.g. electric and electronic applications. Such a shaped object may have a size of at least 1×1×1 mm or, alternatively, a volume of at least 1 $mm^3$, as will be described below.

The composite material may however also consist of the alloy and the nanoparticles only, or may essentially consist of these materials. The alloy and the nanoparticles preferably form 80% by weight or more of the composite material, such as 90% by weight or more, 95% by weight or more, or 98% by weight or more, such as 100% by weight.

The composite material of the present invention has the potential to exhibit simultaneously high Ms and Hc. In one embodiment, the saturation magnetization Ms of the composite material is 68 $Am^2/kg$ or more, such as 70 $Am^2/kg$ or more, preferably 75 $Am^2/kg$ or more, more preferably 80 $Am^2/kg$ or more, and the coercivity Hc is 70 kA/m or more, such as 90 kA/m or more, preferably 95 kA/m or more, more preferably 100 kA/m or more.

Upon careful adjustment of the synthesis conditions and in particular by ensuring a homogeneous distribution of fine nanoparticles throughout the alloy, it is believed that with the concept of the invention simultaneously even higher Ms and Hc can be achieved. The present invention thus also envisages properties including a Ms of 100 $Am^2/kg$ or more, 110 $Am^2/kg$ or more, 115 $Am^2/kg$ or more, 120 $Am^2/kg$ or more, 125 $Am^2/kg$ or more or 130 $Am^2/kg$ or more, and simultaneously a Hc of 100 kA/m or more, 110 kA/m or more, 120 kA/m or more, 130 kA/m or more, or even 150 or 180 kA/m or more.

Method for Producing the Composite Material

While the method for preparing the composite material, such as a composite material comprising the alloy of formula (I) and (II), is not specifically limited, it can suitably and preferably be prepared by the method described below. In this case, particularly preferred characteristics can be obtained.

As is well known, the synthesis parameters, i.e. melt temperature, quenching- or cooling rates of the melt, have an impact on the homogeneity of the microstructure of an alloy, and suitable parameters can generally be chosen by a skilled person based on common general knowledge and/or be turning to the preparation conditions described in the examples. It is therefore preferred to choose synthesis conditions and subsequent process conditions for the material in such way that heterogeneity is as far as possible eliminated.

In a first step, a composition comprising the alloy of aluminum, manganese and optionally carbon in a molten state and the nanoparticles is provided. This can for instance be achieved by heating a raw material mixture comprising aluminum and optionally carbon under a protective atmosphere such as argon, to a temperature of 1000° C. or higher. Thereafter, it is further heated until the targeted melt temperature is reached, which is well below the melting point of the material X. Thereafter, manganese and the nanoparticles made from a material X are added to the melt, where upon the nanoparticles are dispersed in the melt.

The melt temperature is typically in the range of 1300° C. or higher, preferably 1400° C. or higher, more preferably 1450° C. or higher, such as 1500° C. or higher. The melt should be homogeneous, so that the melt is held for some time (e.g. 5-20 minutes or even longer) in the molten state at high temperature in order to allow a good mixing and diffusion of the components, mainly by heat convection and/or inert gas bubbling. The nanoparticles and manganese powder (or flakes) can be preferably pre-mixed and pelletized in order to facilitate an efficient dispersion of the nanoparticles.

Subsequently, the melt including the dispersed nanoparticles is processed to form a solidified material. Depending on the cooling rate either ε- or τ-phase can be formed directly from the melt. Normally, higher cooling rates than about 10° C./s will result in ε-phase, while slower cooling rates at temperatures below ~1000° C. could result in the magnetic τ-phase directly.

Hence, where the material obtained directly from the melt is desired to have a large content of the ε phase, rapid cooling from the melt is preferred. A high cooling rate is preferred not only to form the ε phase in high purity, but also to ensure a homogeneous composition as well as microstructure (minimize segregates) inside the solidified material. In order to avoid formation of the more thermodynamic stable phases (in particular β and γ2) as well as to obtain an even distribution of the raw materials, the average cooling rate between the melt temperature and approximately 1150° C. is preferably $10^{3°}$ C./s or higher, more preferably $10^{4°}$ C./s or higher, still more preferably $10^{5°}$ C./s or higher. Furthermore, in order to favor a direct formation of an alloy having high content of the τ phase, and suppress formation of e.g. β and γ2-phases, the average cooling rate below approximately 1050° C., and above approximately 650° C. is between 10° C./min and 40° C./min, preferably between 15° C./min and 25° C./min, more preferably about 20° C./min.

If the quenching rate and/or the mixing of the components in the melt prior to atomization has been insufficient, the material may exhibit regions of different composition caused by microstructural variations with different crystallinity, and may then also show a relatively large difference in composition between the regions/segregates. The regions of lower crystallinity exhibit a significantly lower Mn/Al-ratio and, thus also lower carbon content due to the decreased solubility of carbon in the presence of less manganese. Larger differences in composition between these region/segregates has been found to be undesirable, as it may lead to cause inhomogeneities on a microstructural level even in materials that have undergone further processing steps.

Further, the cooling rate in a "natural cooling process" (such as described e.g. by Fang in Journal of Solid State Chemistry 237 (2016) 300-306) depends on various factors, such as shape and volume of the alloy cooled (e.g. in ingot form), the temperature of the atmosphere, etc. In this article, the cooling process was described to exhibit a cooling rate from 1400° C. to room temperature in about 10 minutes, which equates to an average cooling rate of about 2.3° C./s.

This shows that a natural cooling process, of e.g. an alloy cast from the melt to form an ingot, is typically too slow to lead to the formation of a pure ε phase of homogeneous microstructure, but still too fast to allow the direct formation of τ phase. If a material having a high content of ε phase is desired, additional measures need to be taken in order to achieve higher cooling rates. These include in particular measures for forming droplets from the melt in order to increase surface area relative to the mass of the melt, thereby increasing cooling rates, and forced cooling, e.g. bringing the molten alloy (preferably in droplet form) into contact with a cooling medium such as a cooling substrate, a cooling gas or a cooling liquid, e.g. water. Suitable methods thus include gas or liquid atomization, melt spinning or spin casting. Gas atomization is preferred, as it is scalable and produces particles having an almost round or spherical shape that allow good orientation in a magnetic field, and which require little or no further mechanical processing such as milling in order to obtain a powder material suitable for further processing and final application after conversion of the ε phase to the ultimately desired τ phase. Further, gas atomized particles show good homogeneity and less crystal defects, as gas atomization is believed to exert little stress on the internal structure of the alloy during cooling, thereby facilitating the formation of a relatively homogeneous crystal structure with many single crystalline domains.

The cooling of the alloy (e.g. during gas atomization) containing the dispersed nanoparticles from the melt is preferably conducted in inert gas atmosphere, such as argon or nitrogen, in order to avoid the formation of oxides and to maintain a homogeneous structure. Cooling the liquid droplets into a tank of water can also be applied to reach even higher cooling rates, however, with the expense of higher oxygen contents.

By providing a melt of the MnAl alloy of formula (I) containing the dispersed nanoparticles and performing a cooling process under inert gas atmosphere or water employing a cooling rate rapidly enough to avoid substantial formation of impurity phases (e.g. β, γ2) or the τ phase, a material that is homogeneous and rich in ε phase can be obtained. This material, such as obtained by gas atomization of the melt and cooling under inert gas or water conditions, is an excellent precursor material for the further processing steps. Care should however be taken to avoid extreme cooling rates of e.g. higher than $10^5$ or 106° C./s, as this might disturb the crystallization process and may lead to a lower purity of the desired ε phase.

It has further been found that the alloy composition of formula (II) is less sensitive to the synthesis conditions, in particular as regards the quench rate from the melt, and still allows obtaining a homogeneous microstructure under conditions that lead to less homogeneous/more heterogeneous microstructure for alloys that do not conform to formula (I), due to a lower Mn content. This is illustrated in the Figures, in particular in FIGS. 9-11, which will also be explained in more detail in the following description of step a. It is however noteworthy that the following effects are believed to occur independently of the specific step of gas atomization (step a), i.e. also for alloys of formula (II) that are produced without a step of gas atomization from the melt, but by different techniques.

FIG. 9a shows on the top the diffractogram (XRPD) of an alloy having the composition $Mn_{53}Al_{47}C_{1.50}$, and in the bottom of an alloy of the composition $Mn_{57}Al_{43}C_{2.04}$, both directly after gas atomization under identical conditions. As can be seen from the XRPD data, the sample at the top (falling within the scope of formula (I), but not formula (II)) shows a reasonably good purity, yet some impurities ($\gamma 2$, $\beta$) are also present as derivable from the minor peaks around 42-43° in 2θ. Such peaks are also present in the lower figure showing the diffractogram of the alloy having a composition of formula (I), yet to a lesser extent.

Interesting to note is also the difference in structural homogeneity, as represented by the SEM pictures shown in FIG. 10 a) and b). Here, both samples show a microstructure composed of grains (dark in FIGS. 10 a) and b)) and a matrix phase (bright in FIG. 10 a) and b)). Both of the grains and the matrix are present mainly in the ε phase, yet differ in respect of their composition. The grains are formed of a phase $\varepsilon_1$ having a high Mn and C content, while the matrix is formed of a phase $\varepsilon_2$ having a high Al content. The matrix areas show nanocrystallinity, i.e. have a lower ability to crystallize.

Interestingly, in the alloy conforming to formula (II), the difference in composition between the matrix and the grains is smaller as compared to the alloy conforming to formula (I) (but not formula (II)). The sample conforming to formula (II) has thus a more homogeneous microstructure. Without wishing to be bound by theory, it is believed that this difference in the compositional difference between the $\varepsilon_1$ and $\varepsilon_2$ phase is caused by the combined presence of carbon and relatively high amounts of Mn, such that the Mn/C ratio is within the preferred and more preferred ranges described above. Apparently, the presence of carbon in the required amount helps avoiding the formation of segregates, leading to a more homogeneous structure.

This homogeneity of the microstructure of the as-synthesized ε phase also influences the microstructure of the subsequently formed τ phase. This is illustrated in FIGS. 10 c) and d). The sample conforming to formula (I) (but not formula (II)) having the greater inhomogeneity of the microstructure produces, upon heating at 1100° C. in vacuum for 30 minutes, a microstructure showing high inhomogeneity consisting mainly of τ, γ2, and β (see FIG. 10 c)). Conversely, the sample conforming to formula (II) leads to a much more homogeneous microstructure of predominately τ-phase (see FIG. 10 d)), which in turn allows obtaining a higher Ms.

This difference in structure is also observable by a DSC analysis. FIG. 6 a) shows the DSC analysis of a sample conforming to formula (I) (($Mn_{54}Al_{46})_{100}C_{0.76}$), but not formula (II). The DSC shows an exothermic peak around 522° C. that represents the formation of the τ phase. Upon further heating, there are two endothermic peaks around 787 and 862° C., which represent the re-formation of the ε phase from the τ-phase. The occurrence of two different peaks in the DSC shows that the τ-phase formed actually consists of at least two different sub-phases, one converting back to the ε-phase at around 787° C. and the other one converting back to the ε phase at around 862° C. This is in good agreement with the structure observed in FIG. 10 c).

The DSC graph of a sample conforming to formula (I) and formula (II) (($Mn_{57}Al_{443})_{100}C_{2.14}$) is shown in FIG. 6 b. Here, there is one exothermic peak around 554° C. representing the formation of the τ phase, and one peak around 789° C. representing the re-formation of the ε phase. Notably, there is no peak at higher temperatures as in FIG. 6 a), showing that the microstructure is more homogeneous and essentially consists of one τ-phase only. This is good agreement with the structure observed in FIG. 10 d).

It follows that the alloy composition of formula (II) having the right balance between Mn and C (i.e. having the suitable Mn/C ratio) allows obtaining a more homogeneous ε phase and a more homogeneous τ phase as compared to alloys having lower Mn content and/or in an incorrect carbon amount, i.e. with an unsuitable Mn/C ratio. The alloy of formula (II) is thus in one embodiment characterized by a DSC graph showing one endothermic peak of 15 J/g or more, preferably 25 J/g or more and further preferably 35 J/g or more, such as 40 J/g or more, in the temperature range of 780-810° C. (or 780-800° C.), and either no endothermic peak in the temperature range of 840-880° C. or an endothermic peak in the in the temperature range of 840-880° C. of 5 J/g or less, preferably 3 J/g or less, and more preferably 2 J/g or less, determined by a DSC method using a heating rate from room temperature to 1300 C.° at 10° C./min. Thereby, a more homogeneous τ-phase can be formed. While it is also possible to obtain the ε phase outside the composition of formula (II), this ε shows the tendency to not only form the τ-phase upon proper heat treatment, but to also form the thermodynamically more stable β- and γ2-phases. Within the scope of formula (II), thus an ε-phase can be obtained that is more suitable for obtaining a more pure and more homogeneous τ-phase.

A composite material comprising an MnAl alloy of formula (I) or (II) can then, after formation of the ε and/or the τ phase, be processed further. For instance, the τ phase MnAl alloy of formula (I) or (II) (e.g. obtained by first forming the ε phase and then converting the ε phase into the τ phase by a suitable heat treatment) can be subjected to a milling process. This milling process can be the low temperature cryo milling step, but can also be another suitable milling process known in the art, such as ball milling at another temperature, such as room temperature (20° C.).

In the following, a more detailed description of the method steps for processing composite material comprising nanoparticles and an alloy of formula (II) or (I) is given. Notably, the alloy of formula (I) can also be prepared and processed differently, but is preferably also prepared and/or processed by the method of the present invention. For instance, the alloy of formula (I) may be subjected to a gas atomization process from the melt, yet it is possible to produce a starting material e.g. by strip casting.

It goes without saying that in addition to the method of the present invention as described below, additional process steps may or may not be conducted on the composite material.

Step i.

In this step, there is provided a composition comprising the nanoparticles and/or one or more nanoparticle precursors, as well as the components of the alloy based on manganese, aluminum, and optionally carbon in a molten state, wherein the nanoparticles are dispersed in the molten alloy. To this end, typically the raw materials of the alloy (such as powders of manganese and aluminum as well as carbon in the form of carbon black, anthracite, pet coke or graphite) are provided, and the raw materials are melted.

The raw materials for the alloy can be added simultaneously or subsequently, and in one embodiment, aluminum and the optional carbon is/are added and heated to e.g. 1000° C. or more before manganese is added. Herein, the nanoparticles or the nanoparticle precursor may be added before, together with or after manganese.

In one embodiment, the nanoparticles made from material X may be added to the raw materials before melting, or may be added to the melt. The nanoparticles of material X are preferably pre-mixed and pelletized together with any one of the metals, preferably manganese, before it is added to the melt, as this is believed to facilitate the dispersion of the nanoparticles in the melt In another embodiment, a precursor material of the nanoparticles may be added. This may be a metal that upon solidification of the melt forms nanoparticles. As one example, it has been observed that the addition of vanadium to the melt leads to the formation of vanadium carbide precipitations that have a size in the nanometer range, so that in this embodiment the nanoparticles are only formed upon solidification. The precursor material of the nanoparticles is preferably a metal, and more preferably a metal that is able to form carbides. Examples of such metals include vanadium, zirconium, titanium, molybdenum, niobium, tungsten and chromium.

The precursor material is preferably a metal that is able to form a carbide with a melting temperature 1500° C. or more, but 3300° C. or less, such as 3200° C. or less. It is believed that metals that form carbides with higher melting points have a too high tendency to form carbides, which in turn gives rise to unwanted particle growth, thereby forming carbide precipitations in the mm range. Thus, preferred precursor materials are vanadium, titanium, molybdenum, tungsten and chromium, as their carbides exhibit a melting point within the aforementioned range.

In case a metal that is able to form carbides is added, it should be ensured that the amount of carbon added is adjusted to compensate for the reaction with the nanoparticle precursor, so that sufficient carbon remains for stabilizing the desired τ or ε phase.

Of course, it is also possible to add both nanoparticles and one or more nanoparticle precursor materials, but generally only one of these is added. Further, it has been observed that the growth and distribution of nanoparticles formed from nanoparticle precursors may be difficult to control and is influenced to a greater extent by the process conditions such as cooling rates, so that the embodiment wherein nanoparticles are added is preferred from a practical viewpoint.

Regardless whether nanoparticles or one or more nanoparticle precursors are added, it is preferred to provide for a sufficient mixing and dispersion of the nanoparticles and/or the precursor in order to distribute the nanoparticles present in the solidified material.

The temperature reached in this melting step is typically in the range of 1300° C. or higher, preferably 1350° C. or higher, more preferably 1450° C. or higher, such as 1500° C. or higher. The upper limit is set by the melting point of material X in case that nanoparticles are added. Preferably, the upper limit is 100° C. or more lower than the melting point of material X. Working in the range of 1400° C. to 1700° C. is typically sufficient to obtain the melt and also reduces losses due to evaporation. Accordingly, the temperature may preferably be from 1400° C. or higher to 1700° C. or lower. The heating can be effected by any means known in the art, but induction melting is preferable.

It is preferable to heat the material to the melt for a sufficient time in order to obtain a homogeneous melt by thermal diffusion of the components, e.g. for 5-20 minutes or longer at 1400° C. or higher, such as 1500° C.

The step i. is preferably conducted under inert gas atmosphere (such as argon or nitrogen), in order to avoid the formation of oxides.

Step ii. Processing to Particulate Form

In step ii., the composition obtained from step i. is processed to form particles containing an MnAl alloy comprising the ε phase and/or τ phase. Again, here preferably inert gas is used. The particles obtained at the end of this step comprise the alloy of aluminum, manganese and optionally carbon as well as nanoparticles made from material X that are dispersed in the alloy, regardless of whether pre-formed nanoparticles or one or more nanoparticle precursor has been added in step i.

This step can be performed by many methods known in the art, with gas atomization or liquid atomization being preferred and gas atomization being more preferred. The gas used for the gas atomization is preferably oxygen-free, and is preferably selected from argon, nitrogen, helium and neon. The atomization gas is normally argon or nitrogen (at a pressure between 5 to 300 bar, more preferably between 10 to 100 bar, such as 20 bar).

The formation of the particles by gas atomization has the advantage over other techniques for preparing alloy particles, such as grinding of a cast ingot, that the stress on the alloy is low, so that disturbances of the crystal structure can be minimized. This in turn allows obtaining a more homogeneous material. Further, the obtained particles have an almost spherical shape, which is preferably for many later process steps and/or end applications. Specifically, the round shape of the obtained particles allows easy orientation in a magnetic field, which can be beneficial even after a milling step as it allows an increase in powder density and improvement of powder flow and facilitates alignment. Finally, the gas atomization process allows obtaining a rapid cooling of the molten alloy, which avoids the formation of the τ phase and leads to particles having a high content (purity) of the ε phase. This, in turn, allows obtaining particles having a high τ phase content in a subsequent treatment step transforming the ε phase into the τ phase.

While step ii. can be applied to all MnAl alloys, such as those having a composition within the scope of formula (I), it is preferably employed for a MnAl alloy having a composition of formula (II). This is due to the fact that in such cases a very pure ε phase can be obtained, as demonstrated by FIG. 9.

FIG. 9a shows at the top the diffractogram (XRPD) of a sample having the composition $Mn_{53}Al_{47}C_{1.50}$, and at the bottom of a sample having the composition $Mn_{57}Al_{43}C_{2.04}$, both directly after gas atomization under identical conditions. As can be seen from the XRPD data, the sample at the top falling within the scope of formula (I) shows a reasonably good purity, yet some impurities (γ2, β) are also present as derivable from the minor peaks around 42-43° in 2θ. Such peaks are also present in the alloy having a composition of formula (II) shown in the lower part, yet to a lesser extent. Interesting to note is also the similarity of the grain-matrix structure, as represented by the SEM pictures shown in FIGS. 10a and b. Notably, the difference in composition between the grains and the matrix is smaller for the alloy in accordance with formula (II). This is reflected in the microstructure after high temperature treatment, as illustrated in FIGS. 10c and d.

While thus gas atomization leads to a good product in terms of homogeneity and purity of the ε phase when an alloy having a low Mn content is used, an even better product is obtained when gas atomization is conducted on an alloy of formula (II) having a high Mn content of 56 to 59 (relative to Al and Mn being 100).

The particle size obtained in step ii. is not particularly limited and can be adjusted by selected the appropriate conditions. Typically, the powders obtained from a gas atomization process have a weight-average particle size (or particle diameter) D50, as determined by a laser light scattering method, of 200 μm or less, preferably 150 μm or less, and more preferably in the range of 30-80 μm.

Step iii. Annealing

In order to obtain a material having a high content of τ phase and good magnetic properties, a heat treatment at 350–700° C., preferably 400 to 650° C. or 400 to 600° C., such as from 450-550° C. is conducted for a suitable time, such as 0.5-24 hours, preferably 1 to 10 hours, such as 2-4 hours, e.g. 3 hours. This is illustrated in FIG. 9b, showing the respective XRPD diagrams after 3 hours at 650° C. This step is again preferably conducted under vacuum or under inert gas, such as argon. The microstructure after such treatment is very similar to the microstructure achieved directly after atomization (FIGS. 10a and b).

As shown in FIG. 9b, the material at the top having the composition $Mn_{53}Al_{47}C_{1.50}$ has a high purity of τ phase of about 87%. The magnetization at 9T was 112 emu/g at 9T, which is a very good value.

Conversely, the material of formula (II) shown at the bottom of FIG. 9b having the composition $Mn_{57}Al_{43}C_{2.04}$ shows actually a lower purity of the τ phase, even though the starting material had a higher purity of the ε phase. This is also reflected in the magnetic properties, as the sample had still a good, but slightly lower magnetization of 109 emu/g at 9T.

A heat treatment as described above is thus able to convert a material having a lower purity of ε phase after particle formation into a material having actually a higher purity (and/or quality) of the τ phase. In consequence, the present invention also includes an embodiment wherein gas atomization is conducted on a composition comprising an alloy of formula (I) wherein x' is less than 56, e.g. 55.8 or lower but 50 or higher, preferably 54.5 or lower and 52.0 or higher, y' is higher than 44 but 50 or lower, preferably 45.5 or higher and 48.0 or lower (with x'+y'=100), and z' is 1.70 or less and 0.10 or more, preferably 1.50 to 0.80, followed by a heat treatment as described above. This allows obtaining a material rich in τ phase and having a magnetization of 110 emu/g (at 9 Tesla) or higher.

If desired, the material obtained from step a. may optionally be subjected to a further micronization treatment. This could for instance include a ball milling, e.g. the cryo milling of step c.

Step ii.b: Cryo Milling

"Cryo milling" is the term used for milling a material at a temperature of −20° C. or lower, such as −100° C. or lower, preferably −150° C. or lower, and is defined as step ii.b in the claims. Herein, a composite material obtained after step i. is milled at a temperature of −20° C. or below, preferably −100° C. or lower, further preferably −150° C. or lower, and still further preferably −180° C. or lower. From a practical standpoint, it is most preferred to conduct the cryo milling at the boiling temperature of nitrogen under atmospheric pressure (−196° C.).

It has been found by the present inventors that conventional milling operations, such as ball milling at room temperature, induce the formation of defects in the crystal structure and lead to deteriorated magnetic properties, in particular saturation magnetization, while leading to an increase in coercivity. Without wishing to be bound by theory, it is believed that the ε to τ transformation is highly dependent on the nucleation of the τ-phase at the interphase with the τ-phase, and hence, a microstructure with a high surface to volume aspect ratio of both grains and particles may be important in order to promote the τ-phase formation. Results indicate that the rate of formation of τ-phase from τ-phase is much faster from a smaller grained powder form than from coarse-grained material in bulk form (e.g. ingots).

The shape and surface morphology of the particles can be controlled by the type of milling technique and processing parameters. An optimal size, spherical shape and smooth surface of the particles may help or facilitate achieving a preferred magnetic alignment of the powders particles, e.g. in a compression tool prior to compaction. Such particles are better designed to respond and rotate more easily to external magnetic fields. The particles will align along the c-axis (easy axis) in a magnetic field. The alignment is preferably performed inside the compaction tool just before and/or during the compression or molding movement. Aligned particles will result in an enhanced remanent magnetization (Mr) of the magnet body, i.e. the magnetization left behind in the body after the external magnetic field has been removed.

It is observed that gas atomized powders are more spherical and have smooth surfaces as compared to water atomized powders. Thus, gas atomized powders are preferred as they may expose a higher degree of smooth spherical surfaces even after a subsequent milling operation. Optionally, milled powders of any synthesis method may be subjected to spherodization methods, e.g. plasma spherodization by Techna® Group.

The starting material for the cryo milling may be the particles obtained by gas atomization of the molten alloy including the nanoparticles.

Moreover, milling of brittle materials results in smaller and sharper particles as compared to milling of soft material. On the other hand, milling of soft material will result in relatively larger particles, or even flakes for the same energy input. Milling on softer material often gives smaller grains, a more stressed crystal structure, or even result in an amorphous state. This is a further reason why in one embodiment the method of the present invention preferably comprises cryo milling, preferably on composite of the invention comprising an alloy of formula (I) or (II) containing τ phase.

As the hardness of ε-phase is significantly higher than the τ-phase, milling on either phase will have a decisive impact on the final properties. Also, cryogenic milling will make the powder even more brittle and, thus, influence the outcome of the milling in a similar way.

The starting material for the cryo milling can thus be any composite material comprising the alloy of formula (I). The starting materials can contain ε or τ phase, preferably in a predominant amount (e.g. more than 50% or 70%, as determined by XRD, see section 1.3), and is in one preferred embodiment a material containing τ phase. This material containing τ phase can be obtained direct from the melt including the nanoparticles by employing a suitable cooling rate as is known in the art, and in this case the particles already including mainly τ phase can be subjected to cryo milling without any intermittent heat treatment step. If, however, the material is first processed to form particles containing mainly ε phase, an intermittent annealing step may be conducted prior to the cryo milling in order to transform the ε phase into τ phase. This transformed material may then be cryo-milled, and then the annealing of step iii. can be conducted.

It follows that in one embodiment the starting material for the cryo milling can be a composite material containing mainly the τ phase of the alloy of formula (I) or formula (II) that is obtained by a cooling process, with or without any subsequent treatment for increasing the content or purity of the τ phase. It however can also be an ε phase containing MnAl alloy of formula (I) or (II). I t can also be an ε phase containing material of formula (II) wherein x' is lower than 56, such as 55.8 or lower, and a value of y of higher than 44, such as 44.2 or higher, and a value of z' of 1.7 or lower, on which optionally further a heat treatment at 350–700° C. for 0.5-24 hours, as outlined above, has been performed.

The milling technique can be freely chosen from conventional milling techniques, such as ball milling, jet milling, pin milling etc, or other high shear processes such as hot extrusion. In one embodiment, the cryo milling step employs ball milling at a ball-to-powder ratio (by volume) of 10:1 to 30:1 for a suitable duration, such as 1 to 30 minutes, preferably 2 to 10 minutes.

The milling is preferably conducted under vacuum or under inert gas atmosphere, such as under argon, in order to avoid the formation of oxides. The material is preferably milled to a small particle diameter (expressed as weight D50 and determined by a laser light scattering method) of e.g. 100 μm or less, preferably 50 μm or less, more preferably 30 μm or less, further preferably 10 μm or less, still further preferably 5 μm or less, such as 3 μm or less. In order to minimize distortions of the structure and deterioration, the cryo milling is preferably conducted for as short time as possible, but as long as necessary in order to obtain the required particle size and degree of micronization, and/or degree of crystal amorphization, which depends on the hardness of the material and the milling equipment used. For instance, the (cryo) milling is preferably performed for 10 hours or less, preferably for 5 hours or less, and still further preferably for 4 hours or less, but for 30 seconds or more, and often for 1 minute or more.

The powder prior milling could be coated with minor amounts (<0.1% by weight) of an organic substance, such as surfactants or fatty acids such as oleic acid, commonly known as surfactant-assisted milling. Without being bound to any theory, the additive may protect the surfaces for excess oxidation and minimize agglomeration during milling caused by adhesive or electrostatic forces between particles.

Flash Heat Treatment

Flash heat treatment denotes a heat treatment on particles of the composite material that is performed at a temperature of 900 to 1000° C. for a time of 0.5 to 20 minutes, preferably 5 to 15 minutes, more preferably 8 to 12 minutes. This step is also referred to as "flash heating" or "flash heat treatment". The flash heat treatment is not only able to transform the ε phase into the τ phase, but can also increase the purity of the τ-phase by reducing the amount of undesired non-magnetic phases.

It had been found by the present inventors that the structural distortions that are caused by processing operations such as milling in a pure alloy (not containing nanoparticles) can, at least in part, be reversed and the degree of purity of the τ phase be greatly improved by performing a flash heat treatment step as outlined above on particles of an MnAl alloy of formula (I) or formula (II). This so-called "flash heat treatment" allows obtaining an excellent combination of high magnetic saturation and coercivity after the micronization process used for particle formation. However, it has now been found that such a flash heat treatment is actually not necessary for the composite material of the present invention including the nanoparticles, as even without such a treatment a phase of high purity can be obtained by virtue of the presence of the nanoparticles. This shows that the composite material of the present invention not only has the potential of achieving better magnetic properties, but also that it can be produced more efficiently. Nonetheless, the flash heat treatment might be able to improve the quality of the composite material in case there were flaws during the initial preparation of the alloy led to a reduced phase purity of the alloy present in the composite material.

If conducted, the flash heat treatment is preferably performed by first effecting a heating at relatively moderate temperatures at e.g. 200-500° C. in vacuum or reduced pressure to ensure the desorption of water, oxygen or oxygenated species. Thereafter, the particles can be heated up further, either in vacuum or inert gases. In this respect, it is preferred to use high heating rates of e.g. 25° C./min or higher, such as in the range of 30-60° C./min, between 600 and 900° C. in order to maximize the time above the temperature at which the ε to τ transition occurs (860-900° C.).

The temperature is then held between 900 and 1000° C. for 0.5 to 20 min, preferably 5 to 15 minutes. It is preferred to keep the time as short as possible, in order to restrict grain growth and sintering of the particles. The suitable time depends also on the surface area, the degree of crystal strain as induced by the shear forces during micronization and the shape of the material, and often 5-10 minutes are sufficient to form the τ phase.

Subsequently, the material is cooled down, typically to room temperature. Again, the dwell time in the temperature range between 600 and 900° C. is again held as short as possible also during cooling, so that the cooling rate is typically also 25° C./min or higher, such as in the range of 30-60° C./min. Minimizing the time in the temperature range between 600 and 900° C. on both heating and cooling allows avoiding or minimizing the formation of impurities, such as β and γ2.

Optionally, the atmosphere pressure at higher temperatures (700° C. or higher) can be increased in order to limit the loss of manganese and thus limit the risk of forming non-magnetic impurities. This can be achieved by increasing the pressure, e.g. nitrogen or argon, at above 1 bar.

The starting material is preferably in a size and shape that does not require further processing. The starting material is thus preferably particles having a small particle diameter (expressed as weight D50 and determined by a laser light scattering method) of e.g. 100 μm or less, preferably 50 μm or less, more preferably 30 μm or less, further preferably 10μ or less, still further preferably 5 μm or less.

By this flash heat treatment step, τ phase is formed. This is shown in FIG. 9d, showing the XRPD data for a sample having the composition $(Mn_{57}Al_{43})C_{2.0}$.

At the bottom of FIG. 9d, the XRPD data of the sample obtained after gas atomization (step a., ε phase), cryo milling (step c., 6 minutes) and flash heat treatment (step d.) is shown. In other words, a cryo milled ε phase was the starting material for the flash heat treatment. As is clearly derivable form the data, the material after flash heat treatment is relatively pure τ phase, even though the starting material was mainly ε phase. This material showed a magnetization of 77 emu/g (at 9T).

At the top of FIG. 9d, the same material is shown, wherein additionally between the steps of gas atomization (step a.) and cryo milling (step c.) a heat treatment for transforming the ε into the τ phase has been conducted (step b.). In other words, a cryo milled τ phase was the starting material for the flash heat treatment. The obtained material after flash heat treatment shows also high purity of the τ phase and a magnetization of 83 emu/g at 9T.

This shows that a flash heat treatment step is able to provide particles having the desired shape (as present in the particles as starting material) having a high content and high quality of τ phase. However, as outlined above, flash heat treatment or another heat treatment at higher temperatures may not be necessary due to the presence of nanoparticles. In consequence, in one embodiment the temperature of the material does not exceed 700° C. from the end of step i. to the end of step iii. Hence in one embodiment the method of the present invention does not comprise flash heat treatment as described above.

Methods for Forming a Shaped Object, Shaped Object Obtained Thereby, and Electric or Electronic Device Comprising the Same The methods of the present typically deliver a composite material in particulate form, and in consequence the composite material of the present invention is in one embodiment present in particular form. Here, the particles of the composite particles may have a median particle diameter D50 by weight, as determined by a light scattering method, of 5000 μm or less, more preferably 1000 μm or less, further preferably 500 μm or less, still further preferably 100 μm or less, such as in the range of 10 to 100 or 15 to 80 μm.

Such particles are however often not suitable for use as a magnet in real applications, as to this extend a solid shaped object having a larger size such as at least 1×1×1 mm or a volume of at least 1 mm$^3$ is required. This shaped object should also possess structural integrity to be able to be used in e.g. electric or electronic devices. It thus often necessary to process the composite material to form a shaped object. To this end, any method known in the art can be used, such as extrusion, compaction, additive manufacturing and plastic molding.

In order to form the shaped object and to provide it with structural integrity and strength, quite often also binders and/or other additives may be required, while also hot extrusion without any additives (or only inorganic additives) may be contemplated. Such binders may for instance include a polymeric material, to thereby allow e.g. extrusion molding of a composition comprising the composite material of the invention. Here, the polymeric material may be selected from suitable materials, including general engineering plastics. These may be selected from e.g. olefin polymers such as PE, PP, polyisobutylene, polyesters, polyamides, polyurethanes, silicones, mixtures and copolymers thereof. In such a composition for forming a shaped object including binders, also optionally other additives may be present, such as pigments, dyes, antioxidants, plasticizers, rheology modifiers, crosslinking agents, etc. The relative amount of the composite material in such a composition for forming a shaped object, and consequently also in the shaped object itself, may be 40% by weight or higher, such as 50% by weight or higher or 75% by weight or higher.

The shaped object is then typically magnet that can be used for all applications for which magnets are employed. This includes magnets used for e.g. magnetic locks, billboards or for holding smaller items or graphical representations ("Fridge magnets"), but also for electric and electronic devices, such as electric motors or computing devices, such as computer hard drives. Further possible applications include speaker systems, earphones, or wind generators.

EXAMPLES

The following Examples 1 and 2 relate to the manufacture and properties of MnAlC alloys, and hence are not representative for the claimed composite material that additionally includes nanoparticles made from material X. These nanoparticles are absent from the materials of Examples 1 and 2, but are present in Examples 3 and 4 that illustrate composite materials of the present invention. Yet, Examples 1 and 2 are given to provide a better understanding of synthesis of MnAlC alloys and the factors that influence their magnetic properties, in particular saturation magnetization Ms and coercivity Hc, and the problems and pitfalls that occur in the absence of nanoparticles.

Example 1

1.1. Sample Synthesis

An $Mn_{0.55}Al_{0.45}C_{0.02}$ alloy ingot of 20 g was synthesized by a drop synthesis process starting from a melt at 1400° C., similar to a synthesis method described in H. Fang et al, Journal of Solid State Chemistry 237 (2016) 300-306. The raw materials were all of high purity, using Mn (Institute of Physics, Polish Academy of Sciences, purity 99.999%), C (Highways international, 99.999%) and Al (Gränges S M, purity 99.999%).

First, Aluminum was heated and melted with carbon black in a alumina crucible at 1000° C. after the atmosphere was evacuated and high vacuum established (<0.001 bar). Small pieces of Mn metals were subsequently dropped into the melt of Al and C, then the eddy current power was increased to enable the Mn pieces to react with Al—C liquid immediately. The melt was kept at 1400° C. for 10 minutes to ensure that the Mn—Al—C liquid forms a homogeneous alloy solution.

The Mn—Al—C alloy was cooled down to room temperature by cooling the ingot in vacuum over a water-cooled Cu plate. The achieved cooling rate allows the alloy to form τ-MnAl of high purity directly. The resulting material is in the following also referred to as "drop synthesized" material.

1.2. Cryo Milling Process

Cryogenic milling was performed at liquid nitrogen temperatures (−183° C.) using a SPEX Freezer/Mill® 6770. The starting material prepared above was placed in a stainless steel vial with a stainless steel cylindrical impactor. The mass ratio between the impactor and the powder was 30:1. Before the milling was started, the vial was allowed to cool down for 30 min in the liquid nitrogen bath of the Freezer/Mill®. The milling was then carried out at an impact frequency of 30 Hz for a total of 2 (CM2) or 4 hours (CM4). Each milling run consisted of 5 minutes milling and 3 minutes pause cycles.

A smooth spherical particle shape is easiest to align along the easy magnetization axis in a magnetic field. Cryo milling allows obtaining particles that may undergo such an easy alignment, as it does not lead to the formation of sheet-like particles with random orientation as was observed when milling is performed at ambient temperatures (see e.g. H. Jian et al, "Microstructure and magnetic properties of Mn—Al—C alloy powders prepared by ball milling" Journal of Alloys and Compounds 622 (2015) 524-428, or Z. Liu et al "Structure and Properties Evolutions for Hard Magnetic MnAl and MnGa based Alloys prepared by Melt Spinning or Mechanical Milling", Mater. Sci. Eng. Adv. Res 1(1) 12-19).

The smooth and spherical particle shape obtained by cryo milling was confirmed by visual inspection of particles obtained after 2 hours and 4 hours cryo milling using SEM imaging. Here, it was confirmed that the average particle size of the particles remained about 20 μm after 2 and 4 hours cryo milling, respectively. The surface smoothness increased somewhat at longer milling times.

1.3. Diffraction Studies

X-ray powder diffraction (XRD) was performed at a Bruker Twin-Twin diffractometer, with a Cu double Kα radiation ($\lambda 1=1.540598$ Å, $\lambda 2=1.544390$ Å). The neutron powder diffraction was carried at JEEP-II reactor of IFE (Institution for Energy) at Kjeller, Norway. The neutron diffraction patterns were detected by a high pressure neutron diffractometer. The crystal structure and phase analysis were treated by Fullproof™ software through the Rietveld method as described in H. Rietveld "A profile refinement method for nuclear and magnetic structures", J. Appl. Crystal. 2(2) (1969). The peak shape of the diffraction pattern was characterized by the Thompson-Cox-Hastings pseudo-Voigt function.

The phase transition behaviors of 2 (CM2) and 4 (CM4) hours cryo milled $Mn_{0.55}Al_{0.45}C_{0.02}$ samples when heated and cooled at different rate was investigated by in situ synchrotron X-ray diffraction at the P02.1 beamline at PETRA III ($\lambda=0.207$ Å). The powder cryo milled $Mn_{0.55}Al_{0.45}C_{0.02}$ samples were loaded in a single crystal sapphire tube, the tube was wounded by Kanthal wire and heated up to 900° C. in vacuum (50° C./min), dwelled at 900° C. for 5 minutes, then cooled (50° C./min) to room temperature. The temperature was monitored by a K Type thermocouple insert from one side of the sapphire tube with close contact to the sample. The sample to detector distance and X-ray beam wavelength was determined and calibrated by the NIST LaB6 standard sample. The X-ray diffraction patterns were recorded by a PerkinElmer XRD1621 fast area detector. The diffraction patterns of 2D pictures were transformed to 1D diffractograms by the Fit2D™ program.

1.4. Flash Heating

For the flash heating process, samples were first put into $Al_2O_3$ crucibles, the crucibles were sealed in evacuated quartz tubes. Then, the ampoules were transferred to a pre-heated resistance furnace and "flash heated" at 900° C. for a total time of 1 minutes, 5 minutes, and 15 minutes respectively, followed by cooling the ampules in ambient air.

1.5. Magnetic Properties Characterization

Powder samples were placed in gelatin capsules with varnish. The capsule and varnish together contribute a paramagnetic moment at 300 K and account for <0.01% of the saturation magnetic moment at 9 T. Samples were measured in a Physical Properties Measurement System (PPMS) from Quantum Design equipped with a 9 T superconducting magnet or a MPMS from Quantum Design. Magnetization in SI units and μB were calculated from the sample weight and using the lattice parameters obtained from the XRD/NPD refinements.

1.6 X-Ray and Neutron Powder Diffraction

The refined powder diffraction data of as-synthesized (FIG. 3a/b), 2 h cryo milled (2CM, FIG. 3c/d) and 4 h cryo milled (4CM, FIG. 3e/f) samples are shown in FIG. 3.

From the XRPD data (FIG. 3a, c, e) a clear decrease in the peak intensities combined with a pronounced peak width broadening is observed with longer milling time. In addition, several of the weaker peaks (i.e., 1.73, 2.27 and 3.47 Å$^{-1}$) related to the τ-phase (i.e., the (001) and the (100) and the (002) planes), gradually disappear with longer milling time. However, the remaining strong reflections (i.e., between 2.7 Å$^{-1}$≤Q≤3.5 Å$^{-1}$) from XRPD indicate that a crystalline phase is still preserved. On the contrary, the NPD data (FIG. 3b, d, f) show a strong decrease of the reflection intensities for the 2CM sample, while no reflections are observed for the 4CM sample (FIG. 3f), reminiscence of an amorphous phase.

The combined XRPD and NPD data (FIG. 3) of the DS, 2CM and 4CM samples were used to refine the lattice parameters in the space group P4/mmm. The NPD data was, however, not refined for the 4CM due to the lack of peaks. From Table 1 with data obtained from the Rietveld refinement of the combined XRPD and NPD data, the occupancy of the Mn and Al-sites are found to vary with increased milling time. It is found that the Mn content at the Mn 1a (0, 0, 0) site decreases from 94% to 75%, while the Al content increases from 6% to 25% after 2 hours of cryo milling. The opposite is observed at the Al 1d (½, ½, ½) site, where the Al content decreases from 85% to 66% after 2 hours of cryo milling (Table 2).

FIG. 4 shows refined XRPD patterns of the flash heated 2CM and 4CM powders. It is clearly observed that the flash heating process recrystallizes the powder significantly after only 5 min (FIG. 4a, c) to produce peaks comparable to the original DS sample (FIG. 3a).

All the XRPD patterns for the flash heated samples contain detectable amounts of the γ2-phase (FIG. 4) that are mainly observed ~3 Å$^{-1}$, but the amount of these phases is quite low (<10%). The structural model with the same Mn and Al occupancies as in the DS sample indicates that a reordering of the Mn and the Al on the two crystallographic sites takes place upon the heat treatment (Table 1).

TABLE 1

Refined atomic occupancies for the DS, 2CM, 4CM and the cryo-milled and flash heated samples

| Sample | Atom | Site occupancy 1a(0,0,0)(%) | Site occupancy 1d(1/2,1/2,1/2)(%) |
|---|---|---|---|
| DS | Mn | 94.8 | 14.5 |
|  | Al | 5.2 | 85.4 |
| 2 hours CM | Mn | 75.4 | 33.5 |
|  | Al | 24.6 | 66.4 |
| 4 hours CM | Mn | N/A | N/A |
|  | Al | N/A | N/A |
| Cryo-milled and flash heated | Mn | 94.8 | 14.5 |
|  | Al | 5.2 | 85.4 |

The above results show that the flash heating process is able to re-form the τ phase, even after processing steps such as milling that lead to a loss of the previously present τ-phase. These results are also in agreement with the XRPD and NPD patterns shown in FIGS. 3 and 4, where FIG. 4 shows the refined XRPD of cryo milled and flash heated samples; FIG. 4a) 2 hours cryo milled and 900° C.+5 minutes flash heated; FIG. 4b) 2 hours cryo milled and 900° C.+15 minutes flash heated; FIG. 4c) 4 hours cryo milled and 900° C.+5 minutes flash heated; FIG. 4d) 4 hours cryo milled and 900° C.+15 minutes flash heated.

To further investigate the stability range of the τ-phase as a function of heating rate and temperature, the 2CM sample was analyzed in situ by synchrotron radiation ($\lambda=0.207$ Å). During the measurement, the powder was subjected to a heating rate of 50° C./min from room temperature up to 920° C. and was kept for 5 minutes before being cooled down to room temperature again, with a rate of 50° C./min. It was observed that the 2CM powder decomposes into a mixture of β-phase and τ-phase at ~500° C. At T>900° C. the powder transforms fully into pure ε-phase. However, during the cooling process at a cooling rate of 50° C./min, pure τ-phase is reformed again at T<830° C.

The effect of the cryo milling process on the magnetic properties (i.e., Hc and Ms) was evaluated from magnetization versus magnetic field measurements. From the magnetic hysteresis loop of the DS sample (cf. FIG. 5a) the coercive field is obtained as μ0Hc≈40 mT, while the value of the saturation magnetization Ms≈614.8 kA/m is close to the theoretical maximum of the magnetization. Furthermore, the effect on the magnetic properties from cryo milling followed by flash heating (1 min, 5 min and 15 min) is illustrated by the M-H measurements of 2CM and 4CM in FIG. 5b,c,d.

Overall, the magnetization decreases significantly with increasing milling time. After 1 min of flash heating at 900° C., the Ms for 2CM and 4CM only recovers to ~40% and ~19% of the original DS sample. The Hc is, however, ~475% and ~750% higher than the original DS sample, respectively (see Table 2). Further increase of the flash heating time from 1 min to 5 min at 900° C. results in an Ms value ~88% and ~84% of the DS sample for the 2CM and 4CM samples, respectively. The Hc values for the 2CM and 4CM samples are however, only ~200% and ~300% higher than the original DS sample after 5 min of flash heating at 900° C. Moreover, heating for 15 min only resulted in minor changes as seen in Table 2.

TABLE 2

Influence of cryo milling and flash heating on magnetic properties of drop-synthesized (DS), cryo milled (CM) and cryo milled and flash heated (fh) samples

| Material | $M_s$ (kA/m) | $M_s$ ($\mu_{B/f.u}$) | $M_r$ (Am²/kg) | Mr/Ms (%) | $\mu_0 H_c$ (mT) |
|---|---|---|---|---|---|
| DS | 614.8 | 1.83 | 23.6 | 19.6 | 40 |
| CM 2h | 104.5 | 0.31 | 7.34 | 35.9 | 380 |
| CM 2h (1 min fh) | 248.4 | 0.74 | 15.9 | 32.8 | 230 |
| CM 2h (5 min fh) | 542.5 | 1.61 | 26.2 | 24.7 | 120 |
| CM 2h (15 min fh) | 527.9 | 1.58 | 25.9 | 24.9 | 130 |
| CM 4h | 29.8 | 0.09 | 1.33 | 22.8 | 50 |
| CM 4h (1 min fh) | 117.6 | 0.35 | 8.21 | 35.5 | 340 |
| CM 4h (5 min fh) | 515.8 | 1.53 | 29.1 | 28.8 | 160 |
| CM 4h (15 min fh) | 515.2 | 1.53 | 28.0 | 27.7 | 150 |

From the magnetic properties of the DS sample, the Ms value ~614.8 kA/m (~120.5 Emu/g) reach nearly the theoretical limit 676.4 kA/m for, indicating that the ε to τ transformation is nearly complete. Yet, the Hc value is low at 40 mT, which may not be sufficient for many industrial application. Notably, Hc is greatly increased by cryo milling.

Without wishing to be bound by theory, it is believed that the flash heating (besides minimizing impurities such as β and γ2 phases) re-orders the Mn and Al in the crystal lattice, and is in particular effective to heal defects in this ordering that have been induced by the milling procedure.

Example 2

2.1 Synthesis

First, aluminum metal (Stena Aluminium AB, Sweden, >97 wt %) was melted together with graphite (Carbomax AB, Sweden, >98.5 wt %) at a melt temperature of about 1100° C. in an argon atmosphere. Thereafter, the manganese metal (Manganese metal company Ltd, SA, >99.7 wt %) was added and the melt temperature was adjusted to 1400° C. and held there for 5 minutes prior to gas atomization under an argon atmosphere at a pressure of about 19 bar. This caused a rapid cooling of the gas-atomized particles to form ε-MnAl alloy of high purity and low oxygen content (ca 0.03 wt % for gas-quenched). The raw materials were carefully adjusted to give the compositions of the samples presented in Table 3.

2.2 Milling

The gas-atomized particles were then milled using an MM 400 mixer mill (Retsch GmbH) capable for dry, wet or cryogenic grinding, optionally under argon atmosphere. A 50 mL hardened steel vial, 25 mm balls and an impact frequency of 30 Hz for 6 min with 15:1 ball-to-powder ratio were used.

The powders were prior coated with 0.02 wt % oleic acid (as applied by acetone that was allowed to vaporize prior to milling). Before the cryo-milling was started, the sealed vial was allowed to cool down for 30 min in a bath of liquid nitrogen. Between each 3 min of milling the vial was let to cool down again for 15 min. The cry milling was performed under the conditions outlined in section 1.2 above.

2.3 XRD Measurements

XRD measurements were performed using a Panalytical X'Pert Pro PW3040 Multi Purpose Diffraction system equipped with X-Celerator solid state line detector. Experimental data were processed using Panalytical B.V. X'Pert HighScore Plus software, version 4.0. The measurement conditions were Cu Kα 0.15406 nm, accelerating voltage 45 kV, current 40 mA, Ni-filter, 2θ-scan range: 20-100°, divergence slit 0.5, time 30 min. The quantitative analysis by refinement of the phases was performed manner as described above in section 1.3.

2.4 Magnetic Measurements

The samples were characterized with respect to their magnetic characteristics with a LakeShore 7400 VSM (maximum applied field 1.8T) and a Quantum Design PPMS (maximum applied field 9T). Samples were placed in gelatin capsules and fixed with a weakly paramagnetic varnish (<0.01% of the moment at 1.8 T). A density of 5100 kg/m3 was assumed.

2.5 Differential Scanning Calorimetry (DSC)

The melting and cooling behavior of the powders were measured with a Simultaneous Thermal Analysis instrument (TGA & DCS) from Netzsch (Jupiter STA 449 F3); method 10° C./min to 1250° C. in argon gas, sample size ca 40 mg.

2.6 Scanning Electron Microscopy (SEM)

Particle samples were mounted in fina met with added carbon CUF-4 and bakelite PhenoCure™, grinded and polished down to 1 μm by standard process. It was polished with OPS-S Non-drying colloidal silica suspension for 5 minutes in order to improve planeness. The sample was subsequently etched in a diluted modified Keller's reagent: with HCl 6 ml, HNO₃ 3 ml, HF 1 ml and H₂O 290 ml. A thin layer of Au was sputtered on the surface to improve surface conductivity. Sample was analyzed in a Field Emission Scanning Electron Microscopy (FE-SEM) Hitachi SU6600 equipped with an Electron Discharge Spectroscopy (EDS) system (Bruker EDX XFLASH 5010).

2.7 Heat Treatment

A high temperature treatment as applied on as-synthesized powders or pieces, either in vacuum or argon. The temperature profile is shown in FIG. 7.

2.8 Flash Heat Treatment on Milled Powders

The flash heat treatment was performed in a sealed tube furnace (L 50 cm, Ø4 cm; Entech AB) using the temperature profile shown in FIG. 8. First, the sample was degassed by repeatedly filling with argon and vacuum, and then the temperature was allowed to increase slowly in vacuum (10° C./min). The vacuum was maintained at 350° C. until low and stable pressure was reached. In a second stage, the temperature was increased rapidly to 950° C. (>40° C./min) to perform a "flash treatment". The time above 900° C. was adjusted to about 8 minutes, followed by rapid cooling to ambient temperature. In the second stage the atmosphere was either vacuum or argon.

Following the synthesis scheme above, the following samples were prepared and subjected to DSC analysis:

TABLE 3

Example Compositions and DSC data

| Example | Composition | Mn/C-ratio | Complies with Formula (II) | Peak 1 Position (° C.) | Peak 1 Area (J/g) | Peak 2 Position (° C.) | Peak 2 Area (J/g) | Total Peak Area (J/g) |
|---|---|---|---|---|---|---|---|---|
| 2-B1 | $(Mn_{54}Al_{46})C_{0.76}$ | 70.6 | No | 786.9 | 20.5 | 862.1 | 3.0 | 23.5 |
| 2-B2 | $(Mn_{54}Al_{46})C_{0.76}$ | 71.7 | No | 792.4 | 24.4 | 845.0 | 3.9 | 28.3 |
| 2-B3 | $(Mn_{52}Al_{48})C_{2.36}$ | 22.2 | No | — | — | 858.8 | 14.8 | 14.8 |
| 2-B4 | $(Mn_{53}Al_{47})C_{1.58}$ | 33.2 | No | 786.4 | 21.7 | 8660. | 2.9 | 24.6 |
| 2-A1 | $(Mn_{59}Al_{41})C_{2.05}$ | 28.6 | Yes | 787.7 | 53.4 | — | — | 53.4 |
| 2-B5 | $(Mn_{61}Al_{39})C_{2.22}$ | 27.5 | No | 791.3 | 69.6 | — | — | 69.6 |
| 2-A2 | $(Mn_{57}Al_{43})C_{2.04}$ | 27.8 | Yes | 786.8 | 43.1 | — | — | 43.1 |
| 2-B6 | $(Mn_{53}Al_{47})C_{1.50}$ | 35.4 | No | 785.2 | 22.1 | 865.5 | 1.9 | 24.0 |
| 2-B7 | $(Mn_{55}Al_{45})C_{1.01}$ | 54.7 | No | 788.5 | 25.8 | 850.7 | 2.9 | 28.7 |
| 2-B8 | $(Mn_{55}Al_{45})C_{0.45}$ | 122.1 | No | 800.0 | 20 | 830.7 | 10.1 | 30.1 |
| 2-B9 | $(Mn_{57}Al_{43})C_{1.19}$ | 47.8 | No | 787.2 | 19.9 | 857.4 | 3.2 | 23.1 |
| 2-B10 | $(Mn_{55}Al_{45})C_{1.24}$ | 44.0 | No | 786.4 | 9.0 | 852.6 | 8.4 | 17.4 |
| 2-B11 | (Mn59Al41)C1.32 | 45.0 | No | 796.3 | 76.8 | — | — | 76.8 |
| 2-B12 | (Mn59Al41)C1.33 | 44.0 | No | 794.7 | 68.0 | — | — | 68.0 |
| 2-B13 | (Mn56Al44)C0.96 | 58.8 | No | 790.6 | 52.5 | — | — | 52.5 |
| 2-A3 | (Mn57Al43)C2.14 | 26.4 | Yes | 788.7 | 45.7 | | | 45.7 |
| 2-A4 | (Mn56Al44)C2.18 | 25.8 | Yes | 792.1 | 51 | — | — | 51.0 |

Of the above samples, those named "2-B" do not comply with formula (II) while those named "2-A" comply with formula (II).

FIG. 6 shows exemplary DSC graphs of materials as synthesized above (FIG. 6a: Example 2-B1, FIG. 6b: Example 2-A3). The exothermic peaks at about 450~550° C. represent the martensitic transition from ε-phase to τ-phase. At about 780~870° C. the ε-phase reforms, and at ca 1170° C. to 1240° C. the melting of the alloy starts.

The total area of the peaks between 780~870° C. correlates with the amount of carbon-stabilized τ-phase, and the total area covered by this/these peak(s) is indicated in the table above in J/g. Here, a higher area value represents a higher amount of carbon-stabilized τ-phase. However, in alloys containing up to 55% Mn, only up to 1.7% of carbon can be dissolved. Increasing the amount of Mn allows increasing the amount of carbon, which in turn leads to a greater stability of the τ phase. Further, the carbon-stabilized τ-phase is only stable for further processing (milling and heat treatment) if the Mn/C-ratio is close to 28 (in the range 26~33), i.e. a carbon-saturated or close to carbon-saturated τ-phase.

It is apparent that a higher stability of the τ phase. i.e. higher peak area in combination with a carbon-saturated τ-phase (Mn/C-ratio preferably between 28~30), could be obtained when the requirements of formula (II) are met.

Further, it is apparent from the results above that the alloys in accordance with formula (II) show only one peak in the DSC in the temperature range of 780-810° C. (or 780-800° C.), denoted as Peak 1. This indicates a higher homogeneity of the τ phase, as only one apparent transition back to the ε phase is observed.

The following additional observations were made, illustrating that adjusting the composition of the alloy in accordance with formula (II) and adjusting the Mn/C ratio is of importance:

Sample 2-B3 $((Mn_{52}Al_{48})C_{2.36})$ has a high amount of carbon and low amount of Mn. This sample contained a lot of undissolved carbon that forms carbides after heating to 550 or 1100° C. This was confirmed by significant peaks for $Mn_3AlC$ in the XRPD (see also FIG. 9g). Further, the total peak area of 14.8 J/g indicates an amount of carbon dissolved in the τ phase of less 1.87%, and the material is not stable upon heat treatment.

Interestingly, the material does not at all exhibit a DSC peak 1 in the temperature range of 780-810° C., but only a DSC peak 2 at higher temperatures.

Sample 2-B6 $((Mn_{53}Al_{47})C_{1.50})$ contains carbon in an amount just sufficient to stabilize the τ phase, but the amount of Mn is too low to satisfy the requirements of formula (II). As explained previously and shown in FIGS. 10 a) and c), this sample has somewhat inhomogeneous composition and consequently upon a heat treatment a heterogeneous microstructure, which is shown to impair the magnetic properties.

Samples 2-B11 and 2-B12 have a high Mn/Al ratio, but lack sufficient carbon. These samples are not stable upon high temperature treatment and showed decomposition into β and γ2.

Sample 2-B5 also has an even higher Mn/Al ratio, and also sufficient carbon. Yet, this sample is at the limit where τ phase can at all be formed, potentially favoring the formation of β-phase and impairing the purity of the τ-phase (and thereby magnetic properties).

The results above show that the desired balance of properties, including inter alia high purity of the ε phase and high stability and purity of the τ phase, stability of the material against high temperature processing, good magnetic properties and improved homogeneity on a microscopic level, can be simultaneously obtained by adjusting the composition of the MnAl alloy within the boundaries of formula (II) and its preferred embodiments.

Example 3

3.1 Synthesis of a Composite Material Comprising Nanoparticles and an Alloy Represented by $Mn_{55}Al_{45}C_2$ First, aluminum metal (Stena Aluminium AB, Sweden, >97 wt %) was melted together with graphite (Carbomax AB, Sweden, >98.5 wt %) at a temperature of about 1100° C. in an protective argon atmosphere. Thereafter, about ⅔ of the manganese metal (Manganese metal company Ltd, SA, >99.7 wt %) was added, and the melt temperature was adjusted to 1500° C. Pre-mixed pellets consisting of the remainder of manganese in powder form and nanoparticles of vanadium carbide (99.9%, particle diameter 80-100 nm, INSCX exchange) was then added to the melt to achieve the desired composition. The melt is thereafter held there for 5 minutes prior to gas atomization under an argon atmosphere at a pressure of about 19 bar. This caused a rapid cooling of the gas-atomized particles to form ε-MnAl alloy of high purity and low oxygen content (ca 0.03 wt % for gas-quenched). The gas-atomized particles were cryo-milled for 3 minutes and then heat-treated at 550° C. for 30 minutes.

The following observations were made:

It was observed that with the presence of nanoparticles, a material having a high content of ε phase could be obtained even with low amounts of manganese (i.e. with materials of formula (I) wherein x is from 52.0 to 53.5, and y is from 48.0 to 46.5). In the absence of nanoparticles, such low amounts of manganese do not lead to a material having a high content of ε phase, but rather lead to the formation of unwanted phases in larger amounts, such as γ2 and β. Thus, the presence of nanoparticles allows obtaining a material having a high content of ε phase that can subsequently be converted to τ phase in cases where otherwise only a material with lower content of ε phase (and consequently lower content of τ phase after conversion) can be obtained. This shows that the formation of nanoparticles has a stabilizing effect on the desired phases ε and τ, and opens a way of reducing the amount of dopants (e.g. carbon) that are otherwise necessary for obtaining stable phases. The possibility to reduce the amount of dopants such as carbon may in turn lead to an improvement of the magnetic properties.

Further, it was observed that gas atomization allows for a good dispersion of the nanoparticles in the resulting material, and the distribution of the nanoparticles was more homogeneous than in the case of the sample preparation via the formation of an ingot and crushing described below in Example 4. Hence, gas atomization is believed to be a preferred way of obtaining a material having a more homogeneous distribution of nanoparticles, which may facilitate obtaining improved magnetic properties.

Example 4

4.1. Synthesis of $Mn_{55}Al_{45}C_2(VC)_y$ (y=0, 0.25, 0.5, 1, 3.5, 19) ingots (~15 g in total) by induction melting at 1400-1500° C.

High purity raw materials have been used: Mn (X—Mn powder from Hoganas AB, lot. 2112625, purity 99.9%), Al (Granges SM, purity 99.999%), C (Highways international, 99.999%) and VC nanopowder (High purity VC nanopowder from INSCX exchange, purity >99%, size 80-100 nm). In the samples, e.g. the composition $Mn_{55}Al_{45}C_2(VC)_{0.25}$ indicates that the relative composition is 55 atoms of Mn, 45 atoms of Al, 2 atoms of C (as part of the MnAl alloy), 0.25 atoms of V and 0.25 atoms of C (as part of vanadium carbide being the material X).

Firstly, powders of Mn and VC have been weighed, well mixed and pressed into pellets inside an argon-filled glovebox. Appropriate amounts of Al and C were mixed together with Mn/VC-pellets and filled into an $Al_2O_3$-crucible. Secondly, it was transferred to high frequency induction furnace and vacuum pumped during 1 hour. Melting was done under high purity argon atmosphere (400 mbar). When liquid state was reached, the temperature was kept for 1-3 min to form a homogeneous solution. Finally, the furnace was switched off, followed by natural cooling down to room temperature (~5 h). The total mass loss during synthesis was less than 2 wt. %. To improve the homogeneity, the melting procedure was repeated 2-3 times with a turning of the ingot inbetween. The resulting material is in the following also referred to as "induction melted" material.

The ingot was crushed and thereafter cryo milled for 3 or 6 minutes, respectively, according to the procedure described in example 2. The material was annealed under the heat treatment conditions indicated in Table 5. The as-crushed, as-milled and milled and annealed powders were analyzed according to what is described in example 2. The magnetic results, however, are measured in a modified Epping M-meter reaching 1.5T. The results are summarized in table 4.

TABLE 4

Compositions and magnetic properties throughout the processing steps

| | Composition | Heat treatment | Milling time (min) | Ms (emu/g) | Mr (emu/g) | Hc (kA/m) | τ-purity |
|---|---|---|---|---|---|---|---|
| 4.1 (Ref) | $Mn_{57}Al_{43}C_2$ | 550° C., 30 min | 6 | 43.4 | 23.1 | 313.9 | |
| 4.2 (Ref) | $Mn_{57}Al_{43}C_2$ | 950° C., 15 min top | 6 | 66.8 | 30.8 | 109.4 | |
| 4.3 | $Mn_{55}Al_{45}C_2(VC)_{1.0}$ | 550° C., 30 min | 6 | 70.1 | 32.9 | 136.5 | |
| 4.4 | $Mn_{55}Al_{45}C_2(VC)_{1.0}$ | 950° C., 15 min top | 6 | 71.5 | 25.2 | 69 | |
| 4.5 | $Mn_{55}Al_{45}C_2$ | none (as synthesized) | none | 76.5 | 10.8 | 23.1 | 85.0% |
| 4.6 | $Mn_{55}Al_{45}C_2(VC)_{0.25}$ | none (as synthesized) | None | 85.3 | 14.4 | 31.9 | 98.2% |
| 4.7 | $Mn_{55}Al_{45}C_2(VC)_{0.5}$ | none (as synthesized) | None | 81.4 | 15.1 | 34.5 | 93.9% |
| 4.8 | $Mn_{55}Al_{45}C_2(VC)_{1.0}$ | none (as synthesized) | None | 82.4 | 15.1 | 33.8 | 95.6% |
| 4.9 | $Mn_{55}Al_{45}C_2$ | none | 3 | 63.4 | 27.5 | 110.5 | |
| 4.10 | $Mn_{55}Al_{45}C_2(VC)_{0.25}$ | none | 3 | — | — | — | |
| 4.11 | $Mn_{55}Al_{45}C_2(VC)_{0.5}$ | none | 3 | — | — | — | |
| 4.12 | $Mn_{55}Al_{45}C_2(VC)_{1.0}$ | none | 3 | 68.1 | 28.0 | 98.0 | |
| 4.13 | $Mn_{55}Al_{45}C_2$ | 550° C., 30 min | 3 | 69.9 | 27.2 | 95.8 | |
| 4.14 | $Mn_{55}Al_{45}C_2(VC)_{0.25}$ | 550° C., 30 min | 3 | 78.3 | 27.4 | 84.0 | |

TABLE 4-continued

Compositions and magnetic properties throughout the processing steps

| | Composition | Heat treatment | Milling time (min) | Ms (emu/g) | Mr (emu/g) | Hc (kA/m) | τ-purity |
|---|---|---|---|---|---|---|---|
| 4.15 | $Mn_{55}Al_{45}C_2(VC)_{0.5}$ | 550° C., 30 min | 3 | 77.1 | 27.9 | 85.9 | |
| 4.16 | $Mn_{55}Al_{45}C_2(VC)_{1.0}$ | 550° C., 30 min | 3 | 75.7 | 29.1 | 90.7 | |
| 4.17 | $Mn_{55}Al_{45}C_2(VC)_{3.5}$ | 550° C., 30 min | 3 | 72.6 | 27.6 | 90.1 | |
| 4.18 | $Mn_{55}Al_{45}C_2$ | 950° C., 15 min top | 3 | | | | |
| 4.19 | $Mn_{55}Al_{45}C_2(VC)_{0.25}$ | 950° C., 15 min top | 3 | 71.0 | 21.2 | 56.6 | |
| 4.20 | $Mn_{55}Al_{45}C_2(VC)_{0.5}$ | 950° C., 15 min top | 3 | 70.9 | 22.3 | 58.5 | |
| 4.21 | $Mn_{55}Al_{45}C_2(VC)_{1.0}$ | 950° C., 15 min top | 3 | | | | |

Samples 4.1 and 4.2 are reference powders without any nanoparticles. The data shows the tradeoff between magnetic saturation and coercivity depends on which heat treatment was applied, i.e. annealing at 550° gives high coercivity but suffers from poor magnetic saturation due to the high amount of non-magnetic impurities. Conversely, applying flash-treatment at about 950° C. the purity is recovered but on the expense of lower coercivity. This is a typical example on impurity-induced coercivity mechanism and widely known in literature. A time-limited flash-treatment, on the other hand, allows a skilled person to optimize the properties in order to achieve best possible combination.

Sample 4.3 show the magnetic properties of the cryomilled (6 min) and subsequently at 550° C. annealed material. Note that the magnetic saturation (Ms) and remanence (Mr) are considerably higher than the reference and still reaches an acceptable coercivity. With increasing amount of well-dispersed nanoparticles the coercivity is increased without significant loss of magnetic saturation. Sample 4.4 shows that flash-treatment is superfluous on a nanoparticle-containing composite material having a relatively pure alloy Samples 4.5-4.8 show the magnetic properties for the as-synthesized powder (mildly crushed ingots). The reference sample without any nanoparticles is compared with similar compositions but including 0.25, 0.5 and 1.0 parts by mole nanoparticles, respectively. The data shows that the nanoparticles facilitate reaching higher magnetic saturation (thus higher τ-phase purity). The XRD data of the crushed, as-synthesized (neither milled nor annealed) material is shown in FIG. 20, with the reference material not containing nanoparticles ($Mn_{55}Al_{45}C_2$) being shown at the lower line (light grey) and the corresponding composite material with 1.0 parts by mole of VC nanoparticles ($Mn_{55}Al_{45}C_2(VC)_{1.0}$) being shown at the top (black). It is evident that the relative peak intensity for the τ phase is higher for the composite material, showing a higher purity of the τ phase already directly after the first synthesis step without any further processing.

Samples 4.9-4.12, shows the magnetic properties for the as-milled powder (3 min cryo milling). The reference sample without any added nanoparticles show lower magnetic saturation and consequently higher coercivity. The corresponding composite material containing 1.0 parts by mole of nanoparticles of VC, however, show relatively higher magnetic saturation and good coercivity. Note that the coercivity is relative high considering the τ-phase purity according to XRD (see FIG. 21). In FIG. 21, the reference material not containing nanoparticles ($Mn_{55}Al_{45}C_2$) is shown at the lower line (light grey) and the corresponding composite material with 1.0 parts by mole of VC nanoparticles ($Mn_{55}Al_{45}C_2(VC)_{10}$) is shown at the top (black), each after 3 minutes of cryo milling.

Table 5 also shows the magnetic properties for the cryo milled (3 min) and annealed (550° C., 30 min argon) powders of samples 4.13-4.16. It is clear that the magnetic saturation is considerably improved for the nanoparticle-containing composite material powders, which is also confirmed by the XRD data. Even if the coercivity is lower for the nanoparticle-containing samples as compared to the reference (sample 4.13), the overall magnetic performance is superior for the composite material comprising the nanoparticles. Note that the Mr and Hc is increasing with increasing VC-content. Samples with different nanoparticle content are also compared in the following table 5:

TABLE 5

Compositions with different nanoparticle content

| Sample | Composition | Ms (emu/g) | Mr (emu/g) | Hc (kA/m) |
|---|---|---|---|---|
| 4.13 (Reference) | $Mn_{55}Al_{45}C_2$ | 69.9 | 27.2 | 95.8 |
| 4.14 | $Mn_{55}Al_{45}C_2(VC)_{0.25}$ | 78.3 | 27.4 | 84.0 |
| 4.15 | $Mn_{55}Al_{45}C_2(VC)_{0.5}$ | 77.1 | 27.9 | 85.9 |
| 4.16 | $Mn_{55}Al_{45}C_2(VC)_{1.0}$ | 75.7 | 29.1 | 90.7 |

As can be seen from the above, the saturation magnetization Ms is improved by even small amount of vanadium carbide (VC) nanoparticles. Also, the magnetic remanence Mr is improved with increasing contents of nanoparticles.

Incidentally, the magnetic properties of sample 4.17 of the composition $Mn_{55}Al_{45}C_2(VC)_{3.5}$ did not confirm a further improvement of the magnetic properties with increasing nanoparticle content. It was however observed that here the dispersed state of the nanoparticles was not optimal, and that there were aggregates of nanoparticles present. It is thus believed that the magnetic properties can be further improved for this material by adjusting the process conditions such as to obtain a better distribution of the nanoparticles throughout the composite material, e.g. by using gas atomization instead of ingot crushing for forming the particles.

FIG. 22 shows XRD data for materials obtained by cryo milling (3 min) and following annealing in argon at 550° C. for 30 min, here again the composite material ($Mn_{55}Al_{45}C_2(VC)_{10}$) is shown in black and the reference material ($Mn_{55}Al_{45}C_2$) is shown in grey. It is clearly evident that the composite material exhibits higher τ phase purity. Peak height intensity ratio of γ2(122)/τ(011) is 0.38 and 0.16 for the reference material and the composite material, respectively. The average crystallite size of the τ-phase is calculated to about 28 nm for the composite material and about 35 nm for the reference material, based on the Scherrer broadening of the (011) peak.

This is also confirmed by the polarized light optical microscope pictures shown in FIG. 16. Here, the composite material containing nanoparticles (in an amount of 1.0 mole equivalent) shown at the top contains significantly smaller sub-grains and strikingly less crystal twinning, which is known to be detrimental for the magnetic properties.

Additionally, Atomic Force Microscopy (AFM) and Magnetic Force Microscopy (MFM) measurements were performed on 50×50 µm area that according to AFM contained regions with a high local concentration of VC-nanoparticles as well as regions with fewer VC-nanoparticles. This is illustrated in FIG. 17 a (AFM) and b (MFM). The region containing a lot of VC-particles show a considerably finer magnetic domain pattern (see the lower right quarter of the image). Conversely, in areas with fewer VC particles, the domain size is significantly larger. It is known that defect-pinned small domains can withstand a higher applied external magnetic field before domain wall movement occurs, as compared to larger magnetic domains that in general exist within large and defect-free grains (Magnetic Domains, Hubert A., Schäfer R., ISBN 3-540-64108-4, 2000). This may thus explain the improved magnetic properties of the composite material of the present invention.

Further, the composite material of the present invention can be produced without the need to rely on a flash heat treatment, so that the material is also easier to prepare. Samples 4.17-4.20 illustrate the magnetic properties after a flash-treatment at 950° C. on the cryo-milled (3 min) samples. It is evident that the only mild milling followed by low-temperature annealing, or relaxation treatment, could give a material that is superior in magnetic properties as compared to the corresponding samples not containing nanoparticles.

Surface Hardness

It was surprisingly found that even small amounts of nanoparticles can provide a composite material having a higher hardness as the corresponding reference alloy not containing nanoparticles.

The surface hardness of two samples indicated below show that the composite material containing VC nanoparticles has significantly higher hardness. The relative smaller grains observed in this sample are suggested to be the reason for the higher hardness, but also reinforcement with nano-structures may contribute to higher strength (i.e. similar to a precipitation hardening in metallurgy).

A higher hardness is normally connected to higher brittleness, which could help to improve the milling efficiency of these composite powders giving relative smaller particles with less induced strain and crystal defects as compared to its non-doped counterpart.

TABLE 6

Vickers Hardness Measurements

| Sample | Microhardness (HV)* | Microhardness (HV)* |
|---|---|---|
| Mn$_{55}$Al$_{45}$C$_2$ | 426 (twin-dense area) | 419 (Large grain area) |
| Mn$_{55}$Al$_{45}$C$_2$(VC)$_{1.0}$ | 538 (VC-dense area) | 485 (Area with no visual VC) |

*The measurement was done with 50 g weight (HV0.05) using an average of 10 consecutive indentations.

The surface hardness of these two samples show that the composite material has considerably higher hardness. Higher stability of tau-phase in combination with higher brittleness may contribute reaching improved magnetic properties in the final shaped and processed magnetic component.

INDUSTRIAL APPLICABILITY

The present invention provides a novel method as well as a novel composite material suitable for magnetic applications, and is thus industrially applicable.

The invention claimed is:

1. Solid composite material comprising an alloy based on manganese, aluminum and optionally carbon, and dispersed nanoparticles made from a material X, the material X being different from manganese, aluminum, carbon or a mixture, alloy, or compound consisting thereof and satisfying the following requirements:
   a. the melting temperature of the material X is 1700° C. or higher; and
   b. the material X comprises a metal,
   wherein 95% by weight or more of the alloy is formed by manganese, aluminum, and carbon, if present,
   wherein the amount of the dispersed nanoparticles made from the material X is 15% by weight or less, relative to the total weight of the solid composite material including the nanoparticles, according to the expression:

amount of the dispersed nanoparticles (%)=[weight of the dispersed nanoparticles]/[total weight of the magnetic solid material including the dispersed nanoparticles]×100.

2. The solid composite material according to claim 1, wherein the material X is selected from the group consisting of metals, metal carbides, metal nitrides, metal borides and combinations thereof.

3. The solid composite material according to claim 1, wherein the average particle diameter of the nanoparticles is 500 nm or less.

4. The solid composite material according to claim 1, which is magnetic and has a saturation magnetization Ms of 68 Am$^2$/kg or more, and a coercivity Hc of 70 kA/m or more.

5. The solid composite material according to claim 1, which is in the form of particles having a median particle diameter D50, as determined by a light scattering method, of 5000 µm or less.

6. The solid composite material according to claim 1, which has, except for the dispersed nanoparticles made from a material X, a content of the τ phase of 80% or more.

7. Magnetic material in shaped form, comprising the magnetic solid composite material of claim 1.

8. Electric or electronic device, comprising the magnetic material in shaped form according to claim 7.

9. The solid composite material according to claim 1, wherein the material X is selected from the group consisting of vanadium carbide, zirconium carbide, titanium carbide and chromium carbide and titanium nitride.

10. The solid composite material according to claim 1, wherein the alloy present in the solid composite material has a composition of the following formula I:

(Mn$_x$Al$_y$)Cz     (I)

wherein
   x=52.0 to 59.0
   y=41.0 to 48.0
   x+y=100, and
   z=0.1 to 3.0.

11. The solid composite material according to claim 10, wherein x=54.0 to 57.0; y=43.0 to 46.0; and z=1.0 to 1.9.

12. The solid composite material according to claim 10, wherein the ratio of x to z (x/z), is in the range of 26 to 33 and/or wherein x=56.5 to 58.5 and y=41.5 to 43.5.

13. The solid composite material according to claim 1, wherein 98% by weight or more the alloy is formed by manganese, aluminum, and carbon, if present.

14. The solid composite material according to claim 1, wherein 99% by weight or more the alloy is formed by manganese, aluminum, and carbon, if present.

15. Solid composite material comprising an alloy based on manganese, aluminum and optionally carbon, and dispersed nanoparticles made from a material X, the material X being different from manganese, aluminum, carbon or a mixture thereof and satisfying the following requirements:
  a. the melting temperature of the material X is 1400° C. or higher; and
  b. the material X comprises a metal,
  wherein the material X is selected from the group consisting of vanadium carbide, zirconium carbide, titanium carbide and chromium carbide and titanium nitride.

16. Solid composite material comprising an alloy based on manganese, aluminum and optionally carbon, and dispersed nanoparticles made from a material X, the material X being different from manganese, aluminum, carbon or a mixture, alloy, or compound consisting thereof and satisfying the following requirements:
  a. the melting temperature of the material X is 1700° C. or higher; and
  b. the material X comprises a metal,
  wherein the alloy present in the solid composite material has a composition of the following formula I:

$$(Mn_xAl_y)Cz \qquad (I)$$

wherein
  x=52.0 to 59.0
  y=41.0 to 48.0
  x+y=100, and
  z=0.1 to 3.0,
  wherein the amount of the dispersed nanoparticles made from the material X is 15% by weight or less, relative to the total weight of the solid composite material including the nanoparticles, according to the expression:

amount of the dispersed nanoparticles (%)=[weight of the dispersed nanoparticles]/[total weight of the magnetic solid material including the dispersed nanoparticles]×100.

17. The solid composite material according to claim 16, wherein x=54.0 to 57.0; y=43.0 to 46.0; and z=1.0 to 1.9.

18. The solid composite material according to claim 16, wherein the ratio of x to z (x/z), is in the range of 26 to 33 and/or wherein x=56.5 to 58.5 and y=41.5 to 43.5.

* * * * *